US 9,749,423 B2

(12) United States Patent
Okabayashi et al.

(10) Patent No.: US 9,749,423 B2
(45) Date of Patent: Aug. 29, 2017

(54) FUNCTION EXTENSION METHOD AND TERMINAL DEVICE

(71) Applicant: FUJITSU LIMITED, Kawasaki-shi, Kanagawa (JP)

(72) Inventors: Miwa Okabayashi, Sagamihara (JP); Hisatoshi Yamaoka, Kawasaki (JP); Takashi Ohno, Kobe (JP); Toru Kamiwada, Kawasaki (JP); Junichi Yura, Kawasaki (JP); Takuya Sakamoto, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 190 days.

(21) Appl. No.: 14/666,403

(22) Filed: Mar. 24, 2015

(65) Prior Publication Data
US 2015/0296025 A1   Oct. 15, 2015

(30) Foreign Application Priority Data

Apr. 10, 2014 (JP) .................................. 2014-081358
Dec. 17, 2014 (JP) .................................. 2014-255355

(51) Int. Cl.
*H04L 29/08* (2006.01)
*G06F 9/445* (2006.01)
(Continued)

(52) U.S. Cl.
CPC .......... *H04L 67/141* (2013.01); *G06F 9/4411* (2013.01); *G06F 9/44526* (2013.01); *H04L 43/0876* (2013.01)

(58) Field of Classification Search
CPC .. H04L 67/141; H04L 43/0876; G06F 9/4411; G06F 9/44526
See application file for complete search history.

(56) References Cited

U.S. PATENT DOCUMENTS 7,254,814 B1 * 8/2007 Cormier .............. G06F 9/44526
   717/120
9,049,201 B1 * 6/2015 Kunath ................. H04W 4/003
(Continued)

FOREIGN PATENT DOCUMENTS

CN     103024544 A      4/2013
JP     2000-194562      7/2000
(Continued)

OTHER PUBLICATIONS

Extended European Search Report dated Jan. 4, 2016 for corresponding European Patent Application No. 15158875.3, 10 pages.
(Continued)

*Primary Examiner* — Brian J Gillis
*Assistant Examiner* — Amy Ling
(74) *Attorney, Agent, or Firm* — Fujitsu Patent Center

(57) ABSTRACT

A function extension method is executed by a terminal device. The function extension method includes connecting a first plug-in, which is common to one or more peripheral devices, to an execution environment of an application for controlling the one or more peripheral devices; arranging a second plug-in, which corresponds to each of the one or more peripheral devices, to be connected to the execution environment of the application via the first plug-in; and connecting the second plug-in corresponding to another peripheral device to the execution environment of the application via the first plug-in while maintaining the connection relationship between the execution environment of the application and the first plug-in, when the another peripheral device controlled by the terminal device is to be added.

17 Claims, 37 Drawing Sheets

(51) Int. Cl.
*G06F 9/44* (2006.01)
*H04L 12/26* (2006.01)

(56) References Cited

U.S. PATENT DOCUMENTS

| | | |
|---|---|---|
| 2005/0165979 A1 | 7/2005 | Kato |
| 2006/0031855 A1 | 2/2006 | Smithline |
| 2011/0016476 A1* | 1/2011 | Raju ................. H04M 1/72555 |
| | | 719/328 |
| 2011/0209137 A1 | 8/2011 | Berg et al. |
| 2012/0079383 A1* | 3/2012 | Thanumalayan ..... G06F 9/4443 |
| | | 715/716 |
| 2013/0191526 A1 | 7/2013 | Zhao |
| 2014/0181888 A1* | 6/2014 | Li ........................... G06F 21/62 |
| | | 726/1 |

FOREIGN PATENT DOCUMENTS

| | | |
|---|---|---|
| JP | 2005-275664 | 10/2005 |
| JP | 2008-310499 | 12/2008 |
| JP | 2012-507060 | 3/2012 |
| WO | 2010/050037 | 5/2010 |

OTHER PUBLICATIONS

Chinese Office Action dated Jun. 27, 2017 for corresponding Chinese Patent Application No. 201510144846.7, with English Translation, 17 pages.

\* cited by examiner

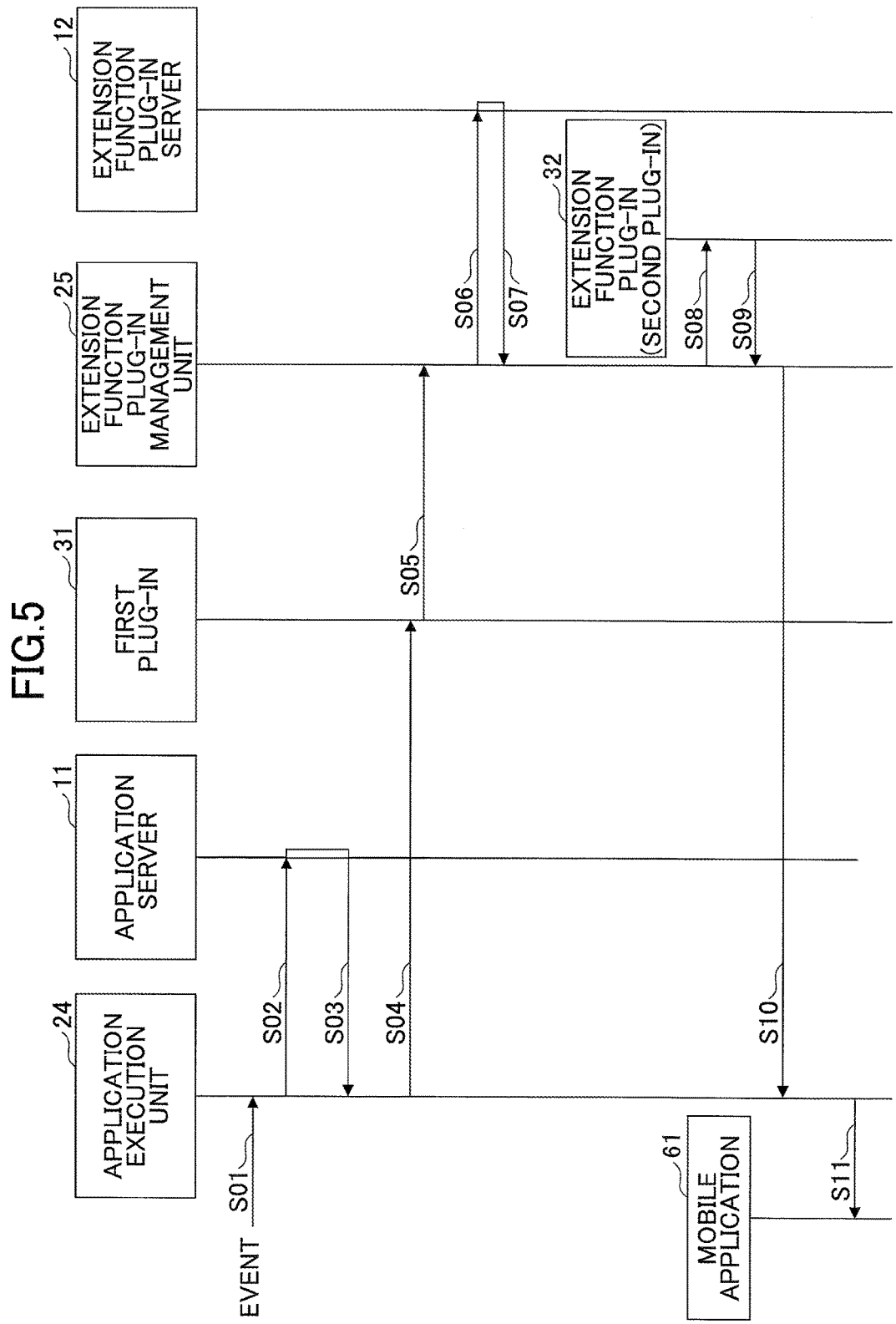

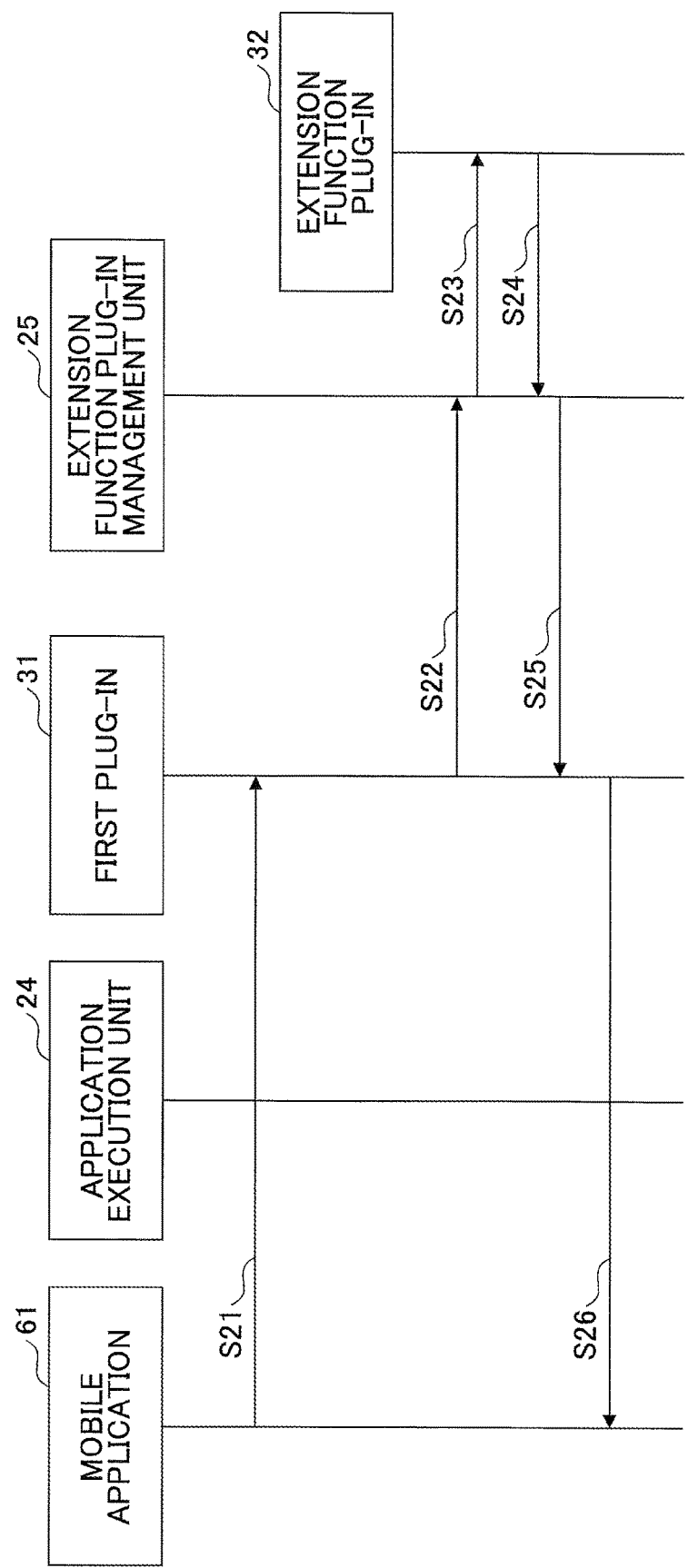

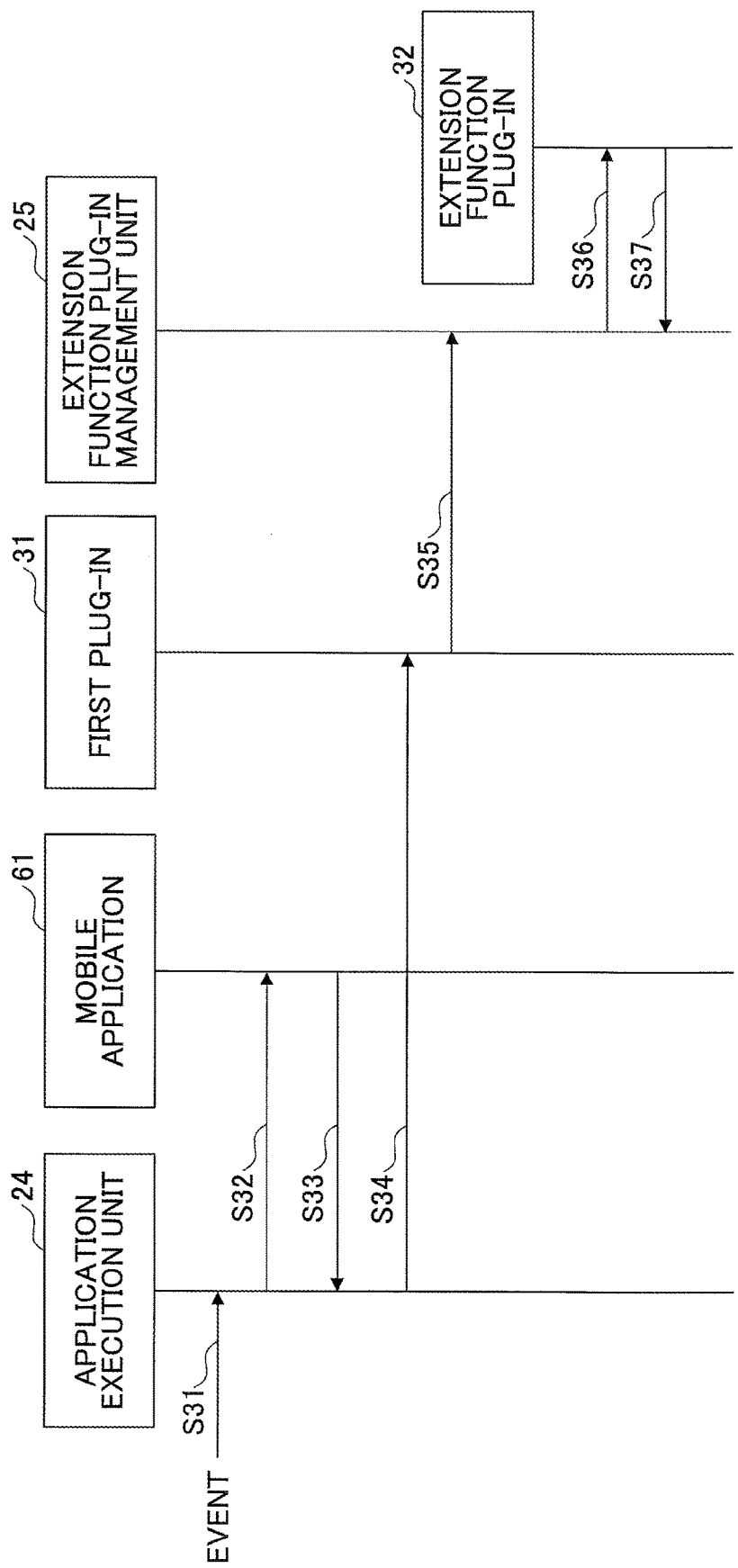

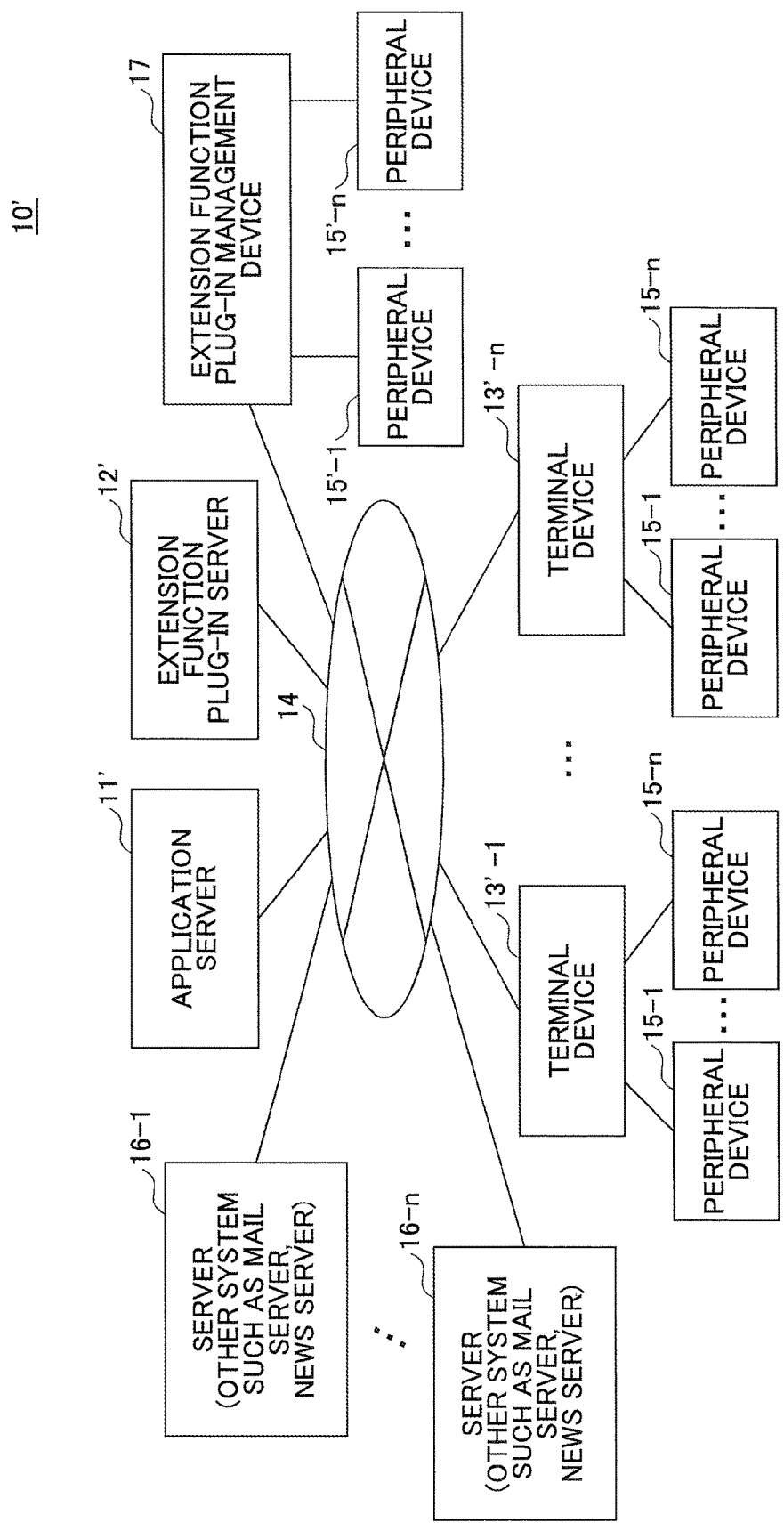

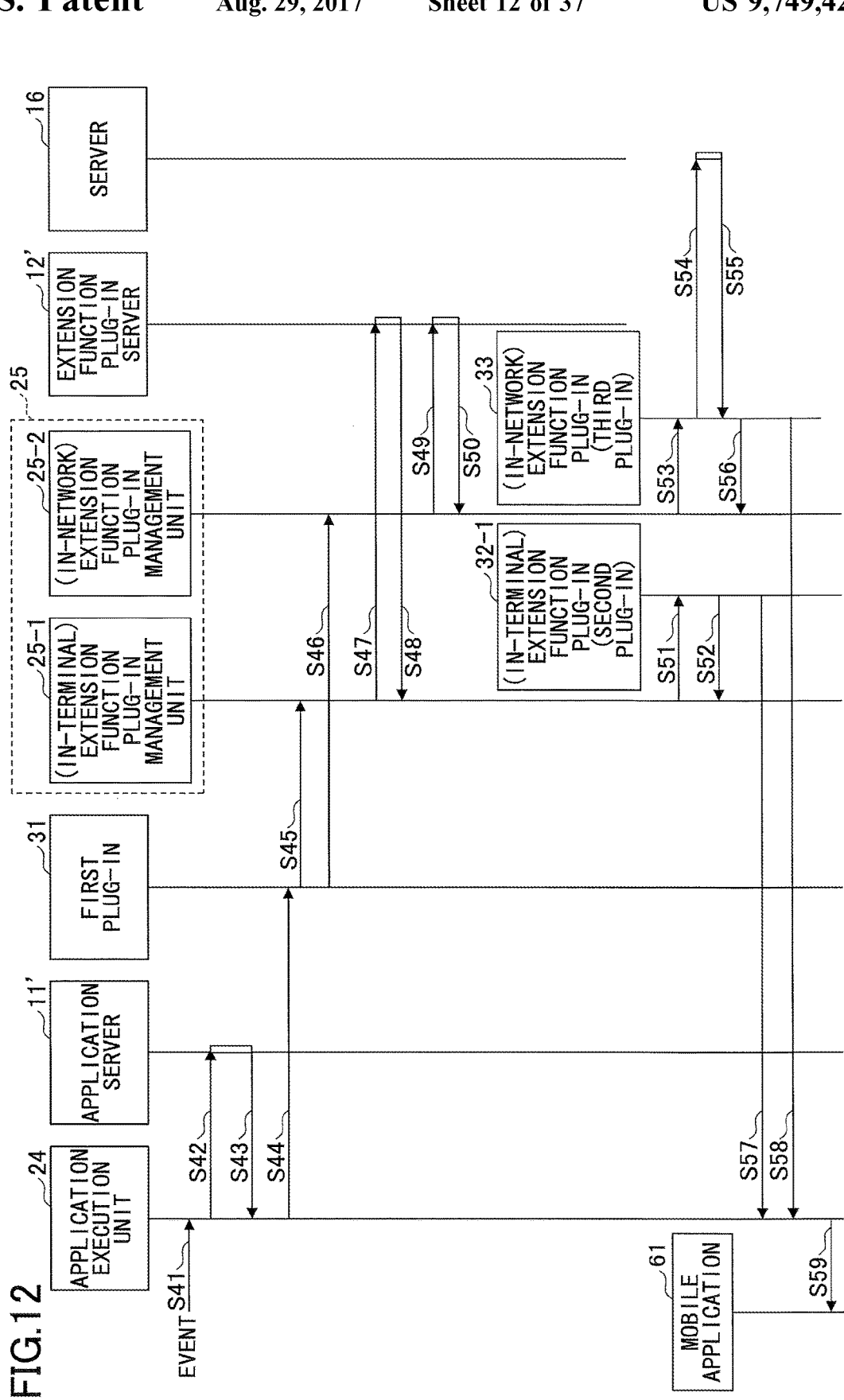

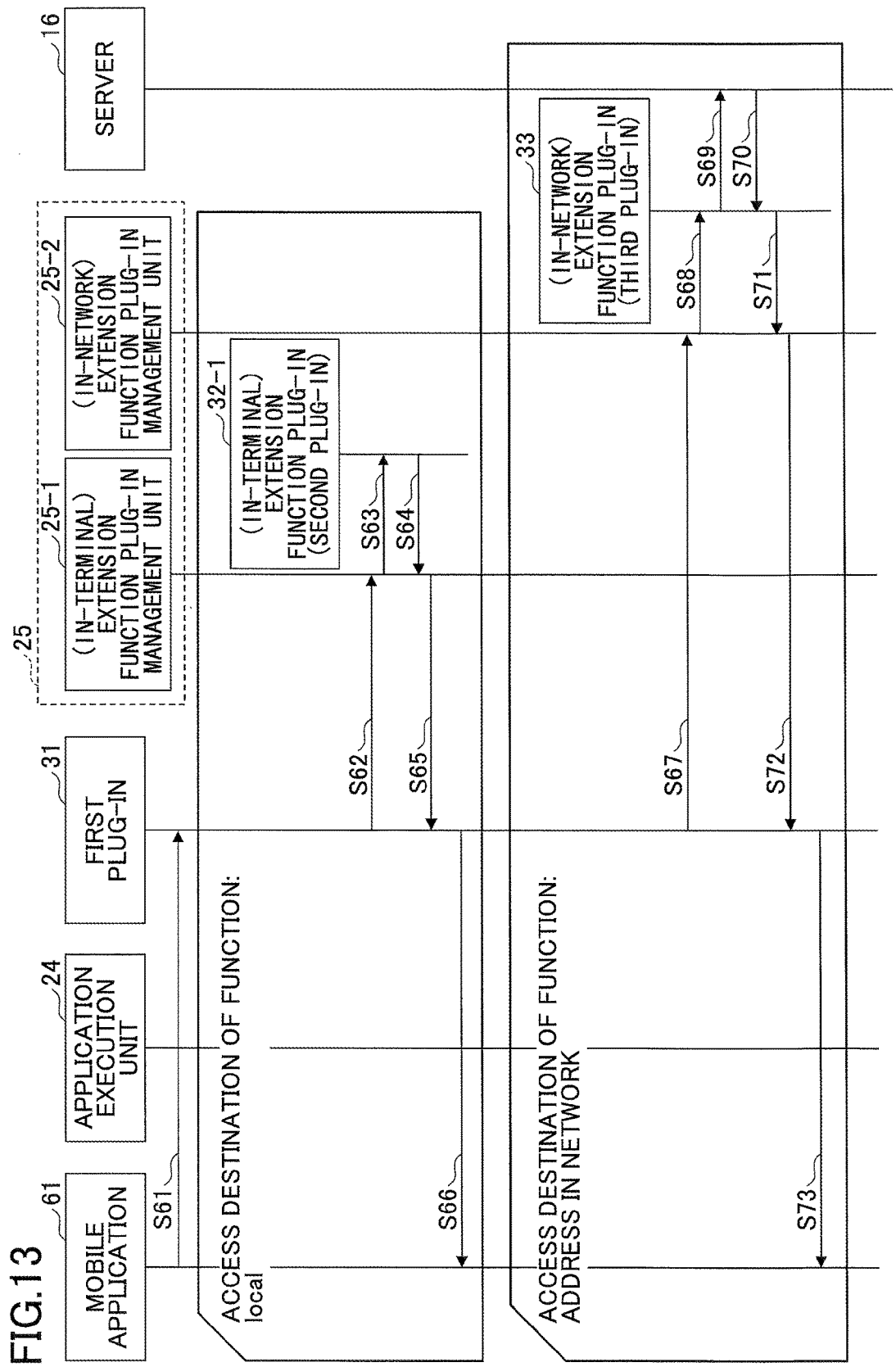

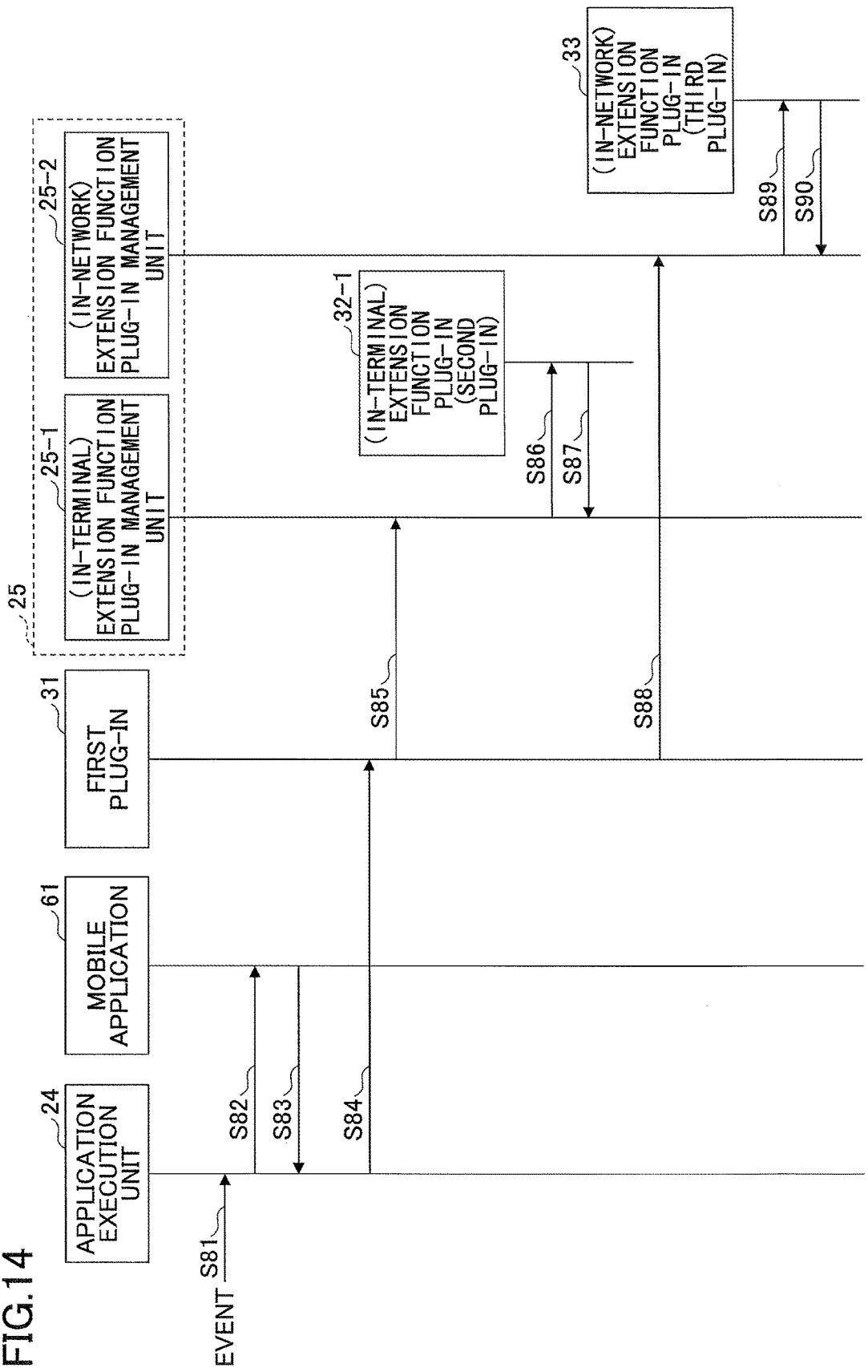

FIRST PLUG-IN

62a

FUNCTION INFORMATION LIST
OF APPLICATION ID=0001

| FUNCTION | ACCESS DESTINATION | CONDITION SUCH AS VERSION |
|---|---|---|
| notify | local | version:1.22.1 |
| display | ws://*** | version:2.2.1 |

(IN-TERMINAL) EXTENSION FUNCTION
PLUG-IN MANAGEMENT UNIT

62a

FUNCTION INFORMATION LIST
OF APPLICATION ID=0001

| FUNCTION | ACCESS DESTINATION | CONDITION SUCH AS VERSION |
|---|---|---|
| notify | local | version:1.22.1 |

INSTALLED FUNCTION INFORMATION LIST 62b

| FUNCTION | PLUG-IN NAME (UNIQUE NAME) | CONDITION SUCH AS VERSION |
|---|---|---|
| wristgesture | com.AAA.xx.wristset | version:1.22.1 |
| NFC | com.AAA.xx.wristset | version:1.22.1 |
| notify | com.AAA.xx.notify | version:0.2.2 |

(IN-NETWORK) EXTENSION FUNCTION PLUG-IN
MANAGEMENT UNIT
  (ws://*** IS ACCESS DESTINATION
  OF FUNCTION MANAGEMENT)

62a

FUNCTION INFORMATION LIST
OF APPLICATION ID=0001

| FUNCTION | ACCESS DESTINATION | CONDITION SUCH AS VERSION |
|---|---|---|
| display | ws://*** | version:2.2.1 |
| mailchecker | ws://*** | version:1.1.1 |

INSTALLED FUNCTION INFORMATION LIST  62c

| FUNCTION | PLUG-IN NAME (UNIQUE NAME) | CONDITION SUCH AS VERSION |
|---|---|---|
| humandet | com.AAA.yy.humandet | version:0.8.1 |
| display | com.AAA.yy.display | version:2.2.1 |
| mailchecker | com.AAA.mailcheker | version:1.1.1 |

(IN-TERMINAL) EXTENSION FUNCTION
PLUG-IN MANAGEMENT UNIT

INSTALLED FUNCTION INFORMATION LIST  *62b*

| FUNCTION | PLUG-IN NAME (UNIQUE NAME) | CONDITION SUCH AS VERSION |
|---|---|---|
| wristjesture | com.AAA.xx.wristset | version:1.22.1 |
| NFC | com.AAA.xx.wristset | version:1.22.1 |
| notify | com.AAA.xx.notify | version:0.2.2 |

(OUTSIDE-TERMINAL) EXTENSION FUNCTION
PLUG-IN MANAGEMENT UNIT

DETECTING FUNCTION INFORMATION LIST  *62e*

| FUNCTION | PLUG-IN NAME (UNIQUE NAME) | CONDITION SUCH AS VERSION | LATEST TIME |
|---|---|---|---|
| humandet | ssid: abce | version:0.8.1 | 2013/4/23 03:24:33 |
| display | ssid: aaaa | version:2.2.1 | |

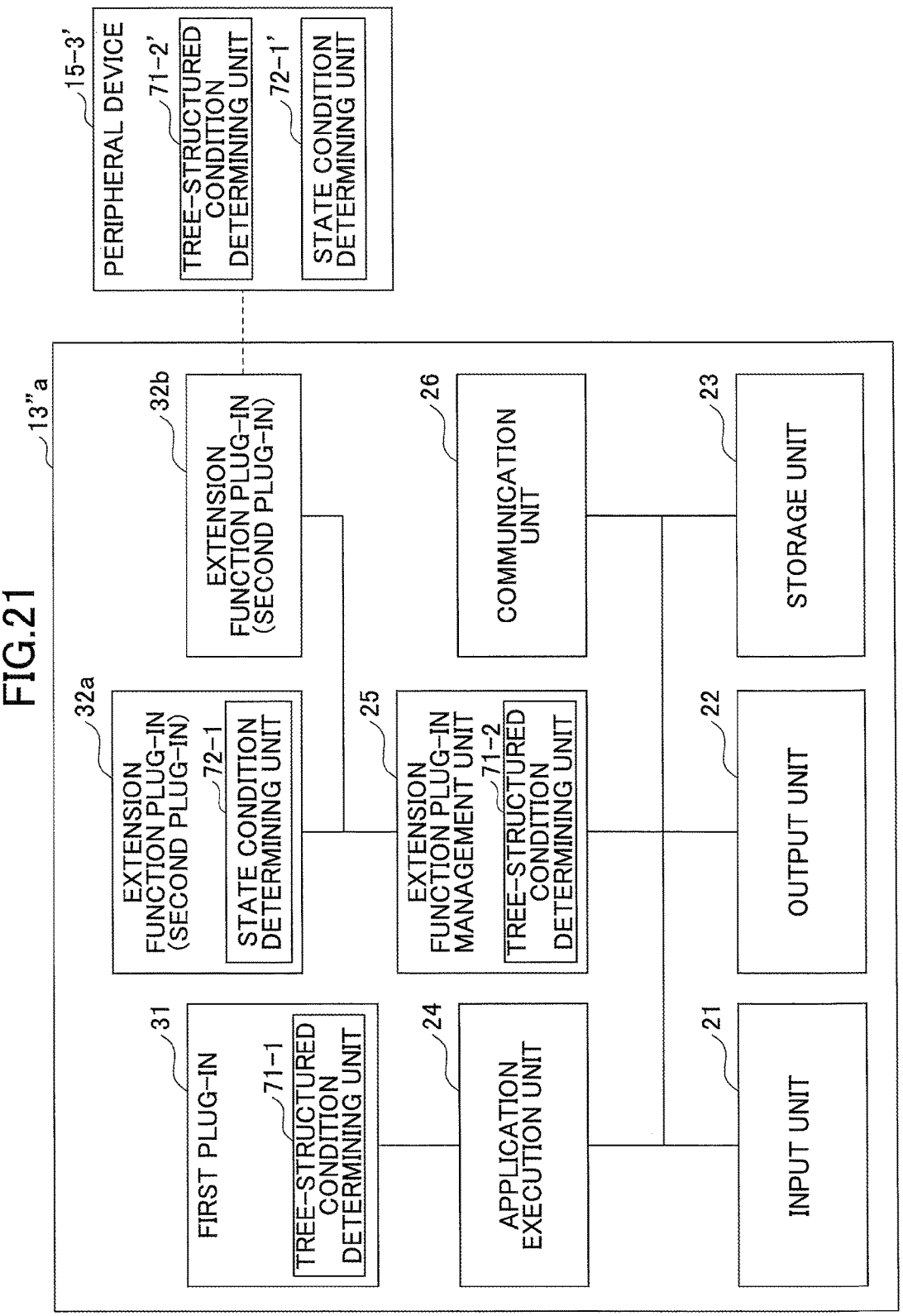

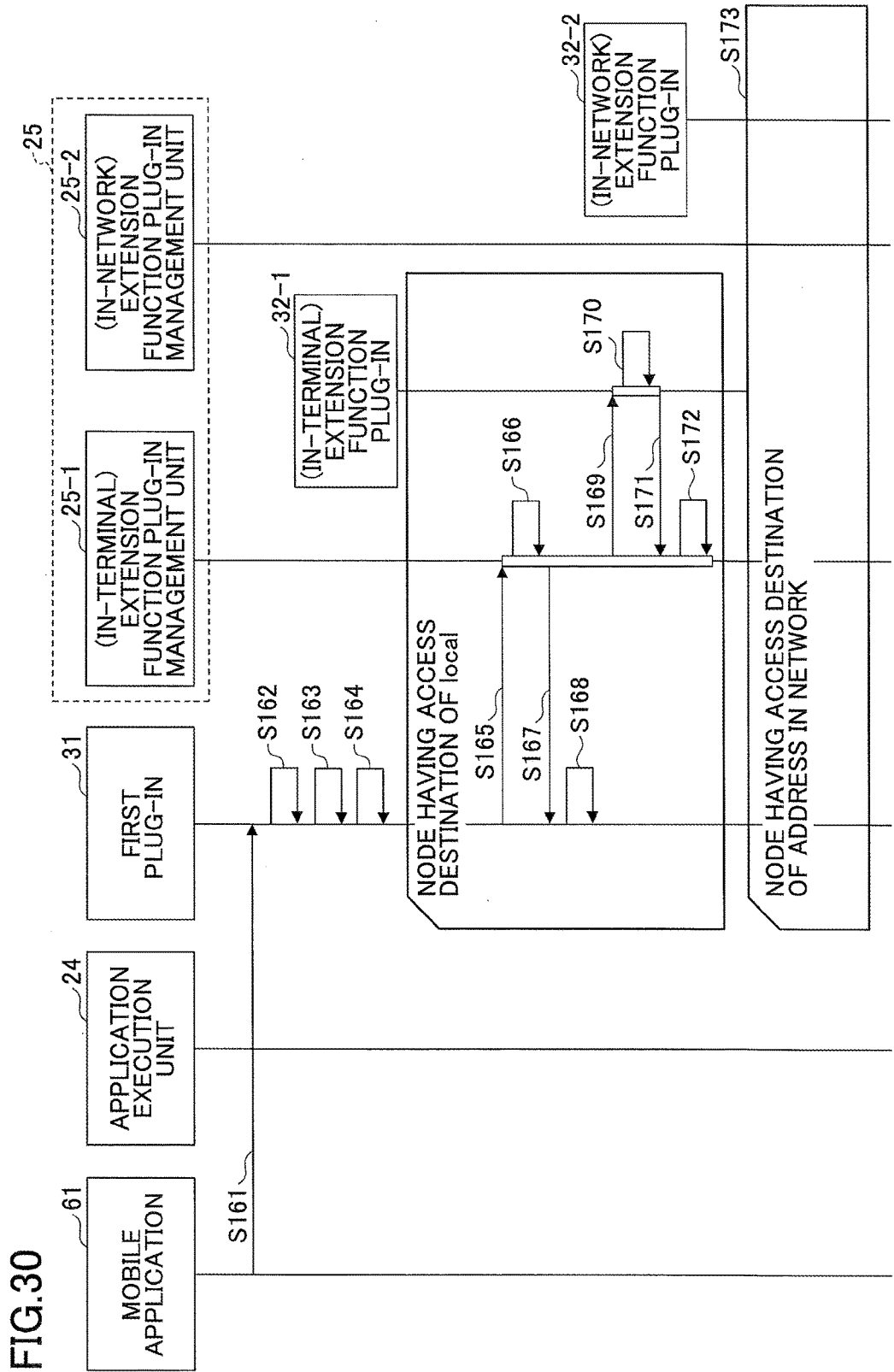

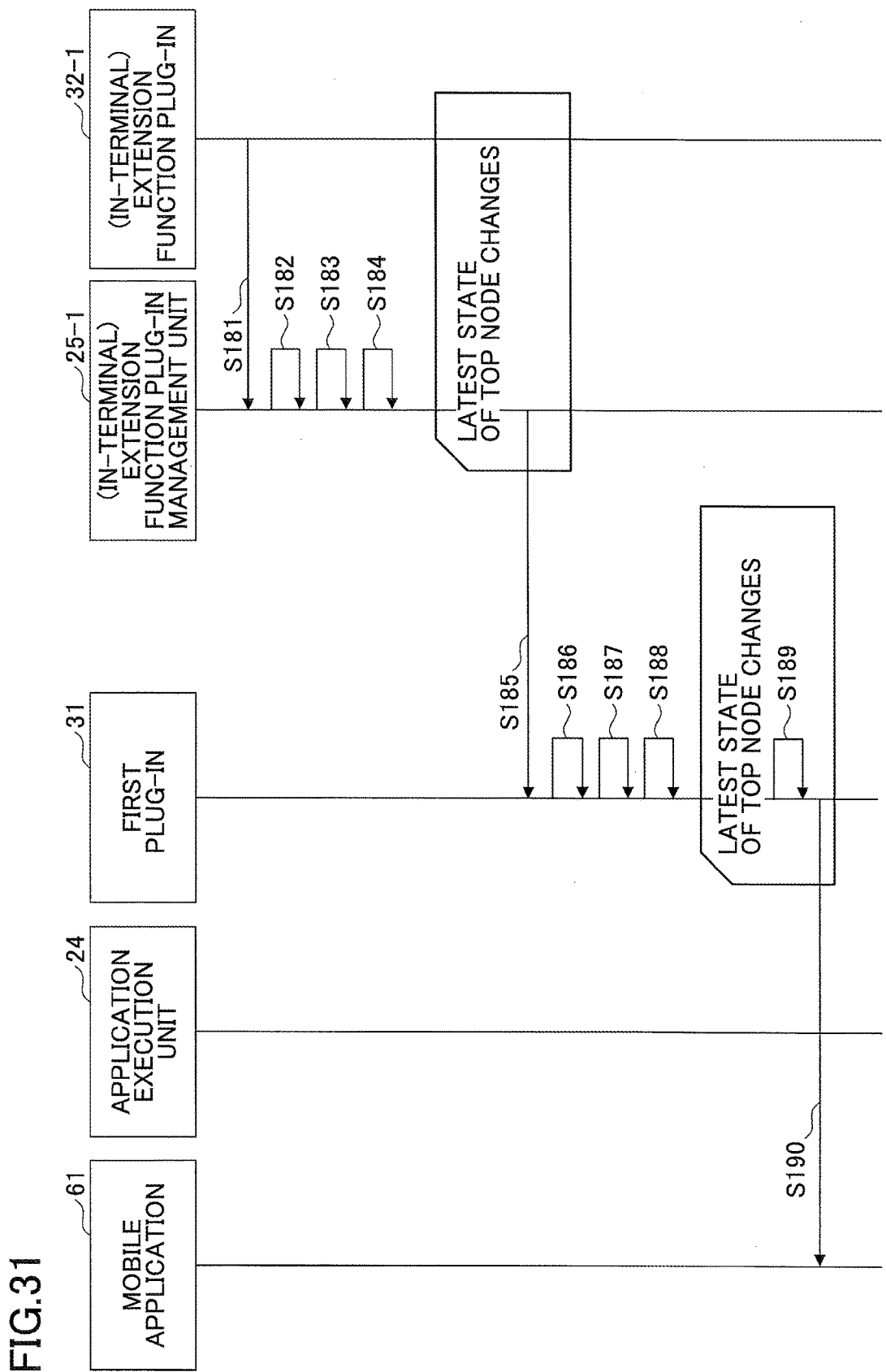

EXAMPLE OF DESCRIPTION OF CONDITION

[{"type":"OR", "eventname:kikanshituA", "value":[
  {"type":"posture", "value":"Enter":[{"angle":45},"Exit":[{"angle":20}]},
  {"type":"AND","value":[
    {"type":"nfc", "Enter":[{"idm":0},"Exit":[{"idm":1}]},
    {"type":"wristjesture", "Enter":[{"gesture":"left},"Exit":[{"gesture":"right}]},
  ]}
]}]

CONFIGURATION OF NODE

FIG.34A

```
temperature = 21
humidity = 57
hour = 14
min = 23
```

FIG.34B

```
temperature = 20
humidity = .*
hour = .*
min = .*
```
MATCH WHEN TEMPERATURE IS 20

```
temperature = .*
humidity = .*
hour = .*
min = 30
```
MATCH EVERY 30 MINUTES

```
temperature = 20
humidity = .*
hour = .*
min = 30
```
MATCH EVERY 30 MINUTES AND WHEN TEMPERATURE IS 20

FUNCTION EXTENSION METHOD AND TERMINAL DEVICE

CROSS-REFERENCE TO RELATED APPLICATION

This patent application is based upon and claims the benefit of priority of the prior Japanese Patent Application No. 2014-081358 filed on Apr. 10, 2014 and the prior Japanese Patent Application No. 2014-255355 filed on Dec. 17, 2014, the entire contents of which are incorporated herein by reference.

FIELD

The embodiments discussed herein are related to a function extension method and a terminal device.

BACKGROUND

In an execution environment having a function that corresponds to a web browser, applications that operate in the execution environment are being developed. The developed applications use a programming language such as Hypertext Markup Language (HTML) 5 and Javascript (registered trademark). Furthermore, in order to use a function of a terminal that is not installed as a standard function in the execution environment of the application, a plug-in for adding the function in the execution environment is developed to implement function extension. Furthermore, the application may be distributed from an application server connected to a communication network, or may be included in the terminal and acquired by being appropriately switched. Furthermore, the application may be uninstalled according whether the application is accessed.

Patent Document 1: Japanese Laid-Open Patent Publication No. 2005-275664

Patent Document 2: Japanese National Publication of International Patent Application No. 2012-507060

Patent Document 3: Japanese Laid-Open Patent Publication No. 2008-310499

Patent Document 4: Japanese Laid-Open Patent Publication No. 2000-194562

However, when function extension is implemented by developing a plug-in for adding a function to the execution environment of the application, for example, by a mobile operating system (OS) such as Android (registered trademark), there is no function by which the program dynamically links to a library. Therefore, a plug-in needed for the execution environment needs to be incorporated in advance to be statically linked.

Furthermore, conventionally, it is not possible to dynamically load or unload a plug-in. Therefore, in order to add a new plug-in, there has been a need to temporarily stop or uninstall an application execution program (execution environment) that is being executed, to replace this with an application execution program by which a new plug-in is statically linked.

Furthermore, when switching the application based on the present position by using a sensing function such as the Global Position System (GPS), it has not been possible to maintain the state up to the present time when the execution environment is stopped or when the application is reinstalled. Therefore, time and effort have been needed for making settings again.

SUMMARY

According to an aspect of the embodiments, a function extension method is executed by a terminal device, the function extension method including connecting a first plug-in, which is common to one or more peripheral devices, to an execution environment of an application for controlling the one or more peripheral devices; arranging a second plug-in, which corresponds to each of the one or more peripheral devices, to be connected to the execution environment of the application via the first plug-in; and connecting the second plug-in corresponding to another peripheral device to the execution environment of the application via the first plug-in while maintaining the connection relationship between the execution environment of the application and the first plug-in, when the another peripheral device controlled by the terminal device is to be added.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 5 illustrates a sequence of an example of a function extension process (when starting application) according to the first embodiment;

FIG. 6 illustrates a sequence of an example of a function extension process (while an application is being executed) according to the first embodiment;

FIG. 7 illustrates a sequence of an example of a function extension process (when ending application) according to the first embodiment;

FIG. 9 illustrates an example of a schematic configuration of a function extension system according to a second embodiment;

FIG. 12 illustrates a sequence of an example of a function extension process (when starting application) according to the second embodiment;

FIG. 13 illustrates a sequence of an example of a function extension process (while a mobile application is being executed) according to the second embodiment;

FIG. 14 illustrates a sequence of an example of a function extension process (when ending application) according to the second embodiment;

FIGS. 15A through 15C illustrate examples of various types of data applied in the second embodiment;

FIGS. 20A through 20C illustrate examples of various types of data applied in the third embodiment;

FIG. 21 illustrates an example (part 1) of the functional configuration of a terminal device according to a fourth embodiment;

FIG. 30 illustrates a sequence of an example of a function extension process (registering condition definition) according to the fourth embodiment;

FIG. 31 illustrates a sequence of an example of a function extension process (generating condition event) according to the fourth embodiment;

FIGS. 34A and 34B illustrate specific examples of an internal event and state condition settings.

DESCRIPTION OF EMBODIMENTS

Preferred embodiments of the present invention will be explained with reference to accompanying drawings.

<Example of Schematic Configuration of Function Extension System According to First Embodiment>

Figure 1:
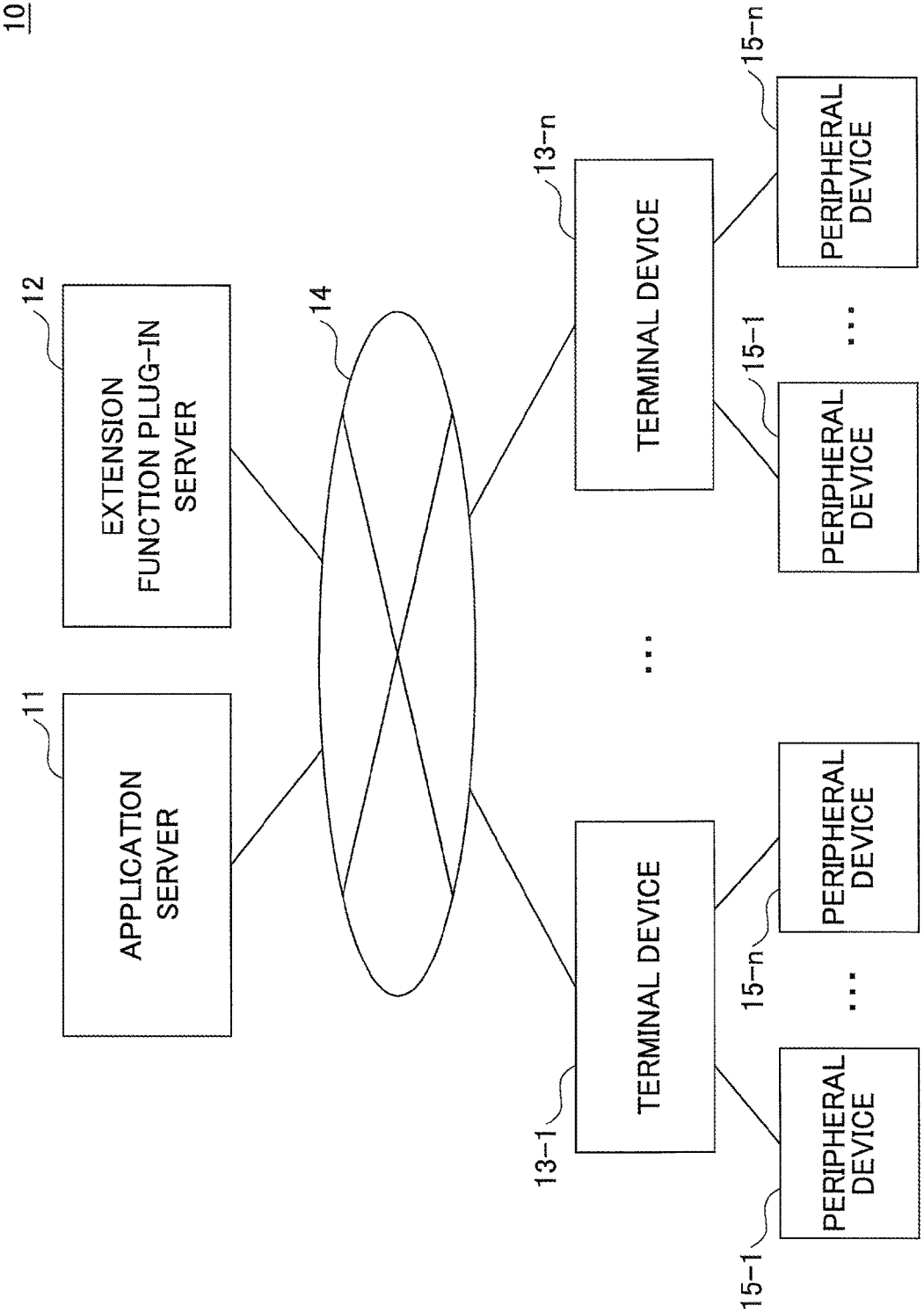
FIG. 1 illustrates an example of a schematic configuration of a function extension system according to a first embodiment.

FIG. 1 illustrates an example of a schematic configuration of a function extension system according to the first embodiment. A function extension system 10 illustrated in FIG. 1 includes an application server 11, an extension function plug-in server 12, and one or more terminal devices 13-1 through 13-n (hereinafter, referred to as "terminal device 13" according to need). The application server 11, the extension function plug-in server 12, and the terminal device 13 are connected to each other in a state where data may be transmitted/received, by a communication network 14 such as a Local Area Network (LAN) and the Internet. The communication network 14 may be wired or wireless or a combination of wired and wireless networks.

The application server 11 manages a set of applications (for example, a function information list including applications (for example, software, programs, and tools for executing a process) and functions that are scheduled to be used by the applications) that are used by, for example, the terminal device 13. Furthermore, the application server 11 may also manage a function information list, which is a list including a set of applications that may be respectively used in predetermined states such as locations and functions that may be respectively used in predetermined states such as locations. For example, the application server 11 includes one or more applications (for example, mobile applications) that may be executed according to the predetermined states such as locations. The application server 11 distributes an application corresponding to a request to the terminal device 13 via the communication network 14, in response to a request to acquire an application or other information from the terminal device 13. Note that the application according to the present embodiment need not always use only one peripheral device 15; the application may become a single useful application by using a plurality of the peripheral devices 15. For example, an application may use an "infrared light sensor" and a "light", which are examples of a peripheral device 15 in a certain environment, to turn on the light of a seat when a person sits down on the seat; however, the present embodiment is not so limited.

For example, the extension function plug-in server 12 stores an extension function plug-in that is set in advance (a second plug-in described below). For example, the extension function plug-in server 12 stores a program for realizing a function of a plug-in with respect to one or more peripheral devices (for example, sensors) 15-1 through 15-n (hereinafter, also referred to as a "peripheral device 15" according to need) to which the terminal device 13 is connected. The extension function plug-in server 12 distributes, to the terminal device 13 via the communication network 14, a corresponding function in response to a request to acquire a function from the terminal device 13.

The application server 11 and the extension function plug-in server 12 described above may be, for example, a single server (for example, a providing server). Furthermore, the application server 11 and the extension function plug-in server 12 may be, for example, a personal computer (PC), and may be a cloud server constituted by cloud computing including one or more information processing devices; however, the present embodiment is not so limited.

When the terminal device 13 connects and controls a peripheral device 15 from an application, the terminal device 13 incorporates, in advance, in the execution environment for executing the application, a first plug-in that is common to all peripheral devices 15 regardless of the type of peripheral device 15. Furthermore, the terminal device 13 arranges, as second plug-ins, the extension function plug-ins storing programs for controlling the respective peripheral devices 15, to be connected to the execution environment of the application via the first plug-in.

The terminal device 13 uses the peripheral device 15 by using the extension function plug-in (second plug-in). Furthermore, when the extension function plug-in (second plug-in) needed for the distributed application to use the peripheral device 15 is not available, the terminal device 13 sends a request for the needed extension function plug-in to the application server 11 and acquires the extension function plug-in.

When adding another peripheral device 15, the terminal device 13 arranges an extension function plug-in corresponding to the other peripheral device 15, to be connected to the execution environment of the application via the first plug-in. Furthermore, when the terminal device 13 deletes an extension function plug-in for controlling the peripheral device 15, the terminal device 13 deletes the extension function plug-in corresponding to the peripheral device to be deleted, while maintaining the connection relationship between the execution environment of the application and the first plug-in. Accordingly, the terminal device 13 is able to quickly implement function extension for the application to use the peripheral device 15.

For example, in an OS where it is not possible to dynamically load a library into an application execution unit, the terminal device 13 incorporates in advance a first plug-in in the application execution unit for executing the application described in a script. Furthermore, for example, the terminal device 13 manages the extension function plug-ins for executing extension functions and the install state of the extension function plug-ins in an OS. Furthermore, the terminal device 13 uses an extension function plug-in management unit for relaying the communication between the first plug-in and the extension function plug-in to incorporate or remove a plurality of the extension functions for extending functions to be provided to the script, while executing with the application execution unit.

For example, the terminal device 13 is a mobile terminal such as a tablet terminal and a smartphone; however, the present embodiment is not so limited, and the terminal device 13 may be a PC, a notebook PC, a game device, a camera (imaging device), and a music replay device.

The peripheral device 15 may be a microphone, a projector, a scanner, a camera, an electronic board, and a wearable terminal such as a wristwatch having a mobile information terminal device and a display that may be worn on the head; however, the present embodiment is not so limited. The peripheral device 15 may be, for example, an acceleration sensor in the terminal device 13. The peripheral device 15 according to the present embodiment is not only a device per se, but a function provided by the OS installed in the terminal device 13 or a function for acquiring sensor data. As a function provided by the OS installed in the terminal device 13, for example, there is a function for issuing an event at a predetermined time, and the extension function plug-in (second plug-in) has an internal program for using this function to send a report to the application; however, the present embodiment is not so limited. Furthermore, as a detection function of an extension function plug-in (second plug-in), which uses a function of the OS of acquiring sensor data installed in the terminal device 13 as the peripheral device 15, for example, there is a function of detecting that a user is walking or the user has stopped by a sensor of the terminal device 13; however, the present embodiment is not so limited. Examples of a sensor used for detection are an acceleration sensor, an geomagnetic sensor, a gyro sensor, a proximity sensor, an illuminance sensor, a volume sensor, a temperature sensor, a humidity sensor, an air pressure sensor, an infrared light sensor, a walk sensor, an activity meter, a dust sensor, a smoke sensor, a gas sensor, a radiation dosimeter, a shock sensor, a virus sensor, a sodium sensor, and a taste sensor; however, the present embodiment is not so limited.

The peripheral device 15 is subjected to various kinds of control by an application in the application execution unit of the terminal device 13, via an extension function plug-in (second plug-in).

For example, in the first embodiment, the application acquires the information of the executable peripheral device 15 in association with the position information of the terminal device 13, and implements connection control of a second plug-in corresponding to the peripheral device 15, based on the acquired information of the peripheral device 15. Furthermore, in the first embodiment, the information of the peripheral device 15 that is executable in the present state may be acquired according to, not only the position information, but also according to a change of state including at least one of the position of the terminal device 13 and the time, the change of the internal state of the terminal, the change in the surroundings, and an event received from outside.

First Embodiment

Next, a detailed description is given of the first embodiment using the function extension system 10 described above.

<Example of Functional Configuration of Terminal Device 13 According to First Embodiment>

Figure 2:
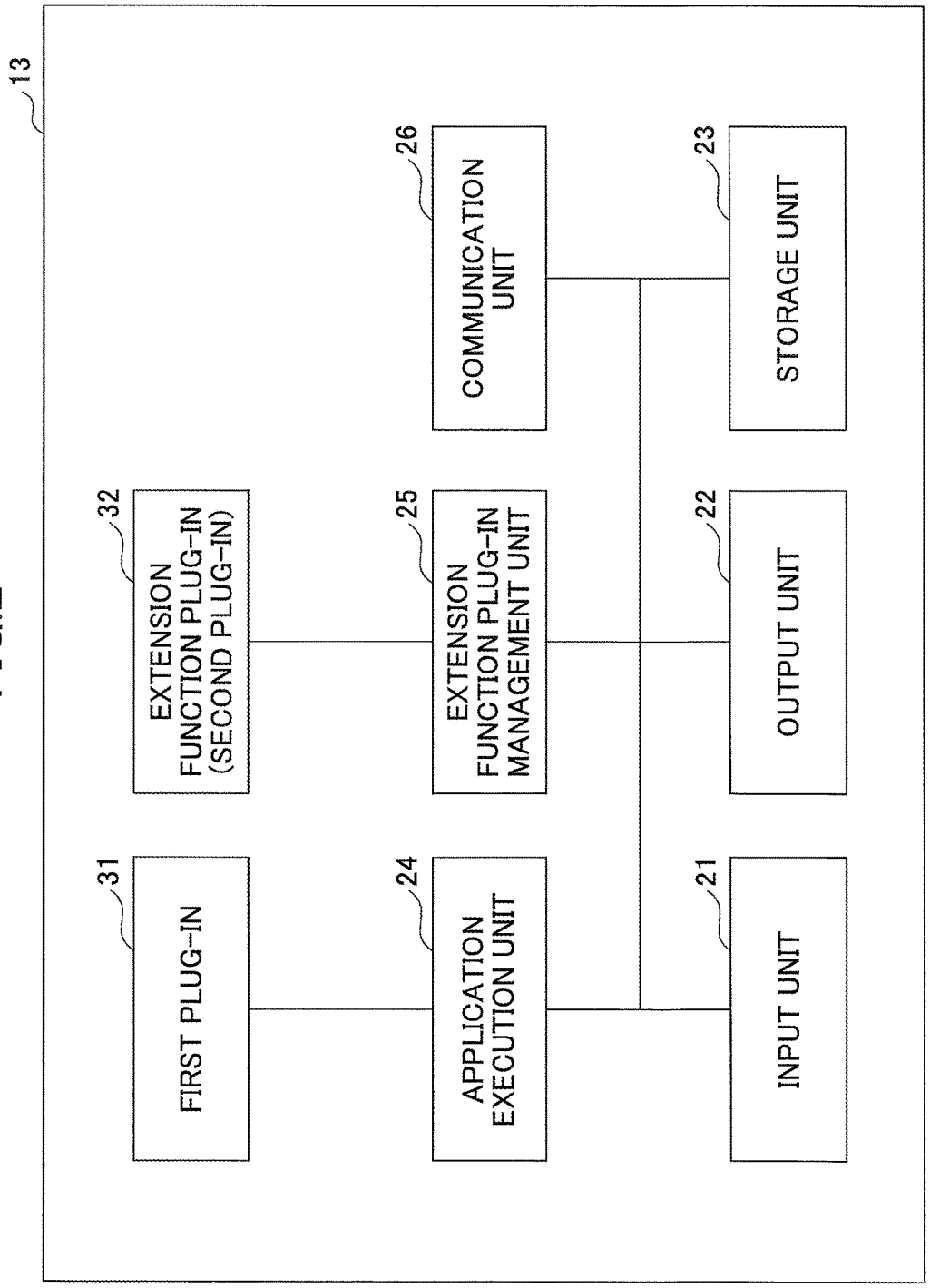
FIG. 2 illustrates an example of a functional configuration of a terminal device according to the first embodiment.

A description is given of an example of the functional configuration of the terminal device 13 illustrated in FIG. 1. FIG. 2 illustrates an example of the functional configuration of the terminal device 13 according to the first embodiment. The terminal device 13 illustrated in FIG. 2 includes an input unit 21, an output unit 22, a storage unit 23, an application execution unit 24, an extension function plug-in management unit 25, and a communication unit 26.

The input unit 21 receives, from the user, input of various kinds of setting information relevant to the function extension process in the present embodiment. Note that the input unit 21 may receive various kinds of information and instructions input from an input interface such as a keyboard, a mouse, and a touch panel; however, the present embodiment is not so limited.

The output unit 22 displays, on a screen, various kinds of setting information input by the input unit 21 and results obtained by executing a process corresponding to an input instruction, and presents this information to the user. For example, the output unit 22 is a display, a monitor, and a touch panel; however, the present embodiment is not so limited.

The storage unit 23 stores various kinds of information needed for processes of the terminal device 13 according to the present embodiment. For example, the storage unit 23 stores setting information input by the user, applications, plug-in information, address information for connecting to the application server 11 and the extension function plug-in server 12, and authentication information; however, the present embodiment is not so limited, and the storage unit 23 may store execution results, history information, and error information.

The application execution unit 24 executes a mobile application stored in the storage unit 23, or a mobile application downloaded from the application server 11 or distributed from the application server 11. In the application execution unit 24, a first plug-in 31 is incorporated in advance. For example, the application execution unit 24 may pass the extension function information (extension function list) used by the application to the first plug-in 31, and provide an interface common to the extension functions to the mobile application.

For example, the extension function plug-in management unit 25 arranges extension function plug-ins (second plug-ins) 32 corresponding to the respective peripheral devices 15, by connecting these to the execution environment of the application via the first plug-in 31. Furthermore, when adding another peripheral device 15 to be controlled by the terminal device 13, the extension function plug-in management unit 25 arranges the extension function plug-in 32 corresponding to the other peripheral device 15 by connecting the extension function plug-in 32 to the execution environment of the application via the first plug-in 31, while maintaining the connection relationship between the execution environment of the application and the first plug-in 31.

Furthermore, when deleting the extension function plug-in 32 controlling the peripheral device 15 being controlled by the terminal device 13, the extension function plug-in management unit 25 deletes the extension function plug-in 32 corresponding to the peripheral device 15 to be deleted, while maintaining the connection relationship between the execution environment of the application and the first plug-in 31.

The first plug-in 31 incorporated in the application execution unit 24 and the extension function plug-in management unit 25 provide a function that utilizes the peripheral device 15 that is usable in a predetermined state, to a script by the same interface as that of the function in the terminal device 13, for each of the predetermined states such as the present location detected by the peripheral device 15. For example, the first plug-in 31 and the extension function plug-in management unit 25 provide a function of operating the peripheral device 15 belonging to a predetermined location, to the script by the same interface as that of the function in the terminal device 13, for each of the predetermined locations such as a conference room A. For example, the first plug-in 31 acquires a "function information list for each state" which is a list of functions that may be used in a predetermined state such as the present location, and passes the list to the extension function plug-in management unit 25. For example, when the present location of the terminal device 13 is the state, the "function information list for each state" becomes a function information list for each location. The extension function plug-in management unit 25 acquires the extension function plug-in 32 from the extension function plug-in server 12 based on this list.

Furthermore, the extension function plug-ins 32 may be a plug-in for not only controlling the peripheral device 15, but also a plug-in for obtaining information such as "has approached a certain location", by processing sensor information obtained from the peripheral device 15. In this case, the extension function plug-in 32 issues an event when a condition of a location is satisfied, such as "at certain location". The application execution unit 24 described above may acquire the application by accessing the application server 11 based on the event. The extension function plug-in 32 may be a library including an algorithm for processing the sensor information, or an independent application for communicating with the first plug-in.

The communication unit 26 accesses the application server 11, the extension function plug-in server 12, the terminal device 13, and other external devices via the communication network 14, to transmit/receive data.

<Hardware Configuration Example of Terminal Device 13>

Figure 3:
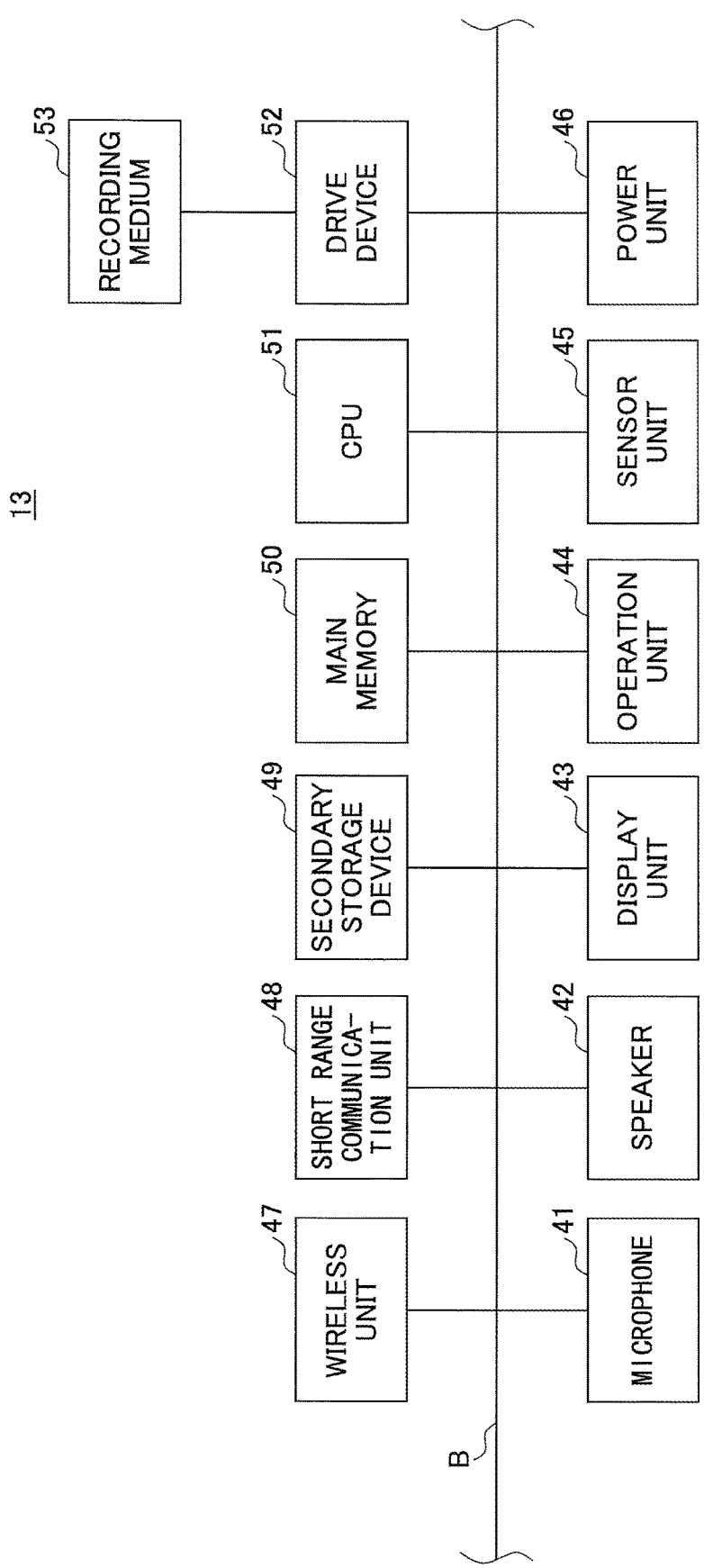
FIG. 3 illustrates an example of a hardware configuration of the terminal device.

Next, a description is given of an example of a hardware configuration of the terminal device 13. FIG. 3 illustrates an example of a hardware configuration of the terminal device 13. In the example of FIG. 3, the terminal device 13 includes a microphone 41, a speaker 42, a display unit 43, an operation unit 44, as sensor unit 45, a power unit 46, a wireless unit 47, a short range communication unit 48, a secondary storage device 49, a main memory 50, a Central Processing Unit (CPU) 51, and a drive device 52, which are interconnected by a system bus B.

The microphone 41 inputs voice sound emitted by a user and other sounds. The speaker 42 outputs the voice sound of an opposite party and outputs a ringtone. The microphone 41 and the speaker 42 may be used for speaking with an opposite party by a call function; however, the present embodiment is not so limited. The microphone 41 and the speaker 42 may be used for inputting and outputting information by sound.

The display unit 43 displays, to the user, a screen set by the OS and various applications. Furthermore, the display unit 43 may be a touch panel display, in which case the display unit 43 has a function of an input output unit.

The display unit 43 is a display such as a Liquid Crystal Display (LCD) and an organic Electro Luminescence (EL) display.

The operation unit 44 is operation buttons displayed on the screen of the display unit 43 and operation buttons provided outside the terminal device 13. The operation buttons may be, for example, a power source button and a volume adjustment button, and operation keys for inputting characters arranged in a predetermined order.

For example, as the user performs a predetermined operation on the screen of the display unit 43, or presses the above operation buttons, a touch position on the screen is detected by the display unit 43. Furthermore, the display unit 43 may display an application execution result, contents, an icon, and a cursor on the screen.

The sensor unit 45 detects an operation at a certain time point or continuous operations, of the terminal device 13. For example, the sensor unit 45 detects the tilt angle, the acceleration, the direction, and the position of the terminal device 13; however, the present embodiment is not so limited. Note that the sensor unit 45 is, for example, a tilt sensor, an acceleration sensor, a gyro sensor, a Global Positioning System (GPS), an geomagnetic sensor, a proximity sensor, an illuminance sensor, a volume sensor, a temperature sensor, a humidity sensor, an air pressure sensor, an infrared light sensor, a walk sensor, an activity meter, a dust sensor, a smoke sensor, a gas sensor, a radiation dosimeter, a shock sensor, a virus sensor, a sodium sensor, and a taste sensor; however, the present embodiment is not so limited.

The power unit 46 supplies power to the elements in the terminal device 13. The power unit 46 is, for example, an internal power source such as a battery; however, the present embodiment is not so limited. The power unit 46 may detect the power amount constantly or at predetermined time intervals, and monitor the remaining power amount.

The wireless unit 47 is, for example, a communication data transmission/reception unit for receiving wireless signals (communication data) from a base station by using an antenna, and sending wireless signals to a base station via the antenna.

The short range communication unit 48 may use, for example, communication methods such as infrared light communication, Wi-Fi (registered trademark), and Bluetooth (registered trademark), to perform short range communication with a computer such as another terminal device 13. The above described wireless unit 47 and the short range communication unit 48 are a communication interface by which data transmission/reception is possible with another computer.

The secondary storage device 49 is a storage unit such as a Hard Disk Drive (HDD) and Solid State Drive (SSD). The secondary storage device 49 stores execution programs (function extension programs) according to the present embodiment and control programs provided in the computer, and performs input and output according to need, based on control signals from the CPU 51. The secondary storage device 49 may read and write information as needed from the stored information, based on control signals from the CPU 51. The secondary storage device 49 is able to read the needed information from the stored information and write information, based on control signals from the CPU 51.

The main memory 50 stores execution programs read from the secondary storage device 49 and stores various kinds of information obtained while executing the programs, according to instructions from the CPU 51. The main memory 50 is, for example, a Read Only Memory (ROM) and a Random Access Memory (RAM).

The CPU 51 realizes the processes in output control, by controlling the processes of the entire computer such as various calculations and input and output of data among the hardware elements, based on control programs such as the Operating System (OS) and execution programs stored in the main memory 50.

Specifically, for example, the CPU 51 executes a program installed in the secondary storage device 49 to perform a process corresponding to the program in the main memory 50, based on an instruction to execute the program obtained from the operation unit 44. For example, the CPU 51 performs processes such as executing a script by the application execution unit 24, arranging, executing, and deleting a plug-in by the extension function plug-in management unit 25, and sending and receiving data by the communication unit 26. The process contents at the CPU 51 are not limited to the above contents. The contents executed by the CPU 51 are stored in the secondary storage device 49 according to need.

The drive device 52 is able to detachably set, for example, a recording medium 53, and read various kinds of information stored in the set recording medium 53 and write various kinds of information in the recording medium 53. The drive device 52 is, for example, a medium loading slot; however, the present embodiment is not so limited.

The recording medium 53 is a computer-readable recording medium for storing execution programs as described above. The recording medium 53 may be a semiconductor memory such as a flash memory. Furthermore, the recording medium 53 may be a portable recording medium such as a USB memory; however, the present embodiment is not so limited.

In the present embodiment, by installing execution programs (for example, a function extension program) in the hardware configuration of the computer main unit described above, the hardware resources and the software collaborate with each other to realize a display process, etc., according to the present embodiment.

Furthermore, for example, the function extension program corresponding to the above display process may be resident in the device, and may be activated according to an activation instruction.

<Overview of Function Extension Process According to First Embodiment>

Figure 4:
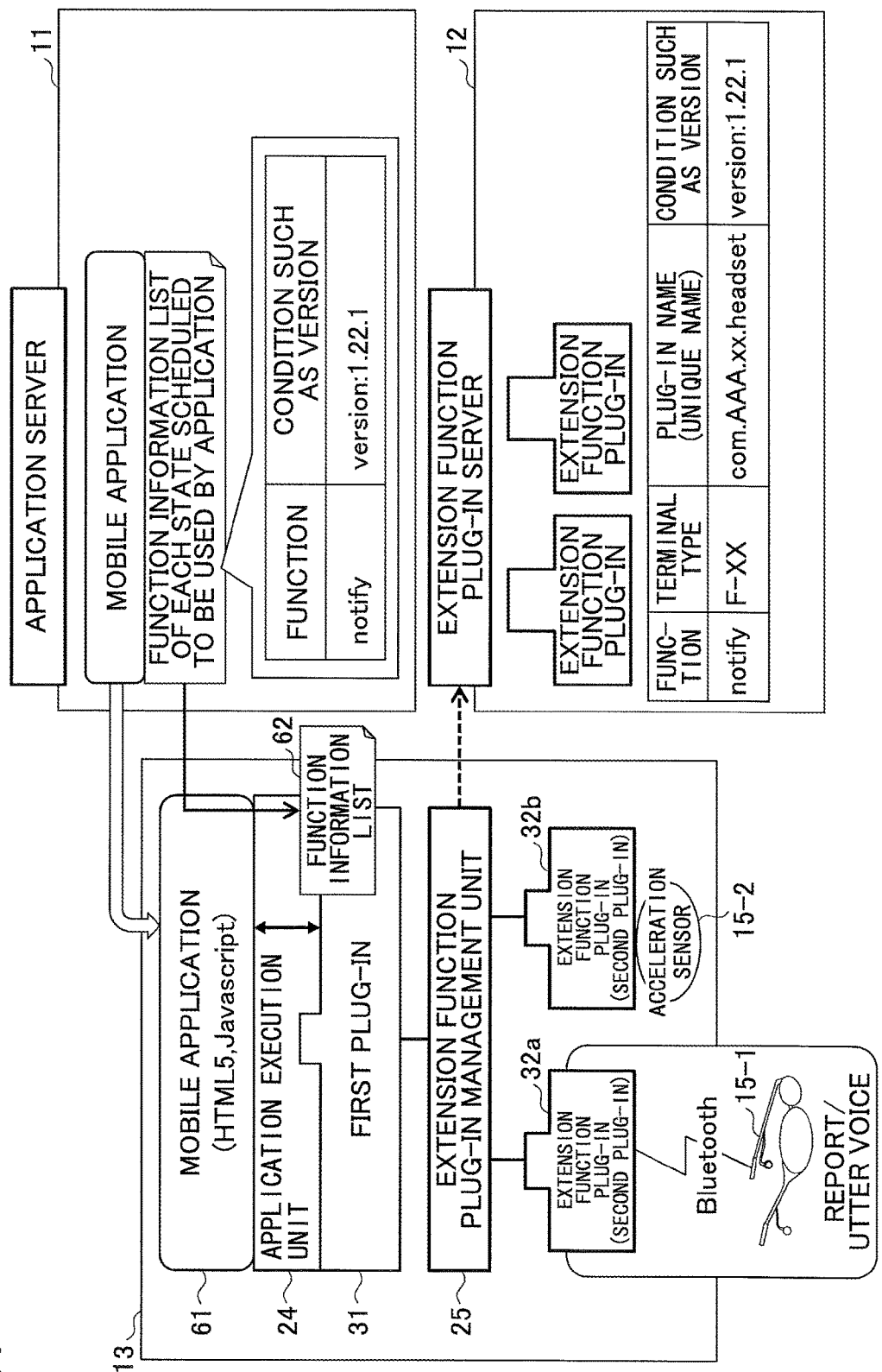
FIG. 4 illustrates an overview of a function extension process according to the first embodiment.

FIG. 4 illustrates an overview of a function extension process according to the first embodiment. In the example of FIG. 4, the process contents of the application server 11, the extension function plug-in server 12, and the terminal device 13 are schematically illustrated.

In the first embodiment, the terminal device 13 includes a mobile application 61 that is an example of an application, the application execution unit 24, the first plug-in 31, the extension function plug-in management unit 25, and the extension function plug-ins (second plug-ins) 32a, 32b. For example, the extension function plug-in 32a is a report function by a display, a speech synthesis function, and an eye gaze detection function, and is connected to the peripheral device 15-1 by Bluetooth (registered trademark). Furthermore, the extension function plug-in 32b is a motion detection function, and is connected to, for example, an acceleration sensor 15-2.

The mobile application 61 is an example of an application developed by using a predetermined programming language such as HTML5 and Javascript, and may be a web application. The mobile application 61 may be acquired from the application server 11, or may be stored in the storage unit 23.

The application execution unit 24 is an example of an application execution environment, and executes the mobile applications described above. The application execution unit 24 is a virtual machine such as a web browser for executing, for example, HTML5 and Javascript programs; however, the present embodiment is not so limited.

In the function extension process according to the first embodiment, it is possible to install or uninstall the needed extension functions, while the application execution unit 24 and other functions (software functions) are operating. Therefore, in the first embodiment, for example, one plug-in (first plug-in 31) is incorporated in advance in the application execution unit 24, and a common interface (IF) is provided to the mobile application 61. Furthermore, the terminal device 13 includes a function of managing the extension function (extension function plug-in management unit 25), and relays the communication between the mobile application 61 and the respective extension functions (extension function plug-ins 32) when installing and uninstalling the extension functions.

For example, the extension function plug-in management unit 25 manages the function in the terminal device 13, which acquires, from the extension function plug-in server 12, the extension function included in a function information list 62 of each state that is scheduled to be used by the mobile application 61 obtained from the application server 11, but that is not installed, and installs the acquired extension function.

For example, the extension function plug-in 32 implements extension for a sensing function in the terminal device 13 or an interface for using the peripheral device 15. Furthermore, for example, the extension function plug-in 32 is an independent application (second plug-in) having a common interface for performing inter-program communication with the extension function plug-in management unit 25 in the terminal device 13.

Note that in the example of FIG. 4, items for the respective models of terminals are provided in the extension function plug-in server 12. This is because there may be the following example with respect to a terminal device manufactured by company A and a terminal device manufactured by company B. Specifically, in the terminal device manufactured by company A, a unique microcomputer is installed, and it is possible to detect walking by processing acceleration sensor data with a program in the installed microcomputer. However, in the terminal device manufactured by company B, there is no microcomputer, and walk detection is executed by a program operating in a CPU of the terminal that processes acceleration sensor data. In this case, the extension function plug-in of company A corresponds to a program for communicating with the microcomputer, and the terminal device of company B corresponds to a program for acquiring a value of the acceleration sensor and processing the value. As described above, the execution contents are different, and therefore different extension function plug-ins are prepared in advance for the respective models of terminals, and an extension function corresponding to the model of the terminal is provided from the extension function plug-in server 12.

<Sequence of Example of Function Extension Process According to First Embodiment>

FIG. 5 illustrates a sequence of an example of a function extension process (when starting application) according to the first embodiment. The example of FIG. 5 indicates a process using the mobile application 61, the application execution unit 24, the application server 11, the first plug-in 31, the extension function plug-in management unit 25, the extension function plug-in (second plug-in) 32, and the extension function plug-in server 12.

In the example of FIG. 5, for example, according to an instruction from the user or by geofencing using a GPS function, an event indicating that the user has entered a certain location (position) acts as a trigger for switching the mobile application 61, and the mobile application 61 is started. The geofencing function is executed as the extension function plug-in (second plug-in) 32, and an event may be issued from the extension function plug-in via the first plug-in 31 to the application execution unit 24. Note that operation of starting the mobile application 61 is not limited to the above; for example, a predetermined operation such as an operation of a screen by the user may be used as the trigger to start the mobile application 61. Note that an event is not only used for starting, stopping, and switching the mobile application 61; the information may be reported to the mobile application 61 and the mobile application 61 may receive and use this. For example, the event may be used for presenting the information relevant to the location where the user has entered.

In the example of FIG. 5, based on state change information indicating that the user has entered a certain location, a switching event of the mobile application 61 is input to the application execution unit 24 (step S01). The application execution unit 24 determines whether the mobile application 61 that is the execution target is in the storage unit 23, and when the mobile application 61 is not in the storage unit 23, the application execution unit 24 makes an application acquisition request to the application server 11 (step S02). The parameter of the acquisition request may be location information (position information); however, the present embodiment is not so limited.

Next, the application execution unit 24 receives, from the application server 11, the complete set of the mobile application 61 (for example, an application and a function information list corresponding to the application) associated with the location information (step S03). Note that when the mobile application 61 is present in the storage unit 23, the application execution unit 24 does not access the application server 11 and acquires the target mobile application 61 from the storage unit 23.

Next, the application execution unit 24 generates an application ID, registers the application ID in the function information list extracted from the complete set of the mobile application 61, and sends the function information list to the first plug-in 31 (step S04). The function information list means, for example, a list of extension functions used by the mobile application 61.

The first plug-in 31 registers the function information list in the extension function plug-in management unit 25 (step S05). The extension function plug-in management unit 25 compares this with a function information list that is already installed described below (installed function information list), and makes an acquisition request to the extension function plug-in server 12 in order to implement extension for a function that is not installed (step S06). Parameters of the acquisition request include the function name, a machine type name, and version information; however, the present embodiment is not so limited. The extension function plug-in management unit 25 receives a set of functions that are not installed from the extension function plug-in server 12 (step S07).

Next, the extension function plug-in management unit 25 installs a function program (extension function plug-in 32) in the terminal device 13 based on the received set of functions that are not installed (step S08), and registers the corresponding plug-in name (unique name) (step S09). In the process of step S09, for example, it is possible to register version information, other than the plug-in name.

Next, the extension function plug-in management unit 25 sends a preparation completion report to the application execution unit 24 (step S10). The application execution unit 24 causes the mobile application 61 corresponding to the extended function, to start a process (step S11).

FIG. 6 illustrates a sequence of an example of a function extension process (while an application is being executed) according to the first embodiment. The example of FIG. 6 indicates a process using the mobile application 61, the application execution unit 24, the first plug-in 31, the extension function plug-in management unit 25, and the extension function plug-in 32.

In the example of FIG. 6, for example, the mobile application 61 calls the first plug-in 31 by a function name and an instruction (step S21). For example, a function name "walk detection" is called by an instruction "walk start event report". The first plug-in 31 generates a call ID, and stores the generated call ID and a callback function (for example, a function that is specified in advance to send a report to the call source when the call destination executes a process and completes a process or when an error occurs, in the program).

Here, the first plug-in 31 calls the extension function plug-in management unit 25 (step S22). The extension function plug-in management unit 25 acquires a plug-in name (unique name) from the function name by refereeing to the function information list 62, and calls the extension function plug-in 32 in the corresponding terminal device 13 (step S23). The extension function plug-in 32 executes a process according to the instruction, and makes a process completion report and issues a state change event (step S24).

Next, the extension function plug-in management unit 25 gives an output to the first plug-in 31 (step S25). The first plug-in 31 identifies a callback function from the call ID, calls the callback function, and outputs information indicating that an event has been issued to the mobile application 61 (step S26). For example, the change in the condition as described above is needed when the application to be executed is switched according to the location and the status of the user.

FIG. 7 illustrates a sequence of an example of a function extension process (when ending application) according to the first embodiment. The example of FIG. 7 indicates a process using the application execution unit 24, the mobile application 61, the first plug-in 31, the extension function plug-in management unit 25, and the extension function plug-in 32. Furthermore, FIG. 7 indicates an example where the end of the mobile application 61 is triggered by an event that occurs when the user moves away (withdraws) from a certain location (position information); however, the trigger of ending the mobile application 61 is not so limited. For example, the event may be a combination condition of the location and time, such as "first period starts in classroom A". Furthermore, the event may be a status that is not limited to a location, such as "start moving by vehicle", which is detected according to the sensor information.

In the example of FIG. 7, when an application switch event, which has occurred by detecting that the user has moved away from a certain location, is input to the application execution unit (step S31), the application execution unit 24 outputs an instruction to stop the application to the mobile application 61 (step S32). The mobile application 61 stops the application according to the instruction, and outputs a report indicating that the stopping of the application has been completed, to the application execution unit 24 (step S33).

The application execution unit 24 outputs, to the first plug-in 31, a request to delete the function information list corresponding to the stopped mobile application 61 (step S34). The parameter of the deletion request is, for example, an application ID; however, the present embodiment is not so limited.

Next, when the first plug-in 31 receives the request to delete the function information list acquired from the application execution unit 24, the first plug-in 31 outputs the contents to the extension function plug-in management unit 25 (step S35). The extension function plug-in management unit 25 performs matching of the deletion of the function information list of the specified application ID, the remaining function information list (remaining list), and the installed function information list, and extracts the unneeded functions. The unneeded functions are, for example, functions that have not been used for more than a predetermined amount of time, or functions that are of old versions; however, the present embodiment is not so limited.

Then, the extension function plug-in management unit 25 calls the unneeded extension function plug-in 32 in the terminal device 13, and uninstalls the unneeded extension function plug-in 32 (step S36). The extension function plug-in management unit 25 deletes, from the installed function information list, the information corresponding to the uninstalled extension function plug-in 32 (step S37). Note that the unneeded extension function plug-in 32 does not need to be uninstalled as described above; the unneeded extension function plug-in 32 may be stored in a stopped state until the unneeded extension function plug-in 32 is to be used again.

In the example of FIG. 7, when deleting the second plug-in 32 corresponding to the peripheral device controlled by the terminal device 13, the second plug-in 32 corresponding to the peripheral device that is the deletion target is deleted, while maintaining the connection relationship between the execution environment of the application and the first plug-in 31.

<Examples of Various Types of Data Applied in First Embodiment>

Figure 8A:
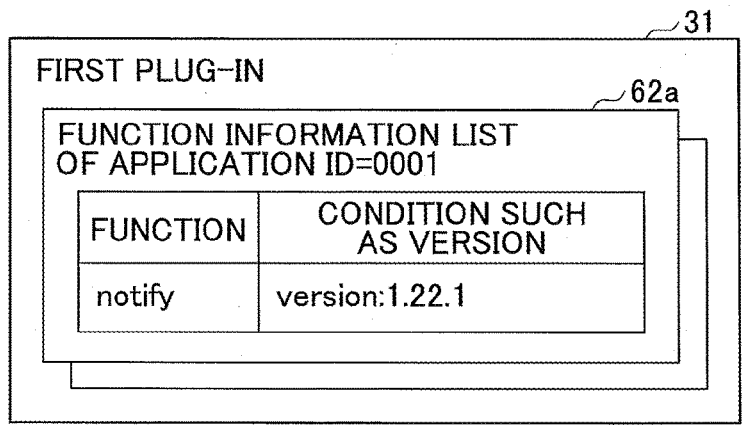
FIGS. 8A and 8B illustrate examples of various types of data applied in the first embodiment.
Figure 8B:
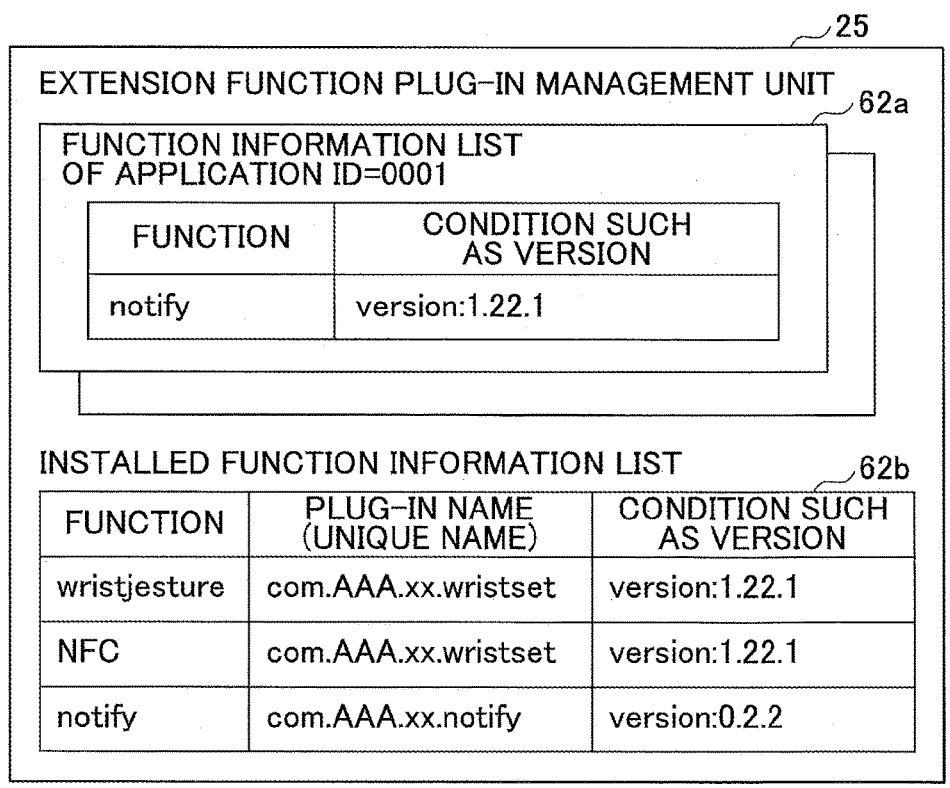

FIGS. 8A and 8B illustrate examples of various types of data applied in the first embodiment. FIG. 8A illustrates a data example managed by the first plug-in 31. FIG. 8B illustrates a data example managed by the extension function plug-in management unit 25.

In the data of the first plug-in 31 illustrated in FIG. 8A, there is a function information list 62a that is used by the mobile application 61 of each application ID. The items of the function information list 62a include, for example, "function" and "condition of version, etc."; however, the present embodiment is not so limited. The "function" item is information for identifying one or more functions used by the corresponding application ID. The "condition of version, etc." item is information indicating various conditions such as the version information of the application, for using the function.

In the data of the extension function plug-in management unit 25 illustrated in FIG. 8B, there is an installed function information list 62b indicating information of the extension function plug-ins 32 that have been installed in the terminal device 13. Furthermore, there is the function information list 62a for each application ID, acquired from the first plug-in 31.

For example, when the application ID=0001 starts the "notify" function, the extension function plug-in 32 corresponding to the "notify" function is installed at the extension function plug-in management unit 25, and as illustrated in FIG. 8B, the plug-in name (unique name) corresponding to extended "notify" function and conditions such as the version information, etc., are registered in the installed function information list 62b. Accordingly, by the application of the application ID=0001, it is possible to execute the installed "notify" function.

Furthermore, in the first embodiment, when the mobile application 61 is ended, for example, the function information list 62a relevant to the application that is the target of the first plug-in 31 illustrated in FIG. 8A is deleted, and the function information list 62a relevant to the application that is the target of the extension function plug-in management unit 25 described above is deleted. Furthermore, the extension function plug-ins of functions, which are not included in any of the function information lists 62a, 62b stored in the extension function plug-in management unit 25, are uninstalled, and are deleted from the installed function information list 62b illustrated in FIG. 8B. For example, the data illustrated in FIGS. 8A and 8B is set for each application ID; however, the present embodiment is not so limited.

As described above, according to the first embodiment, it is possible to install or uninstall the needed extension functions, while the application execution unit 24 and the other functions are operating. Therefore, function extension may be quickly implemented for the application to use a peripheral device.

For example, in the first embodiment, the terminal device 13 includes one first plug-in 31 to be incorporated in the application execution unit 24 in advance, and an extension function plug-in (second plug-in) 32 for executing the extension function, in an OS that is incapable of dynamically loading a library into an execution program. Furthermore, the terminal device 13 manages the install state of the extension function plug-in 32 in the OS, and according to the extension function plug-in management unit 25 that relays the communication between the first plug-in 31 and the extension function plug-in 32, a plurality of the extension functions for extending a function to be provided to a script may be incorporated/removed while the application execution unit 24 is being executed.

Furthermore, in the first embodiment, the terminal device 13 acquires, from an external device such as the application server 11, the mobile application 61 to be executed together with the function information list 62 used by the mobile application 61. Furthermore, when executing the mobile application 61, the extension function plug-in management unit 25 confirms the install status of the extension function plug-in 32 based on the function information list 62, acquires the extension function plug-in 32 that is not installed from an external device such as the extension function plug-in server 12, and installs the acquired extension function plug-in 32. Furthermore, when the execution of the mobile application 61 is ended, the terminal device 13 deletes the corresponding function information list 62 from the extension function plug-in management unit 25, and uninstalls the extension function plug-in 32 that has disappeared from all of the function information lists 62 stored in the extension function plug-in management unit 25.

Accordingly, in the first embodiment, for example, when the user wants to use different extension functions according to the executed application and location, there is no need to stop the application execution unit 24 or replace the application execution unit 24 for each execution program. Furthermore, in the first embodiment, it is possible to perform the operation of switching the application according to the sensor process information such as the location, and providing a service according to the state of the terminal device 13 at that time, in a seamless manner.

<Example of Schematic Configuration of Function Extension System According to Second Embodiment>

Next, a description is given of a second embodiment. FIG. 9 illustrates an example of a schematic configuration of a function extension system according to the second embodiment. Note that in a function extension system 10' of FIG. 9, the same elements as those of the function extension system 10 according to the first embodiment described above, are denoted by the same reference numerals and specific descriptions are omitted.

The function extension system 10' illustrated in FIG. 9 includes an application server 11', an extension function plug-in server 12', one or more terminal devices 13'-1 through 13'-*n* (hereinafter, referred to as "terminal device 13'" according to need), one or more servers 16-1 through 16-*n* (hereinafter, referred to as "server 16" according to need), and an extension function plug-in management device 17. The application server 11', the extension function plug-in server 12', the terminal device 13', the server 16, and the extension function plug-in management device 17 are connected to each other in a state where data may be transmitted/received, by a communication network 14.

The application server 11' stores a set of mobile applications used by for example, the terminal device 13'. Furthermore, the application server 11' may also manage sets of mobile applications that may be respectively used in predetermined states such as locations and function information lists that may be respectively used in predetermined states such as locations. For example, the application server 11' includes one or more applications that may be executed according to the predetermined states such as locations. The application server 11' distributes an application corresponding to a request to the terminal device 13' via the communication network 14, in response to a request to acquire an application and other information from the terminal device 13'.

Note that the mobile application according to the present embodiment need not use only one peripheral device 15, one peripheral device 15', and one server 16; the mobile application may become a single useful mobile application by using a plurality of the peripheral devices 15, a plurality of the peripheral devices 15', and a plurality of the servers 16. For example, a mobile application may use a "mail server" and a "light", which are examples of a server 16 and a peripheral device 15 in a certain environment, to turn on the light when a mail message has arrived; however, the present embodiment is not so limited.

The extension function plug-in management device 17 connects to the first plug-in 31 of the terminal device 13' via the network, arranges an extension function plug-in (the second plug-in 32 described above, or a third plug-in described below), such that the extension function plug-in may be used from the terminal device 13'.

For example, the extension function plug-in server 12' stores an extension function plug-in that is set in advance (the second plug-in 32 described above, or a third plug-in described below). For example, the extension function plug-in server 12' stores extension function plug-ins with respect to one or more peripheral devices (for example, sensors) 15'-1 through 15'-*n* (hereinafter, also referred to as a "peripheral device 15'" according to need) to which the extension function plug-in management device 17 is connected, or the server 16. The extension function plug-in server 12' distributes, to the extension function plug-in management device 17 via the communication network 14, a corresponding function in response to a request to acquire a function from the extension function plug-in management device 17.

For example, the application server 11', the extension function plug-in server 12', the server 16, and the extension function plug-in management device 17 may be PCs, and may be a cloud server constituted by cloud computing including one or more information processing devices; however, the present embodiment is not so limited.

When the terminal device 13' implements connection control on the peripheral device 15' or the server 16 from an application, a first plug-in 31, which is common regardless of the type of the peripheral device 15 or the server 16, is incorporated in advance in the application execution unit 24 that executes the mobile application. Furthermore, the terminal device 13' instructs the extension function plug-in management device 17 to arrange a second plug-in 32 which is an extension function plug-in storing programs for controlling peripheral devices 15' or servers 16, or a third plug-in which is an extension function plug-in storing programs for controlling servers, and connects the extension function plug-in to an execution environment of an application via the first plug-in 31 and the extension function plug-in management device 17.

The terminal device 13' connects, to the application execution unit 24 via the extension function plug-in management device 17, an extension function plug-in for connecting and using the peripheral device 15' or the server 16, and uses the peripheral device 15' or the server 16. Furthermore, when the function needed for using the peripheral device 15' or the server 16 is not available, the extension function plug-in management device 17 requests the extension function plug-in server 12' for the needed function and acquires the corresponding function.

When adding another peripheral device 15' or another server 16, the terminal device 13' instructs the extension function plug-in management device 17 to arrange an extension function plug-in corresponding to the other peripheral device 15' or the other server 16, and connects to the execution environment of the application via the first plug-in. Furthermore, when deleting the extension function plug-in controlling the peripheral device 15' or the server 16, the terminal device 13' instructs the extension function plug-in management device 17 to delete the extension function plug-in corresponding to the peripheral device 15' or the server 16 to be deleted, while maintaining the connection relationship between the execution environment of the application and the first plug-in 31. Accordingly, the terminal device 13' is able to quickly implement function extension for the mobile application to use the peripheral device 15' or the server 16.

The server 16 is, for example, another system such as a mail server or a news server; however, the present embodiment is not so limited. In the second embodiment, the extension function plug-in (third plug-in) is, for example, a function for detecting and reporting a change in another system such as the server 16; however, the present embodiment is not so limited. For example, the extension function plug-in (third plug-in) may have a function of issuing at least one item of report information from the server 16, such as a new mail message has arrived at the mail server and a new news item has arrived at the news server. The server 16 implements various kinds of control by applications, in the application execution unit of the terminal device 13' via the extension function plug-in (third plug-in).

In the second embodiment, for example, it is assumed that the user moves while holding the terminal device 13', and that the peripheral device 15' or the server 16 is used at various locations. In this case, the peripheral device 15 or the server 16 that is possible to be used differs according to the location, and accordingly, the connection interface with the peripheral device 15' or the server 16 differs. In this case, conventionally, there has been need to prepare a set of an application, an application execution program, and a plug-in, corresponding to the respective locations.

However, in the second embodiment, for example, for each state such as the predetermined location such as a conference room A, a function (a function depending on the state such as the location) of operating the peripheral device 15' belonging to the location and a function of controlling the server 16, are open to the public in the communication network 14 by preparing, at the extension function plug-in management unit, the same interface as the functions in the terminal device 13 described in the first embodiment. Note that in the second embodiment, a process executed according to the extension function plug-in management unit 25 in the first embodiment, is executed by an (in-terminal) extension function plug-in management unit, and the process that is the same as that executed by the extension function plug-in management unit 25 in the communication network 14 is executed by the (in-network) extension function plug-in management unit.

For example, the (in-network) extension function plug-in management unit is provided in the extension function plug-in management device 17 such as an external device (PC) at the location, and the peripheral device 15 or the server 16 belonging to a state such as a location is connected to the application server 11' and the external device. Note that the extension function plug-in management device 17, the server 16, the application server 11', and the extension function plug-in server 12' may be a single external device (PC). Furthermore, the control of the peripheral device 15' or the server 16 belonging to a state such as a location is executed by a mobile application, etc., from the terminal device 13' via the (in-network) extension function plug-in management unit.

As described above, in the second embodiment, the terminal device 13' connects the first plug-in 31 common to one or more servers 16, to an execution environment of an application for controlling one or more servers 16, and arranges third plug-ins corresponding to the respective servers 16 to be connected to the execution environment of the application via a first plug-in 31. Furthermore, when adding another server controlled by the terminal device 13', the third plug-in corresponding to another server is connected to the execution environment of an application via the extension function plug-in management device 17 and the first plug-in 31, while maintaining the connection relationship between the execution environment of an application and the first plug-in 31.

Furthermore, when deleting the third plug-in corresponding to the server 16 controlled by the terminal device 13', the third plug-in corresponding to the server that is the deletion target is deleted, while maintaining the connection relationship between the execution environment of an application and the first plug-in 31.

Furthermore, as described above, in the second embodiment, the terminal device 13' connects a first plug-in 31 common to the peripheral device 15' and the server 16 to the execution environment of an application for controlling one or more peripheral devices 15'. Furthermore, the terminal device 13' arranges second plug-ins 32 corresponding to respective peripheral devices 15' or third plug-ins corresponding to respective servers 16 to be connected to the execution environment of an application via the extension function plug-in management device 17 and the first plug-in 31. Furthermore, when adding another peripheral device 15 controlled by the terminal device 13', a second plug-in 32 corresponding to the other peripheral device 15 is connected to the execution environment of an application via the extension function plug-in management device 17 and the first plug-in 31, while maintaining the connection relationship between the execution environment of an application and the first plug-in 31.

Furthermore, when deleting a third plug-in corresponding to the peripheral device 15' controlled by the terminal device 13', or when deleting a third plug-in corresponding to the server 16, the second plug-in 32 corresponding to the server that is the deletion target is deleted, while maintaining the connection relationship between the execution environment of an application and the first plug-in 31.

<Example of Functional Configuration of Terminal Device 13' According to Second Embodiment>

Figure 10:
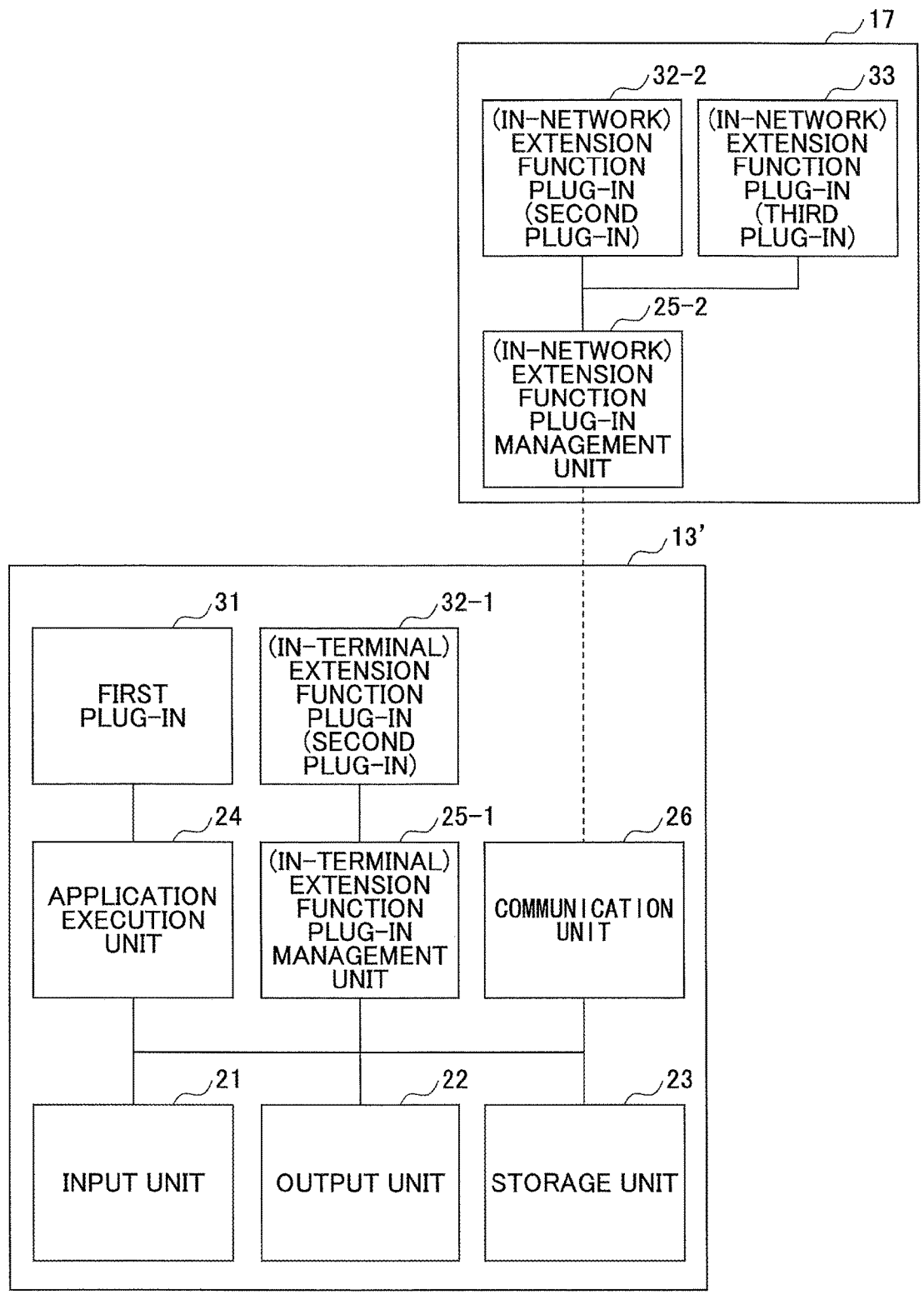
FIG. 10 illustrates an example of the functional configuration of the terminal device according to the second embodiment.

FIG. 10 illustrates an example of the functional configuration of the terminal device 13' according to the second embodiment. Note that in the following description, the parts that are different from those of the terminal device 13 according to the first embodiment are specifically described. Furthermore, in the terminal device 13' of FIG. 10, the same elements as those of the terminal device 13 according to the first embodiment described above with reference to FIG. 2, are denoted by the same reference numerals and specific descriptions are omitted.

The terminal device 13' illustrated in FIG. 10 includes an input unit 21, an output unit 22, a storage unit 23, an application execution unit 24, an (in-terminal) extension function plug-in management unit 25-1, and a communication unit 26. In the second embodiment, when the terminal device 13' enters a predetermined location, and an application switch event occurs according to the position information, the application execution unit 24 acquires a mobile application from the application server 11' and acquires a function information list corresponding to the mobile application. In this case, for example, the application execution unit 24 sends location information to the application server 11' and acquires a mobile application corresponding to the location.

The application execution unit 24 passes extension function information (for example, the function information list 62) to the above described (in-terminal) extension function plug-in management unit 25-1 and the (in-network) extension function plug-in management unit 25-2. Furthermore, the application execution unit 24 relays the communication between the (in-terminal) extension function plug-in management unit 25-1 and the (in-network) extension function plug-in management unit 25-2, and the application. Here, the (in-terminal) extension function plug-in management unit 25-1 acquires an (in-terminal) extension function plug-in (second plug-in) 32-1 from the extension function plug-in server 12' based on the function information list, and installs and uninstalls the plug-in. Furthermore, the (in-terminal) extension function plug-in management unit 25-1 relays the communication between the first plug-in 31 and the (in-terminal) extension function plug-in (second plug-in) 32-1 (for example, a call from the application or an event to the application).

Furthermore, the (in-network) extension function plug-in management unit 25-2 receives the function information list 62 ("the function information list 62 of a predetermined state", which is a list of functions in a predetermined state of the location) sent from the communication unit 26 of the terminal device 13'. Furthermore, the (in-network) extension function plug-in management unit 25-2 acquires, from the extension function plug-in server 12' via the communication network 14, the (in-network) extension function plug-in (second plug-in) 32-2 or an extension function plug-in (third plug-in) 33 registered for each location based on the received function information list 62, and arranges the plug-ins in predetermined devices. Furthermore, the (in-network) extension function plug-in management unit 25-2 relays the communication between the first plug-in 31 and the (in-network) extension function plug-in (second plug-in) 32-2 (for example, a call from the application or an event to the application), or the communication between the first plug-in 31 and the extension function plug-in (third plug-in) 33. When the execution preparation is completed by installing a plug-in, the application execution unit 24 executes the application.

Note that when adding another peripheral device 15 controlled by the terminal device 13', the (in-terminal) extension function plug-in management unit 25-1 arranges the (in-terminal) extension function plug-in 32-1 corresponding to another peripheral device 15 to be connected to the execution environment of an application via the first plug-in 31, while maintaining the connection relationship between the execution environment of an application and the first plug-in 31. Furthermore, when deleting the (in-terminal) extension function plug-in 32-1 controlling the peripheral device 15 controlled by the terminal device 13', the (in-terminal) extension function plug-in management unit 25-1 deletes the (in-terminal) extension function plug-in 32-1 corresponding to the peripheral device 15 to be deleted, while maintaining the connection relationship between the execution environment of an application and the first plug-in 31.

Furthermore, similar to the (in-terminal) extension function plug-in management unit 25-1, the (in-network) extension function plug-in management unit 25-2 also adds or deletes the (in-network) extension function plug-in (second plug-in) 32-2 or the (in-network) extension function plug-in (third plug-in) 33 corresponding to the peripheral device 15' or the server 16, while maintaining the connection relationship between the execution environment of an application and the first plug-in 31.

Furthermore, the extension function plug-ins 32-1, 32-2 do not only control the peripheral device 15', but may also acquire information such as "approaching so and so", by processing sensor information obtained from the peripheral device 15'. In this case, the extension function plug-ins 32-1, 32-2 issue an event when a condition of a location is satisfied, such as "at certain location".

Furthermore, the extension function plug-in 33 may be a plug-in for reporting the change of the server 16 to the application. In this case, for example, the extension function plug-in 33 issues an event when a new mail message has arrived.

The application execution unit 24 described above executes a corresponding mobile application based on an event, and when there is no corresponding mobile application, the application execution unit 24 acquires a mobile application from the application server 11'.

The communication unit 26 accesses the application server 11', the extension function plug-in server 12', the terminal device 13', and other external devices via the communication network 14, to transmit/receive data. Furthermore, the communication unit 26 according to the second embodiment performs communication with the (in-network) extension function plug-in management unit 25-2.

In the second embodiment, the first plug-in 31 acquires a function information list describing functions used by a mobile application executed by the application execution unit 24. When a function, by which the peripheral device 15 or the peripheral device 15' may be used from the acquired function information list, is not in the device of the network, the first plug-in 31 instructs the (in-terminal) extension function plug-in management unit 25-1 or the (in-network) extension function plug-in management unit 25-2 to select and acquire, from the terminal or the network, a second plug-in corresponding to the peripheral device 15 or the peripheral device 15'.

<Overview of Function Extension Process According to Second Embodiment>

Figure 11:
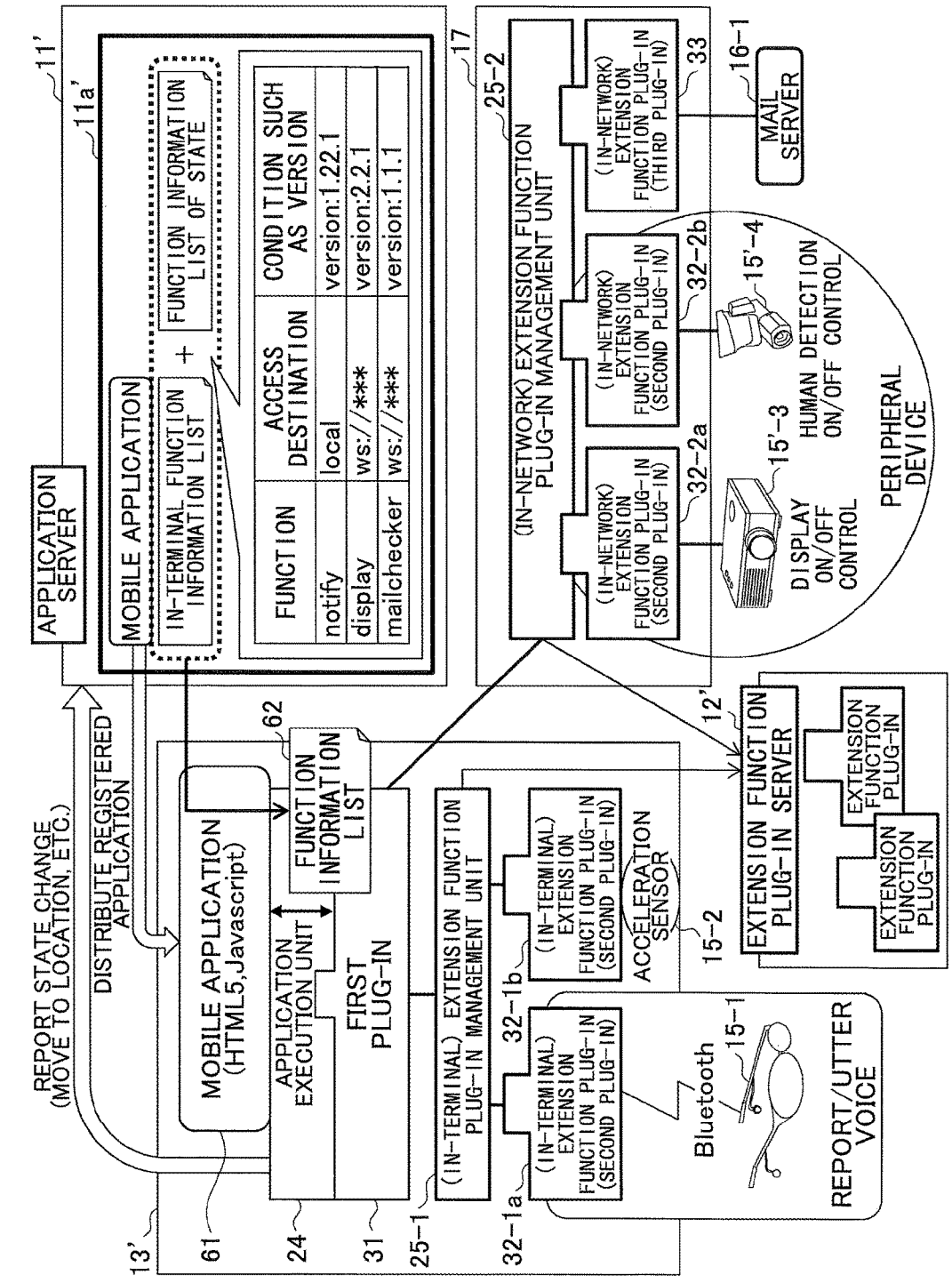
FIG. 11 illustrates an overview of a function extension process according to the second embodiment.

FIG. 11 illustrates an overview of a function extension process according to the second embodiment. As described above, the second embodiment includes the (in-terminal) extension function plug-in management unit 25-1 and the (in-network) extension function plug-in management unit 25-2 executed in the communication network 14.

In the second embodiment, for example, the (in-network) extension function plug-in management unit 25-2 is provided in the extension function plug-in management device 17 such as an external device (PC) at the location. The peripheral device 15' or the server 16 is, for example, connected to an external device such as the extension function plug-in management device 17. Furthermore, the control of the peripheral devices 15'-3, 15'-4 belonging to a predetermined state such as the location or the mail server 16-1, is executed by the mobile application 61 of the terminal device 13' via the (in-network) extension function plug-in management unit 25-2.

In the second embodiment, when the terminal device 13' reports the location information, the application server 11' of each state such as the reported location information (position information), combines the in-terminal function information list with the function information list of the state to form the function information list 62, and distributes the function information list 62 to the terminal device 13'. Note that the application server 11' may define the application and a function information list 11a' to be used by the application, for each state.

In the terminal device 13', the first plug-in 31 implements function management, and refers to the function information list 62, so that the functions may be used from the mobile application 61. For example, in the second embodiment, items indicating the access destinations of the functions are provided in the function information list 62, and it is possible to set whether the access destination of the target function is in the terminal (for example, "local"), or in the network (for example, "ws://***"). Note that in the setting with respect to "in the network", for example, when accessing the destination by the http protocol, a URL is set; however, the present embodiment is not so limited.

Furthermore, the first plug-in 31 receives the function information list 62, and divides the information into function information in the terminal and function information in the network. The function information relevant to the access destination of in the terminal (local) is sent to the (in-terminal) extension function plug-in management unit 25-1. The function information relevant to the access destination other than in the terminal is sent to the (in-network) extension function plug-in management unit 25-2.

The (in-terminal) extension function plug-in management unit 25-1 includes the (in-terminal) extension function plug-ins (second plug-ins) 32-1*a*, 32-1*b*, and the extension function plug-ins 32-1*a*, 32-1*b* have the same functions as those of the extension function plug-ins 32*a*, 32*b* according to the first embodiment.

In the second embodiment, as illustrated in FIG. 11, the function information list 62 includes information of a function (for example, a display function (ON/OFF control) and a human detection function (ON/OFF control)), provided by the (in-network) extension function plug-ins (second plug-ins) 32-2*a*, 32-2*b* belonging to a predetermined state such as the location. Furthermore, as illustrated in FIG. 11, the function information list 62 includes information of a function provided by the (in-network) extension function plug-in (third plug-in) 33 that detects and reports a change of another system such as the mail server 16-1. The function provided by the (in-network) extension function plug-in (third plug-in) 33 is, for example, a mail checker function and a newly arriving news checker function; however, the present embodiment is not so limited.

The (in-network) extension function plug-in management unit 25-2 acquires the (in-network) extension function plug-ins (second plug-ins) 32-2*a*, 32-2*b* from the extension function plug-in server 12'. Furthermore, the (in-network) extension function plug-in management unit 25-2 acquires the (in-network) extension function plug-in (third plug-in) 33 from the extension function plug-in server 12'. Accordingly, the terminal device 13' is able to use appropriate functions according to the location, such as the display function, the person detection function, and the mail check function illustrated in FIG. 11, by adding the (in-network) extension function plug-ins (second plug-ins) 32-2*a*, 32-2*b*, 33 to the (in-network) extension function plug-in management unit 25-2. Note that as for the hardware configuration of the terminal device 13', the same configuration as that of the terminal device 13 of the first embodiment may be used, and therefore a description thereof is omitted.

<Sequence of Example of Function Extension Process According to Second Embodiment>

FIG. 12 illustrates a sequence of an example of a function extension process (when starting application) according to the second embodiment. The example of FIG. 12 indicates a process using the mobile application 61, the application execution unit 24, the application server 11', the first plug-in 31, the extension function plug-in management unit 25, the (in-terminal) extension function plug-in 32-1, the (in-network) extension function plug-in (third plug-in) 33, the extension function plug-in server 12', and the server 16. Furthermore, as the extension function plug-in management unit 25, there is the (in-terminal) extension function plug-in management unit 25-1 and the (in-network) extension function plug-in management unit 25-2 which is provided in a device connected to a peripheral device belonging to a predetermined state such as a location.

In the example of FIG. 12, similar to the first embodiment, according to an instruction from the user or by, for example, geofencing using a GPS function, a state change event indicating that the user has entered a certain location (position) acts as a trigger of switching the application, and the mobile application is started.

In the example of FIG. 12, based on position information when the user has entered a certain location, a state change event such as a location event is input to the application execution unit 24 (step S41). The application execution unit 24 determines whether the mobile application that is the execution target is in the storage unit 23, and when the mobile application is not in the storage unit 23, the application execution unit 24 makes a mobile application acquisition request to the application server 11' (step S42). The parameter of the acquisition request may be location information (position information); however, the present embodiment is not so limited.

Next, the application execution unit 24 receives, from the application server 11', the complete set of the mobile application associated with the present state information such as the location (step S43). Note that when the mobile application is present in the storage unit 23, the application execution unit 24 does not access the application server 11' and acquires the target mobile application from the storage unit 23. Next, the application execution unit 24 generates an application ID, adds the application ID to the function information list 62 extracted from the complete set of the mobile application, and sends the function information list 62 to the first plug-in 31 (step S44).

The first plug-in 31 extracts the function information list whose access destination is inside the terminal device 13' (local), and registers the function information list in the (in-terminal) extension function plug-in management unit 25-1 (step S45). Furthermore, the first plug-in 31 extracts the function information list whose access destination is outside the terminal device 13' (in network), and registers the function information list in the (in-network) extension function plug-in management unit 25-2 (step S46).

The (in-terminal) extension function plug-in management unit 25-1 compares the function information list with the installed function information list 62, and requests the extension function plug-in server 12' to acquire a function that is not installed (step S47). Parameters of the acquisition request include the function name, a machine type name, and version information; however, the present embodiment is not so limited. The (in-terminal) extension function plug-in management unit 25-1 receives a complete set of extension function plug-ins that are not installed from the extension function plug-in server 12' (step S48).

Furthermore, the (in-network) extension function plug-in management unit 25-2 compares the function information list with the installed function information list 62, and requests the extension function plug-in server 12' to acquire a function that is not installed (step S49). Parameters of the acquisition request include the function name, a machine type name, and version information, as described above. The (in-network) extension function plug-in management unit 25-2 receives a complete set of functions that are not installed from the extension function plug-in server 12' (step S50).

Next, the (in-terminal) extension function plug-in management unit 25-1 installs the (in-terminal) extension function plug-in 32-1 (step S51), and registers the corresponding plug-in name (unique name) (step S52). Similarly, the (in-network) extension function plug-in management unit 25-2 installs the (in-network) extension function plug-in (second plug-in) 32-2 or the (in-network) extension function plug-in (third plug-in) 33 in a device in which the (in-network) extension function plug-in management unit 25-2 is provided (step S53). In FIG. 12, as an example of the process of step S53, the (in-network) extension function plug-in (third plug-in) 33 is installed. The (in-network) extension function plug-in (third plug-in) 33 makes an access confirmation to the server 16 to be checked (step S54), and when access authorization is received from the server 16 (step S55), the (in-network) extension function plug-in (third plug-in) 33 registers the corresponding plug-in name (unique name) (step S56).

Next, the (in-terminal) extension function plug-in management unit 25-1 and the (in-network) extension function plug-in management unit 25-2 both send a preparation completion report to the application execution unit 24 (steps S57, S58). The application execution unit 24 causes the mobile application 61 corresponding to the extended function, to start a process (step S59).

Note that among the processes performed by the (in-terminal) extension function plug-in management unit 25-1 and the (in-network) extension function plug-in management unit 25-2, only one of these processes may be performed.

FIG. 13 illustrates a sequence of an example of a function extension process (while a mobile application is being executed) according to the second embodiment. The example of FIG. 13 indicates a process using the mobile application 61, the application execution unit 24, the first plug-in 31, the extension function plug-in management unit 25 (the (in-terminal) extension function plug-in management unit 25-1 and the (in-network) extension function plug-in management unit 25-2), the (in-terminal) extension function plug-in 32-1, and the (in-network) extension function plug-in (third plug-in) 33.

In the example of FIG. 13, for example, the mobile application 61 calls the first plug-in 31 by a function name and an instruction (step S61). For example, a function name "walk detection" is called by an instruction "walk start event report". The first plug-in 31 generates a call ID, stores the callback function, etc., and refers to the function information list.

Here, when the access destination of the function is inside the terminal device 13' (local), the first plug-in 31 calls the (in-terminal) extension function plug-in management unit 25-1 (step S62). The (in-terminal) extension function plug-in management unit 25-1 refers to the plug-in name (unique name), and calls a corresponding (in-terminal) extension function plug-in (step S63). The (in-terminal) extension function plug-in 32-1 executes a process according to the instruction, and makes a process completion report and issues a state change event (step S64).

Next, the (in-terminal) extension function plug-in management unit 25-1 gives an output to the first plug-in 31 (step S65). The first plug-in 31 identifies a callback function from the call ID, calls the callback function, and gives an output to the mobile application 61 (step S66).

Furthermore, when the access destination of the function is outside the terminal device 13' (address in network), the first plug-in 31 calls the (in-network) extension function plug-in management unit 25-2 (step S67). The (in-network) extension function plug-in management unit 25-2 refers to the plug-in name (unique name), and calls a corresponding (in-network) extension function plug-in (second plug-in) 32-2 or the (in-network) extension function plug-in (third plug-in) 33 (step S68). In FIG. 13, as an example of the process of step S68, the (in-network) extension function plug-in (third plug-in) 33 is called.

The (in-network) extension function plug-in (third plug-in) 33 accesses the server 16 that is a check target by, for example, calling the server 16, and confirms the updated information (step S69), receives the confirmation result (step S70), and issues a state change event (step S71).

Next, the (in-network) extension function plug-in management unit 25-2 gives an output to the first plug-in 31 (step S72). The first plug-in 31 identifies a callback function from the call ID, calls the callback function, and gives an output to the mobile application 61 by the callback function (step S73). Accordingly, the application execution unit 24 is able to recognize the state change.

FIG. 14 illustrates a sequence of an example of a function extension process (when ending application) according to the second embodiment. The example of FIG. 14 indicates a process using the application execution unit 24, the mobile application 61, the first plug-in 31, the extension function plug-in management unit 25 (the (in-terminal) extension function plug-in management unit 25-1 and the (in-network) extension function plug-in management unit 25-2), the (in-terminal) extension function plug-in 32-1, and the (in-network) extension function plug-in (third plug-in) 33. Furthermore, similar to the first embodiment, FIG. 14 indicates an example where the end of the mobile application 61 is triggered by an event that occurs when the user moves away (withdraws) from a certain location (position information).

In the example of FIG. 14, when a mobile application switch event, which has occurred by detecting that the user has moved away from a certain location, is input to the application execution unit (step S81), the application execution unit 24 outputs an instruction to stop the application to the mobile application 61 (step S82). The mobile application 61 stops the application according to the instruction, and outputs a report indicating that the stopping of the application has been completed, to the application execution unit 24 (step S83).

The application execution unit 24 outputs, to the first plug-in 31, a request to delete the function information list (step S84). The parameter at the time of the deletion request is, for example, an application ID; however, the present embodiment is not so limited.

Next, when the first plug-in 31 receives the request to delete the function information list acquired from the application execution unit 24, the first plug-in 31 outputs the contents to the (in-terminal) extension function plug-in management unit 25-1 (step S85). The (in-terminal) extension function plug-in management unit 25-1 deletes the function information list 62a of the specified application ID, matches the remaining function information list 62a with the installed function information list 62b, and extracts the unneeded functions. Then, the (in-terminal) extension function plug-in management unit 25-1 uninstalls the unneeded (in-terminal) extension function plug-in 32-1 in the terminal device 13 (step S86).

When the unneeded (in-terminal) extension function plug-in 32-1 is uninstalled, the (in-terminal) extension function plug-in 32-1 causes the plug-in name (unique name) corresponding to the (in-terminal) extension function plug-in 32-1 to be deleted from the installed function information list 62b of the (in-terminal) extension function plug-in management unit 25-1 (step S87).

Furthermore, the first plug-in 31 also requests the (in-network) extension function plug-in management unit 25-2 to delete the function information list of the specified application ID (step S88), and the (in-network) extension function plug-in management unit 25-2 deletes the function information list 62a of the specified application ID, and matches the remaining function information list 62a with an installed function information list 62c. Then, the (in-network) extension function plug-in management unit 25-2 extracts the unneeded functions, and uninstalls the unneeded (in-network) extension function plug-in (second plug-in) 32-2 or the (in-network) extension function plug-in (third plug-in) 33 in the network (step S89). In FIG. 14, as an example of the process of step S89, the (in-network) extension function plug-in (third plug-in) 33 is uninstalled.

When the unneeded (in-network) extension function plug-in (second plug-in) 32-2 or the (in-network) extension function plug-in (third plug-in) 33 is uninstalled, the (in-network) extension function plug-in (second plug-in) 32-2 causes the plug-in name (unique name) corresponding to the (in-network) extension function plug-in (second plug-in) 32-2 or the (in-network) extension function plug-in (third plug-in) 33 to be deleted from the installed function information list 62c of the (in-network) extension function plug-in management unit 25-2 (step S90).

<Examples of Various Types of Data Applied in Second Embodiment>

FIGS. 15A through 15C illustrate examples of various types of data applied in the second embodiment. FIG. 15A illustrates a data example managed by the first plug-in 31. FIG. 15B illustrates a data example managed by the (in-terminal) extension function plug-in management unit 25-1. FIG. 15C illustrates a data example managed by the (in-network) extension function plug-in management unit 25-2.

In the data of the first plug-in 31 illustrated in FIG. 15A, there is a function information list 62a for each application ID. As described above, the items of the function information list 62a include, for example, "function", "access destination", and "condition of version, etc."; however, the present embodiment is not so limited. In the example of FIG. 15A, for example, when the application ID=0001 starts the "notify" function, this function is installed at the (in-terminal) extension function plug-in management unit 25-1, and as illustrated in FIG. 15B, the plug-in name (unique name) corresponding to this function and conditions such as the version information, etc., are registered. Here, the "access destination" is, for example, an address of the (in-network) extension function plug-in management unit 25-2.

Furthermore, for example, when starting the "display" function that is used by the application ID=0001, but the "display" function is not included in the installed function information list 62c at the (in-network) extension function plug-in management unit 25-2, the (in-network) extension function plug-in management unit 25-2 acquires an extension function plug-in of this function from the extension function plug-in server 12', and installs the acquired extension function plug-in. Then, as illustrated in FIG. 15C, the plug-in name (unique name) and conditions such as the version information corresponding to this function are registered. Accordingly, by the mobile application 61 of the application ID=0001, it is possible to execute the installed functions.

Furthermore, in the second embodiment, when ending the mobile application, for example, the function information list 62a relevant to the target mobile application of the first plug-in 31 illustrated in FIG. 15A, is deleted. Furthermore, the function information list 62a relevant to the target mobile application is deleted from the above-described (in-terminal) extension function plug-in management unit 25-1 or the (in-network) extension function plug-in management unit 25-2. Furthermore, the extension function plug-in of the function, which is not included in any of the function information lists 62a, 62b stored by the (in-terminal) extension function plug-in management unit 25-1, is uninstalled from the terminal device 13', and is deleted from the installed function information list 62b illustrated in FIG. 15B.

Furthermore, the extension function plug-in of the function, which is not included in any of the function information lists 62a, 62c stored by the (in-network) extension function plug-in management unit 25-2, is uninstalled, and is deleted from the installed function information list 62c illustrated in FIG. 15C.

Note that the data items illustrated in FIGS. 15A through 15C are set for, for example, each application ID; however, the present embodiment is not so limited.

As described above, according to the second embodiment, management of the extension function plug-in for each state may be appropriately realized. Furthermore, in the above-described first and second embodiments, there is no need to replace the execution environment for function extension. Furthermore, according to the second embodiment, for example, with respect to the same mobile application, different extension function plug-ins are automatically installed, and the extension function plug-ins may be combined to execute a process. Furthermore, it is possible to change how to select the extension function plug-in realizing a process, according to the terminal machine type executing the mobile application or the location.

Furthermore, in the above-described first and second embodiments, the terminal device 13 (13') is able to automatically read the needed functions, and therefore the function extension may be quickly implemented for the mobile application to use a sensor and a peripheral device.

Third Embodiment

Next, a description is given of a third embodiment. In the second embodiment described above, a "function information list for the state" that may be used in the state is prepared in advance in the application server 11', and for example, the (in-network) extension function plug-in management unit 25-2 executes and manages the corresponding extension function plug-in based on the information sent from the first plug-in. In the third embodiment, a function information list that may be used is stored and updated, which may be used by dynamically detecting the surrounding functions without specifying the access destination from the server. A function information list that may be used means an installed function information list and a detecting function information list, and these lists are referred to for using a function corresponding to the mobile application.

Specifically, in the third embodiment, there is no need for the extension function plug-in management device 17 for managing an extension function plug-in outside the terminal. In the third embodiment, an (outside-terminal) extension function plug-in is provided in the terminal device 13", and the (outside-terminal) extension function plug-in broadcasts the function information of itself at periodic timings or upon receiving a broadcast request.

Furthermore, in the third embodiment, an (outside-terminal) extension function plug-in management unit is provided in the terminal device 13", which implements management of receiving a broadcast, acquiring function information, and updating the detecting function information list. The detecting function information list is for managing, for example, a function name, a unique name, information such as the version, and the latest detection time. Furthermore, the (outside-terminal) extension function plug-in management unit deletes, from the detecting function information list, an (outside-terminal) extension function plug-in that is not detected for a certain time period or an (outside-terminal) extension function plug-in with which communication has become disabled during usage.

Similar to the (in-terminal) extension function plug-in management unit 25-1, by the (outside-terminal) extension function plug-in management unit, the mobile application is able to use an extension function plug-in that has been detected by broadcast communication, while maintaining the connection relationship between the application execution unit and the first plug-in 31. Note that the same configuration as that of the function extension system 10 according to the first embodiment may be used as the system configuration according to the third embodiment, and therefore specific descriptions are omitted.

<Overview of Function Extension Process According to Third Embodiment>

Figure 16:
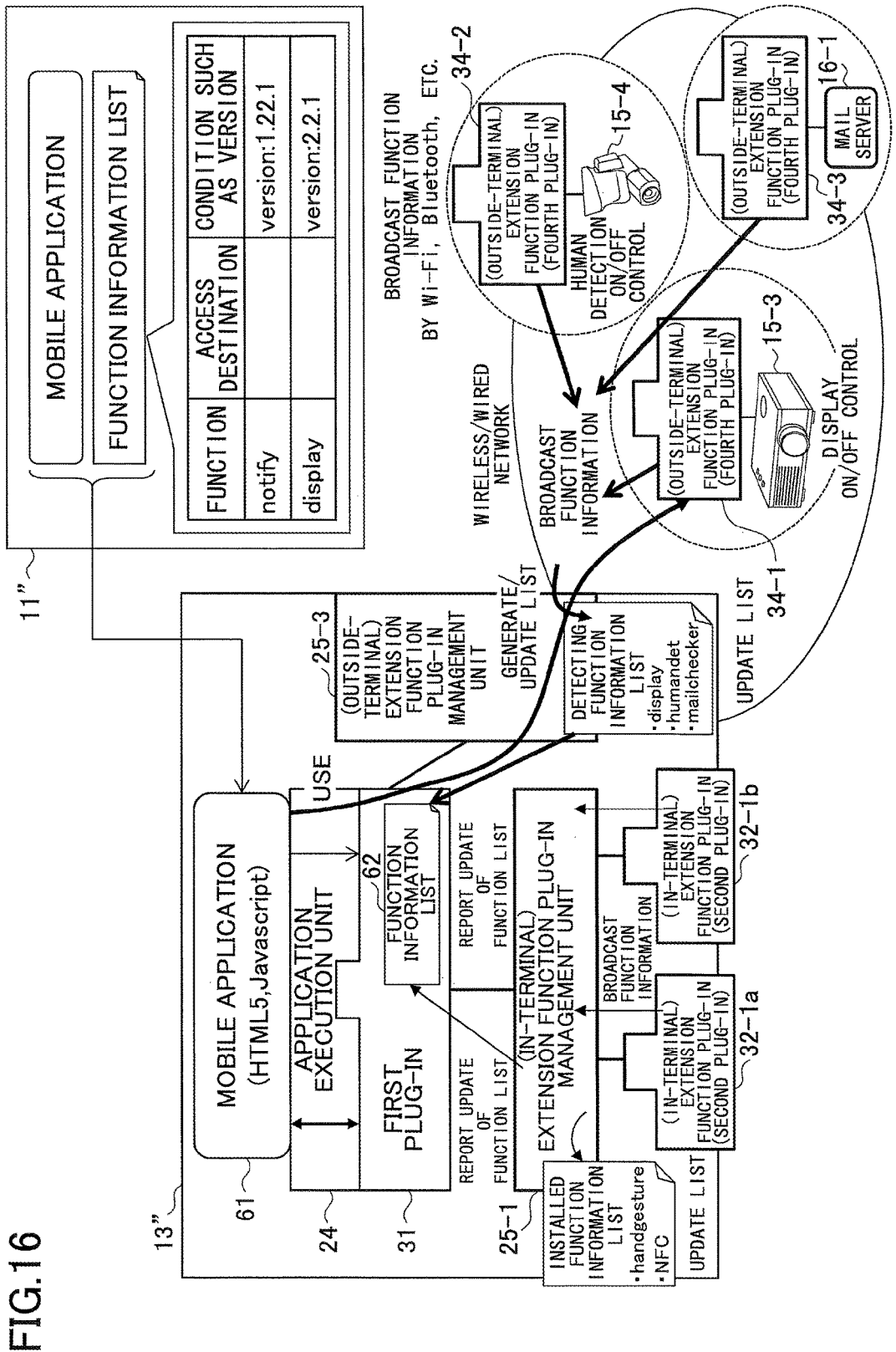
FIG. 16 illustrates an overview of a function extension process according to a third embodiment.

FIG. 16 illustrates an overview of a function extension process according to the third embodiment. In the example of FIG. 16, the application server 11" and the terminal device 13" are included. Furthermore, in the third embodiment, the terminal device 13" includes the mobile application 61, the application execution unit 24, the (in-terminal) extension function plug-in management unit 25-1, and the (outside-terminal) extension function plug-in management unit 25-3. Note that in the third embodiment, the same elements as those of the first and second embodiments described above are denoted by the same reference numerals and specific descriptions are omitted.

In the third embodiment, the terminal device 13" includes the (outside-terminal) extension function plug-in management unit 25-3. The (outside-terminal) extension function plug-in management unit 25-3 is provided inside the terminal device 13". Control of the peripheral devices 15-3, 15-4, and the mail server 16-1 illustrated in FIG. 16 is executed by the mobile application 61 of the terminal device 13" via the (outside-terminal) extension function plug-in management unit 25-3.

In the third embodiment, for example, the (outside-terminal) extension function plug-in management unit 25-3 scans function information that is sent by broadcast communication by the extension function plug-in, and the (outside-terminal) extension function plug-in management unit 25-3 broadcasts a request for detecting an (outside-terminal) extension function plug-in (fourth plug-in), at periodic timings or at a predetermined timing such as when the mobile application is started. The communication method is, for example, Wi-Fi and Bluetooth; however, the present embodiment is not so limited.

Here, the fourth plug-in has the functions of the second and third plug-ins as described above. Additionally, the (outside-terminal) extension function plug-in management unit 25-3 periodically issues a broadcast request, the broadcast request is received at the fourth plug-in, and broadcasting is performed. Note that the fourth plug-in itself may periodically broadcast the function information of itself, and the (outside-terminal) extension function plug-in management unit 25-3 may acquire this information. The above function information of itself is, for example, information for filling in blank spaces in the function information list, such as a function name, a unique name (URL, Service Set Identifier (SSID)), and conditions such as the version; however, the present embodiment is not so limited.

For example, the (outside-terminal) extension function plug-ins (fourth plug-ins) 34-1, 34-2 connected to an external peripheral device, or the (outside-terminal) extension function plug-in (fourth plug-in) 34-3 connected to the mail server 16-1 broadcasts the function information of itself at periodic timings or in response to a request from the (outside-terminal) extension function plug-in management unit 25-3.

The (outside-terminal) extension function plug-in management unit 25-3 acquires the function information that has been broadcast, and checks whether the same information is included in the detecting function information list. When the same information is not included, the (outside-terminal) extension function plug-in management unit 25-3 adds the acquired function information in the detecting function information list together with the last detection time. Furthermore, the (outside-terminal) extension function plug-in management unit 25-3 deletes the function information whose time has not been updated for a certain time period from the last detection time, from the detecting function information list.

As the access destination of the detecting function information list, an Internet Protocol (IP) address, a Media Access Control (MAC) address, and an SSID may be set; however, the present embodiment is not so limited. The function name is, for example, a display function or a human detection function of the (outside-terminal) extension function plug-ins (fourth plug-ins) 34-1, 34-2; however, the present embodiment is not so limited.

When a change is made in the detecting function information list, the (outside-terminal) extension function plug-in management unit 25-3 outputs, to the first plug-in 31, a new function name that has been detected, or the function name that has been deleted from the list for not being detected for a certain time period. The first plug-in 31 updates the access destination information of the function information list (outside-terminal) associated with the executed mobile application, based on the information acquired from the (outside-terminal) extension function plug-in management unit 25-3.

In the update process, for example, when there is a newly detected function name in the list and the access destination is a blank space, the first plug-in 31 inputs "outside-terminal (net)". Furthermore, when a deleted function name is in the list, and the access destination is "outside-terminal (net)", the first plug-in 31 changes this to a blank space.

<Sequence of Example of Function Extension Process According to Third Embodiment>

Figure 17:
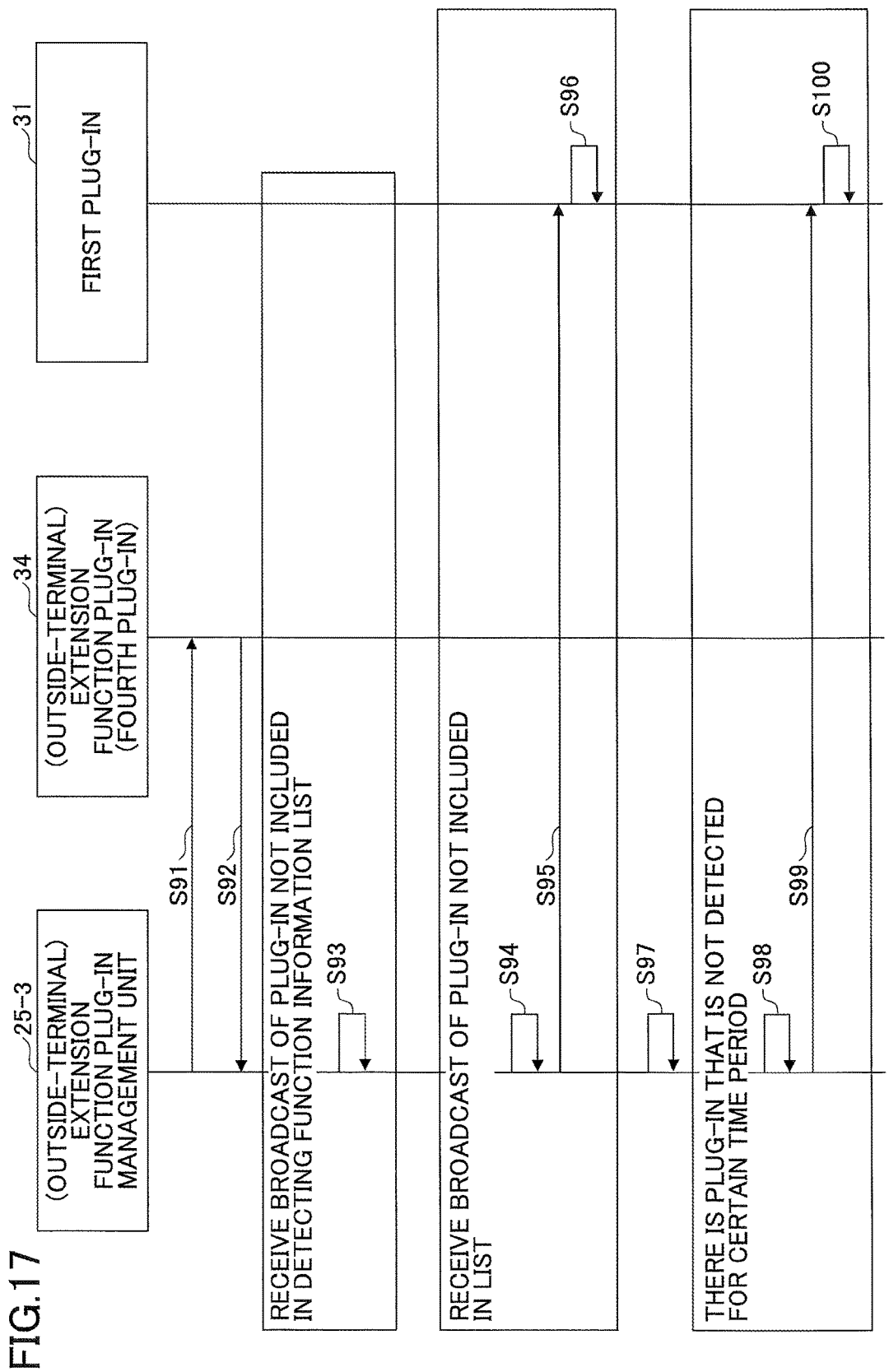
FIG. 17 illustrates a sequence of an example of a function extension process (while executing application) according to the third embodiment.

Next, a description is given of an example of a function extension process according to the third embodiment. FIG. 17 illustrates a sequence of an example of a function extension process (while executing application) according to the third embodiment. The example of FIG. 17 indicates a process using the (outside-terminal) extension function plug-in management unit 25-3, the (outside-terminal) extension function plug-in (fourth plug-in) 34, and the first plug-in 31. The process of FIG. 17 is for increasing/reducing the extension functions of a mobile application being executed, and for example, this process is executed periodically; however, the present embodiment is not so limited.

In the example of FIG. 17, the (outside-terminal) extension function plug-in management unit 25-3 outputs a request to broadcast function information to the (outside-terminal) extension function plug-in (fourth plug-in) 34 (step S91). The (outside-terminal) extension function plug-in (fourth plug-in) 34 outputs the broadcast of function information to the (outside-terminal) extension function plug-in management unit 25-3 (step S92).

Here, when broadcast of a plug-in included in the detecting function information list is received, the (outside-terminal) extension function plug-in management unit 25-3 updates the last detection time of the plug-in (step S93).

Furthermore, when broadcast of a plug-in that is not included in the list is received, the (outside-terminal) extension function plug-in management unit 25-3 adds the function information to the detecting function information list, and inputs the last detection time (step S94). Furthermore, the (outside-terminal) extension function plug-in management unit 25-3 reports the added function information to the first plug-in 31 (step S95). When the newly detected function name is in the list, and the access destination is not input, the first plug-in 31 inputs "outside-terminal (net)" (step S96).

Furthermore, when there is a plug-in that is not detected for a certain time period while periodically broadcasting function information, the (outside-terminal) extension function plug-in management unit 25-3 deletes the function information of this plug-in from the detecting function information list (step S98). Next, the (outside-terminal) extension function plug-in management unit 25-3 reports the deleted function information to the first plug-in 31 (step S99). When the deleted function name is in the list, and the access destination is "outside-terminal (net)", the first plug-in 31 changes this to a blank space (step S100).

Figure 18:
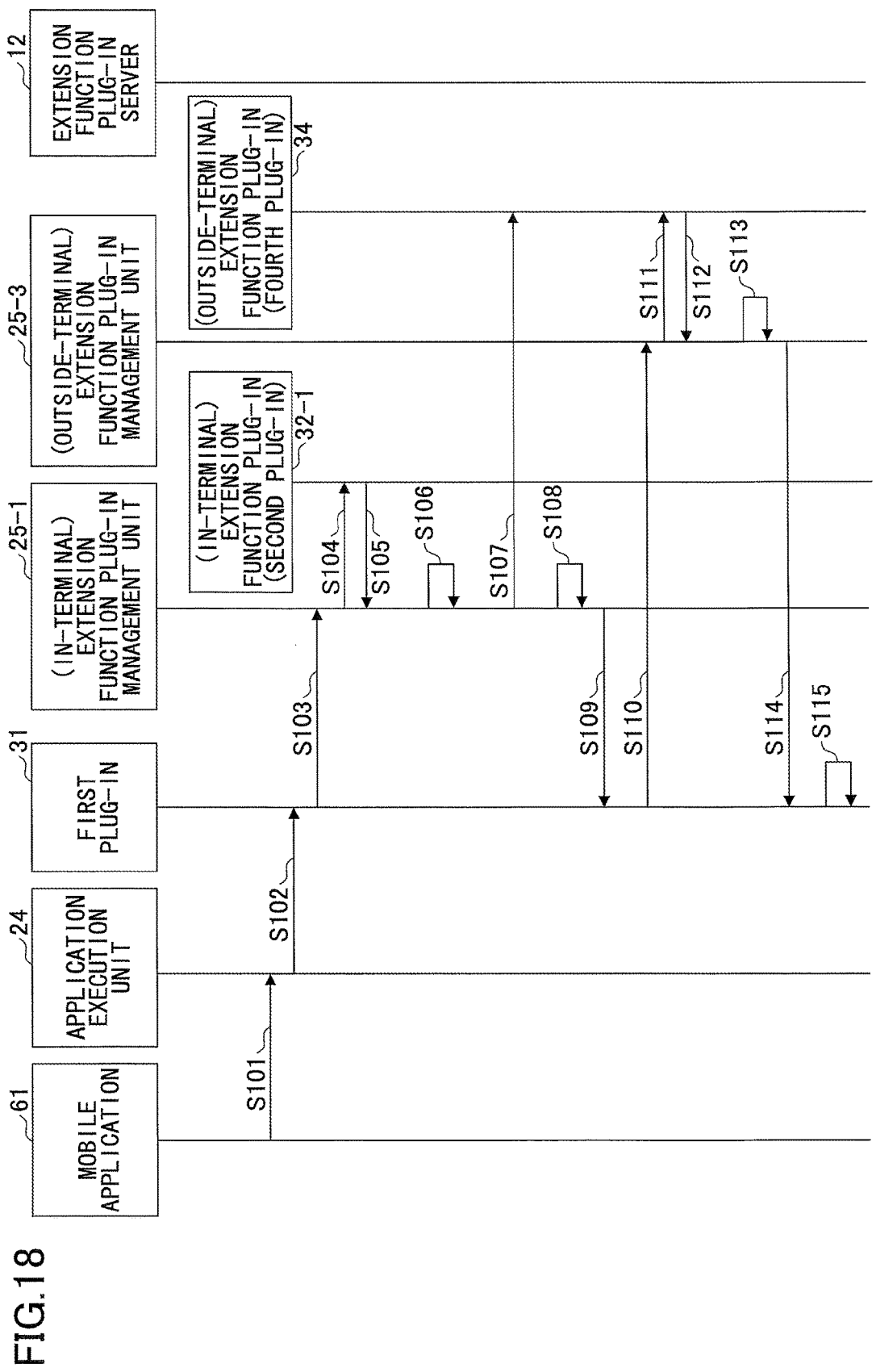
FIG. 18 illustrates a sequence of an example of a function extension process (list update) according to the third embodiment.

FIG. 18 illustrates a sequence of an example of a function extension process (list update) according to the third embodiment. The example of FIG. 18 indicates a process using the mobile application 61, the application execution unit 24, the first plug-in 31, the (in-terminal) extension function plug-in management unit 25-1, the (in-terminal) extension function plug-in 32-1, the (outside-terminal) extension function plug-in management unit 25-3, the (outside-terminal) extension function plug-in (fourth plug-in) 34, and the extension function plug-in server 12.

In the example of FIG. 18, the mobile application 61 acquires a function information list, and outputs the function information list to the application execution unit 24 (step S101). The application execution unit 24 outputs the function information list to the first plug-in 31 (step S102). The first plug-in 31 outputs the function information list to the (in-terminal) extension function plug-in management unit 25-1 (step S103).

The (in-terminal) extension function plug-in management unit 25-1 outputs a function information broadcast request to the (in-terminal) extension function plug-in 32-1 (step S104). The (in-terminal) extension function plug-in 32-1 receives the request, and returns a response to the request (step S105). The (in-terminal) extension function plug-in management unit 25-1 updates the installed function information list (step S106). Furthermore, when there is a function that is not found, the (in-terminal) extension function plug-in management unit 25-1 accesses the extension function plug-in server 12, acquires the function, and installs the function (step S107), and updates the installed function information list (step S108). Note that the process of step S107 is the same the processes of step S47 through S51 described above, and is indicated in a simplified manner.

Next, the (in-terminal) extension function plug-in management unit 25-1 inputs "local" as the detection function information access destination, and outputs this to the first plug-in 31 (step S109). Next, the first plug-in 31 outputs the function information list to the (outside-terminal) extension function plug-in management unit 25-3 (step S110). The (outside-terminal) extension function plug-in management unit 25-3 sends the function information broadcast request to the (outside-terminal) extension function plug-in (fourth plug-in) 34 (step S111). The (outside-terminal) extension function plug-in (fourth plug-in) 34 receives the request, and returns a response to the request (step S112). The (outside-terminal) extension function plug-in management unit 25-3 updates the detecting list (step S113), inputs "outside-terminal (net)" as the detecting function information access destination, and outputs this to the first plug-in 31 (step S114). The first plug-in 31 updates and manages the function information list based on the obtained information (step S115).

Figure 19:
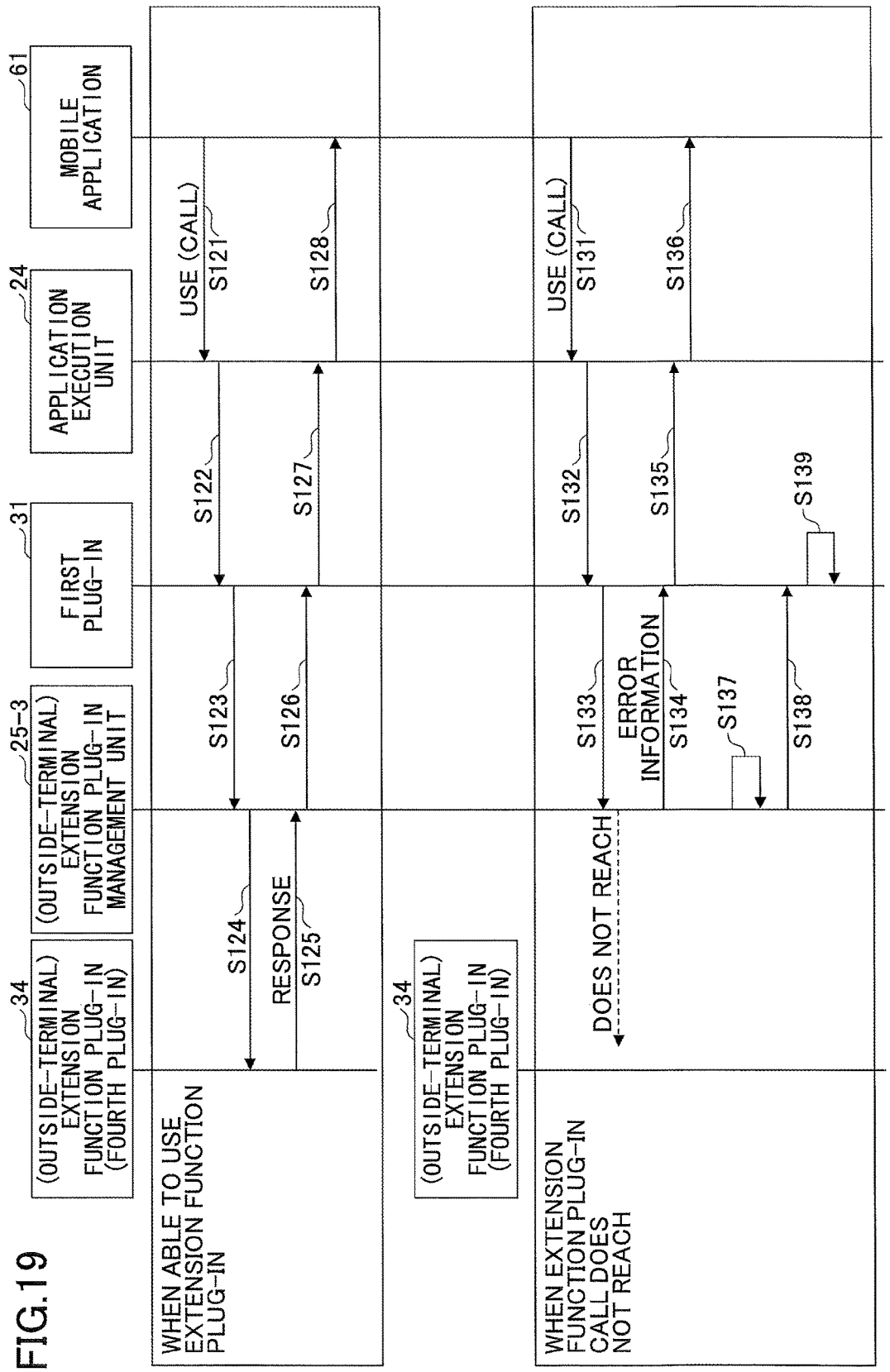
FIG. 19 illustrates a sequence of an example of a function extension process (call fourth plug-in) according to the third embodiment.

FIG. 19 illustrates a sequence of an example of a function extension process (call fourth plug-in) according to the third embodiment. The example of FIG. 19 indicates a process using the (outside-terminal) extension function plug-in (fourth plug-in) 34, the (outside-terminal) extension function plug-in management unit 25-3, the first plug-in 31, the application execution unit 24, and the mobile application 61. In the example of FIG. 19, the process of steps S121 through S128 indicate an example where the it is possible to use the extension function plug-in, and the process of steps S131 through S139 indicate an example where the extension function plug-in call did not reach the extension function plug-in.

In the example of FIG. 19, the mobile application 61 outputs, to the application execution unit 24, a call for the (outside-terminal) extension function plug-in (fourth plug-in) 34 to be used (step S121). The application execution unit 24 outputs, to the first plug-in 31, the call received from the mobile application 61 (step S122). The first plug-in 31 outputs, to the (outside-terminal) extension function plug-in management unit 25-3, the call received from the application execution unit 24 (step S123). The (outside-terminal) extension function plug-in management unit 25-3 sends, to the (outside-terminal) extension function plug-in (fourth plug-in) 34, the call received from the first plug-in 31 (step S124). Here, when it is possible to use the fourth plug-in, the response is received by the (outside-terminal) extension function plug-in management unit 25-3 (step S125). The (outside-terminal) extension function plug-in management unit 25-3 outputs a response to the first plug-in 31 (step S126). The first plug-in 31 outputs the received response to the application execution unit 24 (step S127). The application execution unit 24 outputs the received response to the mobile application 61 (step S128).

Furthermore, when the extension function plug-in call does not reach the extension function plug-in, the mobile application 61 outputs, to the application execution unit 24, a call for the (outside-terminal) extension function plug-in (fourth plug-in) 34 to be used (step S131). The application execution unit 24 outputs, to the first plug-in 31, the call received from the mobile application 61 (step S132). The first plug-in 31 outputs, to the (outside-terminal) extension function plug-in management unit 25-3, the call received from the application execution unit 24 (step S133). The (outside-terminal) extension function plug-in management unit 25-3 sends, to the (outside-terminal) extension function plug-in (fourth plug-in) 34, the call received from the first plug-in 31; however, when the call does not reach the extension function plug-in, the (outside-terminal) extension function plug-in management unit 25-3 outputs error information indicating this effect to the first plug-in 31 (step S134). The first plug-in 31 outputs the error information to the application execution unit (step S135). The application execution unit 24 outputs the received error information to the mobile application 61 (step S136).

Next, the (outside-terminal) extension function plug-in management unit 25-3 deletes the function information of the plug-in from the detecting function information list (step S137), and reports the deleted function information to the first plug-in 31 (step S138). When the deleted function name is in the list and the access destination is "outside-terminal (net)", the first plug-in 31 changes this to a blank space (step S139).

<Examples of Various Types of Data Applied in Third Embodiment>

Figure 20A:
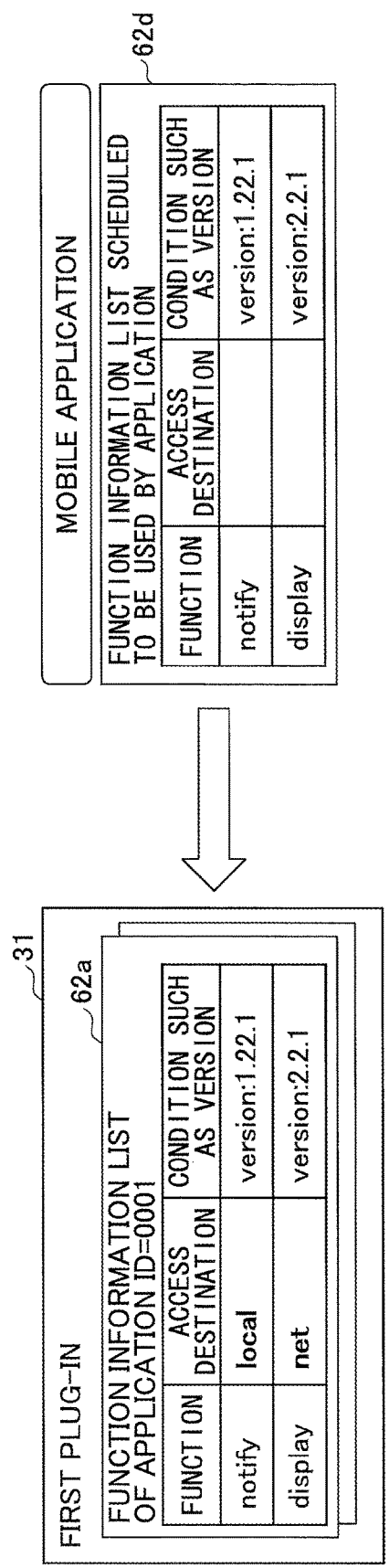

FIGS. 20A through 20C illustrate examples of various types of data applied in the third embodiment. FIG. 20A illustrates a data example managed by the first plug-in 31. FIG. 20B illustrates a data example managed by the (in-terminal) extension function plug-in management unit 25-1. FIG. 20C illustrates a data example managed by the (outside-terminal) extension function plug-in management unit 25-3.

In the data of the first plug-in 31 illustrated in FIG. 20A, there is a function information list 62a for each application ID. As described above, the items of the function information list 62a include, for example, "function", "access destination", and "condition of version, etc."; however, the present embodiment is not so limited. When the application execution unit 24 acquires a mobile application together with a function information list (function information list scheduled to be used by mobile application) 62d to be used by the application, the terminal device 13 outputs the function information list to the first plug-in 31. At this time, the access destination in of the function information list 62d is as blank space.

The first plug-in 31 outputs the function information list 62a to the (in-terminal) extension function plug-in management unit 25-1. The (in-terminal) extension function plug-in management unit 25-1 refers to the installed function information list 62b, and with respect to a function that is already installed, the (in-terminal) extension function plug-in management unit 25-1 inputs "local" as the access destination of the function information list 62a. Furthermore, with respect to a function whose access destination is a blank space, the (in-terminal) extension function plug-in management unit 25-1 queries the extension function plug-in server 12, and when there is a set of the function in the extension function plug-in server 12, the (in-terminal) extension function plug-in management unit 25-1 acquires the function from the extension function plug-in server 12 and installs the function. After installing the function, "local" is input as the access destination of the function. The (in-terminal) extension function plug-in management unit 25-1 returns the changed function information list 62a to the first plug-in 31.

Furthermore, the first plug-in 31 outputs the function information list 62a to the (outside-terminal) extension function plug-in management unit 25-3. The (outside-terminal) extension function plug-in management unit 25-3 refers to a detecting function information list 62e, and for a function that is included, the (outside-terminal) extension function plug-in management unit 25-3 inputs "net" as the access destination. The changed function information list 62a is returned to the first plug-in 31.

Here, when there is a call for a function from the mobile application, the first plug-in 31 refers to the function information list 62a, and when the call is for a function whose access destination is in-terminal (local), the first plug-in 31 sends the call to the (in-terminal) extension function plug-in management unit 25-1.

Furthermore, when the access destination is "net", the first plug-in 31 sends the reading of the function to the (outside-terminal) extension function plug-in management unit 25-3. When the access destination is a blank space, the first plug-in 31 returns an error to the mobile application. The (outside-terminal) extension function plug-in management unit 25-3 refers to the detecting function information list 62e, calls the extension function plug-in (fourth plug-in) 34 by using a unique name corresponding to the called function, and returns a response to the application. Note that even by making the call, if the call does not reach the extension function plug-in and an error occurs, the (outside-terminal) extension function plug-in management unit 25-3 returns the error information to the mobile application, deletes the plug-in information from the detecting function information list 62e, and sends deletion information to the first plug-in 31. The first plug-in 31 changes the access destination of the function name in the list to a blank space.

Accordingly, it is possible to execute the respective functions that have been installed, by the mobile application 61 of the application ID=0001. Furthermore, in the third embodiment, when the mobile application is ended, for example, the function information list 62a of the target mobile application of the first plug-in 31 illustrated in FIG. 20A, is deleted. Furthermore, the function information list 62a of the target mobile application is deleted from the above-described (in-terminal) extension function plug-in management unit 25-1 or (outside-terminal) extension function plug-in management unit 25-3. In the first through third embodiments described above, the terminal device 13 is able to automatically read the functions that are needed, and therefore, it is possible to quickly implement the function extension for the mobile application to use a sensor or a peripheral device.

Fourth Embodiment

Next, a description is given of a fourth embodiment. The first through third embodiments described above include a plug-in (first plug-in) common to the peripheral devices 15 and the server 16, and individual plug-ins (extension function plug-ins (second through fourth plug-ins)) for the respective peripheral devices 15 and server 16, and therefore it is possible to add or delete a function without restarting the application.

Furthermore, in the fourth embodiment, for example, it is possible for each application to arbitrarily set, in the extension function plug-in, one or more conditions for issuing an event to be triggered by a state change such as true/false. Furthermore, in the fourth embodiment, a condition that extends across one or more extension function plug-ins, for sending an event to the mobile application, is automatically divided, and the divided conditions are distributed to the extension function plug-ins.

Accordingly, for example, the terminal device 13 is able to comprehensively determine the state from the result of a sensor process by a plurality of sensing functions (=extension function plug-ins), and start or end an application. Furthermore, in the fourth embodiment, it is possible to reduce the load of the CPU and reduce the communication amount between the units. For example, the extension function plug-in (second plug-in) issues report information including at least one of the items among the position of the terminal device 13, the time, a change in the in-terminal state, a change in the surroundings, and reception of an event from outside, based on the issue condition specified by the first plug-in. Furthermore, in the fourth embodiment, when it is possible for a peripheral device 15 corresponding to the second plug-in to execute a process of determining whether to generate report information based on the specified issue condition, the determination process may be executed by a peripheral device.

Furthermore, in the fourth embodiment, among determination processes, with respect to a composite determination process that is a combination of results of a plurality of the determination processes, when it is possible for peripheral devices corresponding to the same second plug-in to execute the plurality of determination processes, some of or all of the plurality of determination processes and the composite determination process that is a combination of results of the plurality of determination processes, may be executed by the peripheral device 15.

<Example of Functional Configuration of Terminal Device 13 According to Fourth Embodiment>

Figure 22:
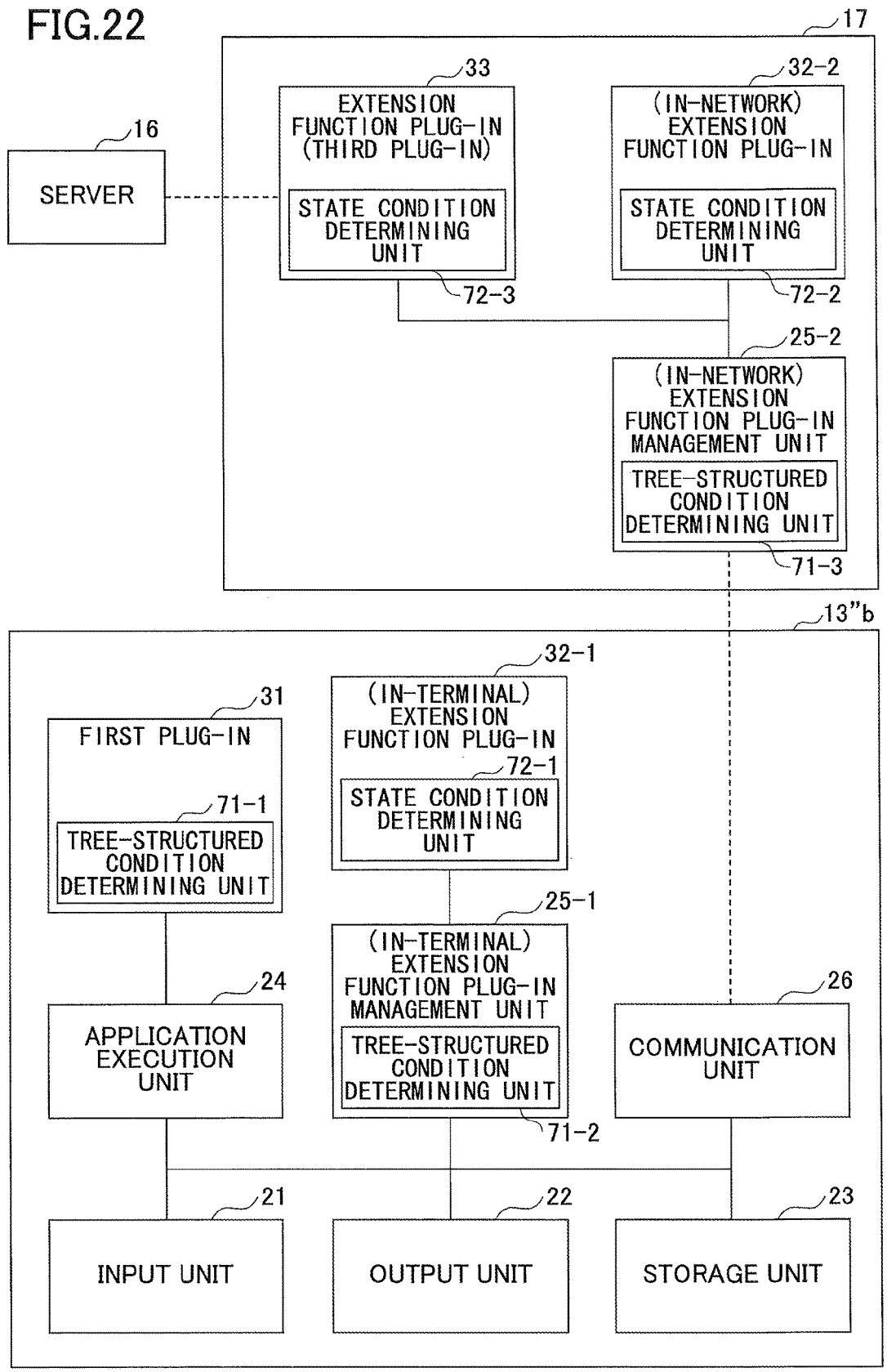
FIG. 22 illustrates an example (part 2) of the functional configuration of a terminal device according to the fourth embodiment.

FIGS. 21 and 22 illustrate examples (part 1, part 2) of the functional configuration of a terminal device according to the fourth embodiment. Note that in the following description, the parts that are different from those of the terminal device 13 according to the first embodiment and the terminal device 13' according to the second embodiment are specifically described. Furthermore, the same elements as those of the terminal device 13, 13' described above are denoted by the same reference numerals and specific descriptions are omitted.

A terminal device 13"a illustrated in FIG. 21 corresponds to the first embodiment. The terminal device 13"a includes an input unit 21, an output unit 22, a storage unit 23, an application execution unit 24, an extension function plug-in management unit 25, a communication unit 26, a first plug-in 31, and extension function plug-ins (second plug-ins) 32a, 32b.

Furthermore, a terminal device 13"b illustrated in FIG. 22 corresponds to the second embodiment. The terminal device 13"b includes the input unit 21, the output unit 22, the storage unit 23, the application execution unit 24, the (in-terminal) extension function plug-in management unit 25-1, the communication unit 26, the first plug-in 31, and the (in-terminal) extension function plug-in 32-1.

Furthermore, in the fourth embodiment, the terminal device 13"a, 13"b includes a tree-structured condition determining unit 71 and a state condition determining unit 72. For example, the first plug-in 31 illustrated in FIGS. 21 and 22 includes the tree-structured condition determining unit 71-1. Furthermore, the extension function plug-in management unit 25 illustrated in FIG. 21 also includes the tree-structured condition determining unit 71-2. Furthermore, the extension function plug-in 32 includes the state condition determining unit 72-1.

The extension function plug-in management unit 25 illustrated in FIG. 21 includes the extension function plug-ins (second plug-ins) 32a, 32b. The extension function plug-in 32b communicates with the state condition determining unit 72-1' and the tree-structured condition determining unit 71-2' of the peripheral device 15-3'.

Furthermore, the first plug-in 31, the (in-terminal) extension function plug-in management unit 25-1, and the (in-network) extension function plug-in management unit 25-2 illustrated in FIG. 22 also include the tree-structured condition determining unit 71-1, 71-2, and 71-3, respectively. Furthermore, the (in-terminal) extension function plug-in 32-1, the (in-network) extension function plug-in (second plug-in) 32-2, and the extension function plug-in (third plug-in) 33 include the state condition determining unit 72-1, 72-2, and 72-3, respectively. The extension function plug-in (third plug-in) 33 of the extension function plug-in management device 17 connects with the server 16.

The tree-structured condition determining unit 71 determines the combination of true/false of the state condition determining unit 72. For example, when the tree-structured condition determining unit 71 wants to comprehensively determine the state from the results of multiple types of sensor processes, the tree-structured condition determining unit 71 determines the individual conditions by using a logical product (AND) and a logical sum (OR) of the states in the respective extension function plug-ins, by being triggered by an event of a state change occurring from the individual extension function plug-ins.

The state condition determining unit 72 changes true/false according to the two conditions of state established/state not established, based on, for example, sensor data. For example, when the state in each extension function plug-in changes to a state registered as a condition of state established/state not established, the state condition determining unit 72 determines true when the state changes to state established, and determines false when the state changes to state not established.

An example of tree-structured condition determination is that, when switching the mobile application to be executed according to the location or the state of the user, the switching is triggered by an event that is generated from the extension function plug-in 32 by processing position information such as GPS, and upon receiving the event, the application execution unit 24 switches the mobile application. Furthermore, to generate an event in which multiple conditions are set such as "when a person a is near a location A at a certain time", the respective conditions are described by being combined with AND and OR. In the case of the same access destination in the function information list described above, the AND condition in the access destination is verified, and an event is generated in an integrated manner from the respective extension function plug-in management units 25 and the respective extension function plug-ins 32, 33, thereby reducing the load of the CPU in the terminal device 13"a, 13"b.

Thus, in the fourth embodiment, in the conditions combined by AND and OR, as for the partial conditions having the same access destination (for example, in-terminal and in-network) or having the same unique name (for example, the same function program), the first plug-in 31 does not divide these conditions and sets these together as conditions in the condition determining unit of the destination address. Here, higher/lower relationships of the tree-structured condition determining unit 71 are defined. Each state condition determining unit 72 generates an event to a higher level when a condition is satisfied or unsatisfied, and the higher level receives the event and performs the determination for itself. Note that in the fourth embodiment, an assembly of conditions combined by AND and OR at the respective tree-structured condition determining unit 71 is referred to as a node.

Note that as for the extension function plug-in node positioned at the lowermost end in the condition tree combined by AND and OR, the node itself stores a state (truth-value). The state of the node at the low-end of the tree transits according to a sensor event generated in an extension function plug-in, and the transition condition (establishment requisite/non-establishment requisite) is referred to as the state condition.

The timing at which the first plug-in 31 acquires the condition tree and sets a condition in the state condition determining unit 72 of a lower level, may be when the condition tree is distributed from the application server 11", or the condition tree may be stored in advance from when the application execution unit 24 is activated.

<Overview of Function Extension Process According to Fourth Embodiment>

FIGS. 23 through 26 illustrate an overview of a function extension process according to the fourth embodiment (part 1 through part 4). FIGS. 23 through 26 are partially different from one another.

Figure 23:
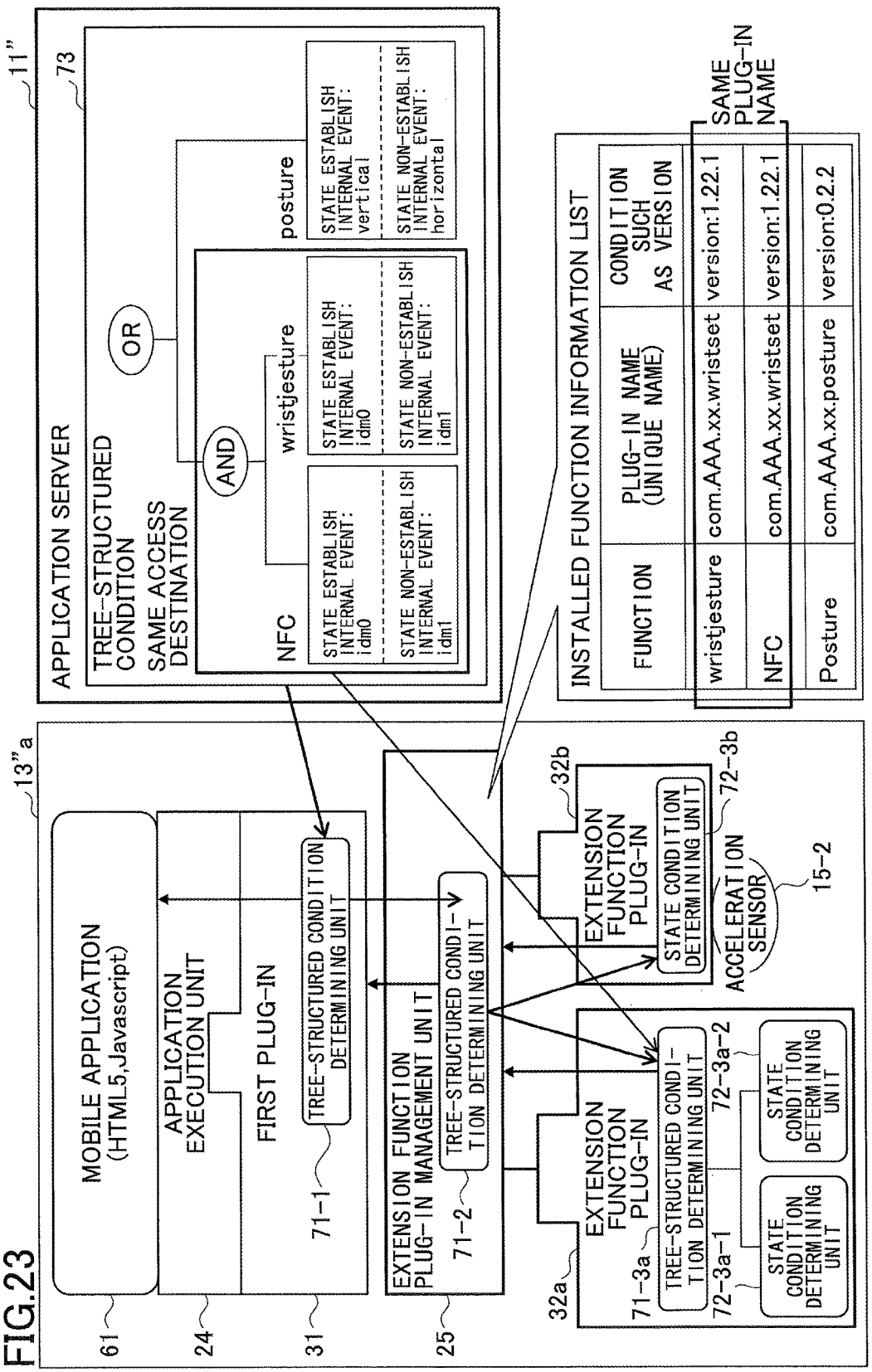
FIG. 23 illustrates an overview of a function extension process according to the fourth embodiment (part 1)

In the example of FIG. 23, the first plug-in 31, the extension function plug-in management unit 25, and the extension function plug-in (second plug-in) 32a of the terminal device 13"a, include the tree-structured condition determining unit 71-1, 71-2, 71-3a, respectively. Furthermore, the extension function plug-in (second plug-in) 32a includes the state condition determining units 72-3a-1, 72-3a-2, and the extension function plug-in 32b includes the state condition determining unit 72-3b. Note that in the example of FIG. 23, a microcomputer is provided in the terminal device 13"a, and the tree-structured condition determining unit 71 and the state condition determining unit 72 are provided in the microcomputer, thereby realizing a power-saving process.

Furthermore, in the example of FIG. 23, in the application server 11", a condition establish internal event and a condition non-establish internal event are set as a condition tree 73. It is possible to perform tree-structured condition determination by acquiring the state condition of true/false and the condition tree corresponding to the internal event.

Furthermore, in the fourth embodiment, the above-described condition determining units (tree-structured condition determining unit 71, state condition determining unit 72) may be provided in the peripheral device 15. For example, in the example of FIG. 24, the extension function plug-in (second plug-in) 32a connects with the peripheral device 15-3', and the peripheral device 15-3' includes the tree-structured condition determining unit 71-3a' and the state condition determining units 72-3a-1', 72-3a-2'.

Furthermore, in the fourth embodiment, the condition determining units may be included in both the extension function plug-in and the peripheral device. For example, in the example of FIG. 25, the extension function plug-in (second plug-in) 32a includes the tree-structured condition determining unit 71-3a', and the peripheral device 15-3' includes the state condition determining units 72-3a-1', 72-3a-2'.

Furthermore, in the fourth embodiment, the condition determining units may be included in the communication network. For example, in the example of FIG. 26, with respect to the terminal device 13"b, the (in-network) extension function plug-in management unit 25-2 includes the tree-structured condition determining unit 71-3. Furthermore, the (in-network) extension function plug-ins 32-2a, 32-2b include the state condition determining units 72-4a, 72-4b, respectively, and the extension function plug-in (third plug-in) 33 includes the state condition determining unit 72-5.

Figure 24:
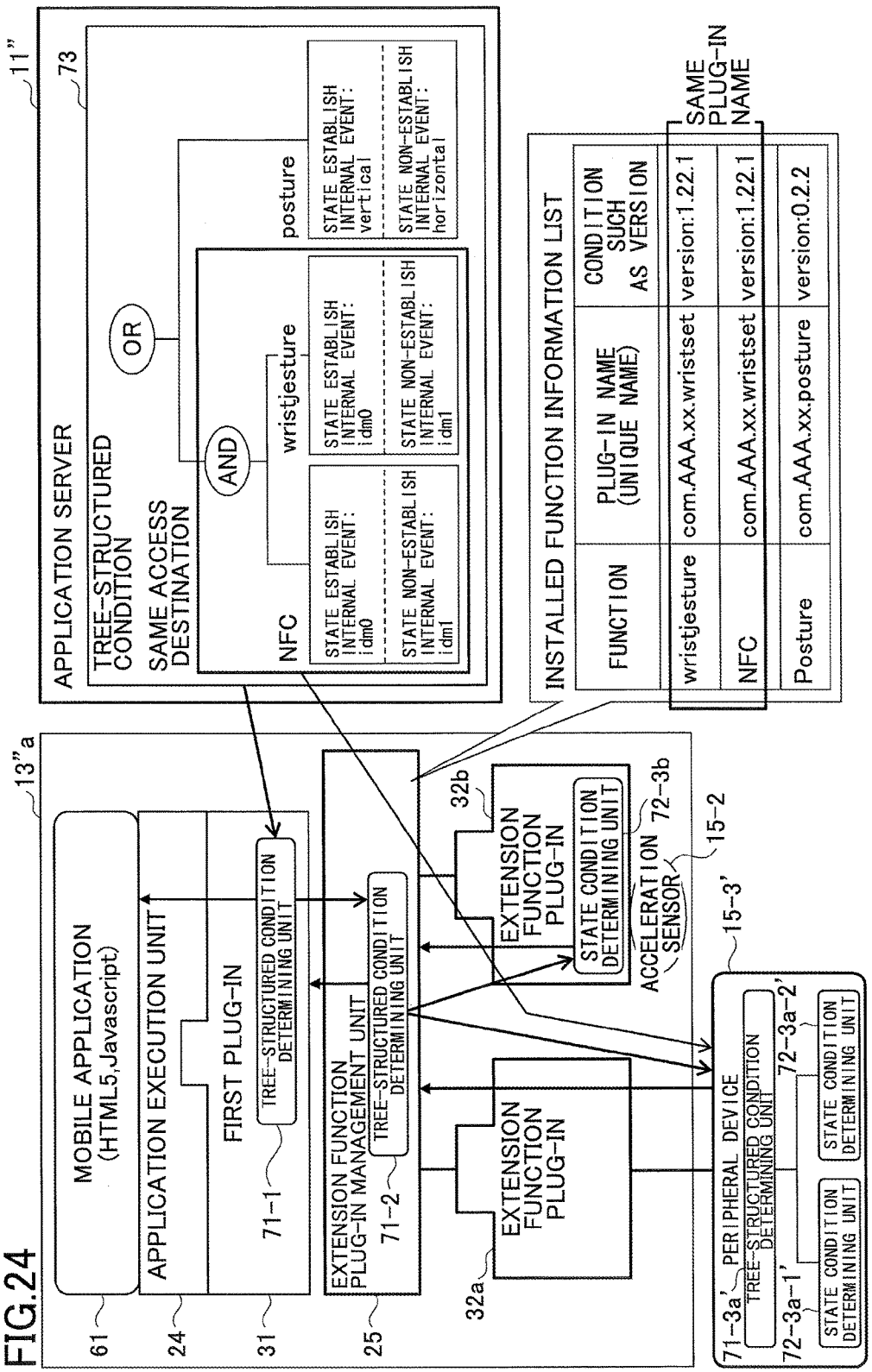
FIG. 24 illustrates an overview of a function extension process according to the fourth embodiment (part 2)
Figure 26:
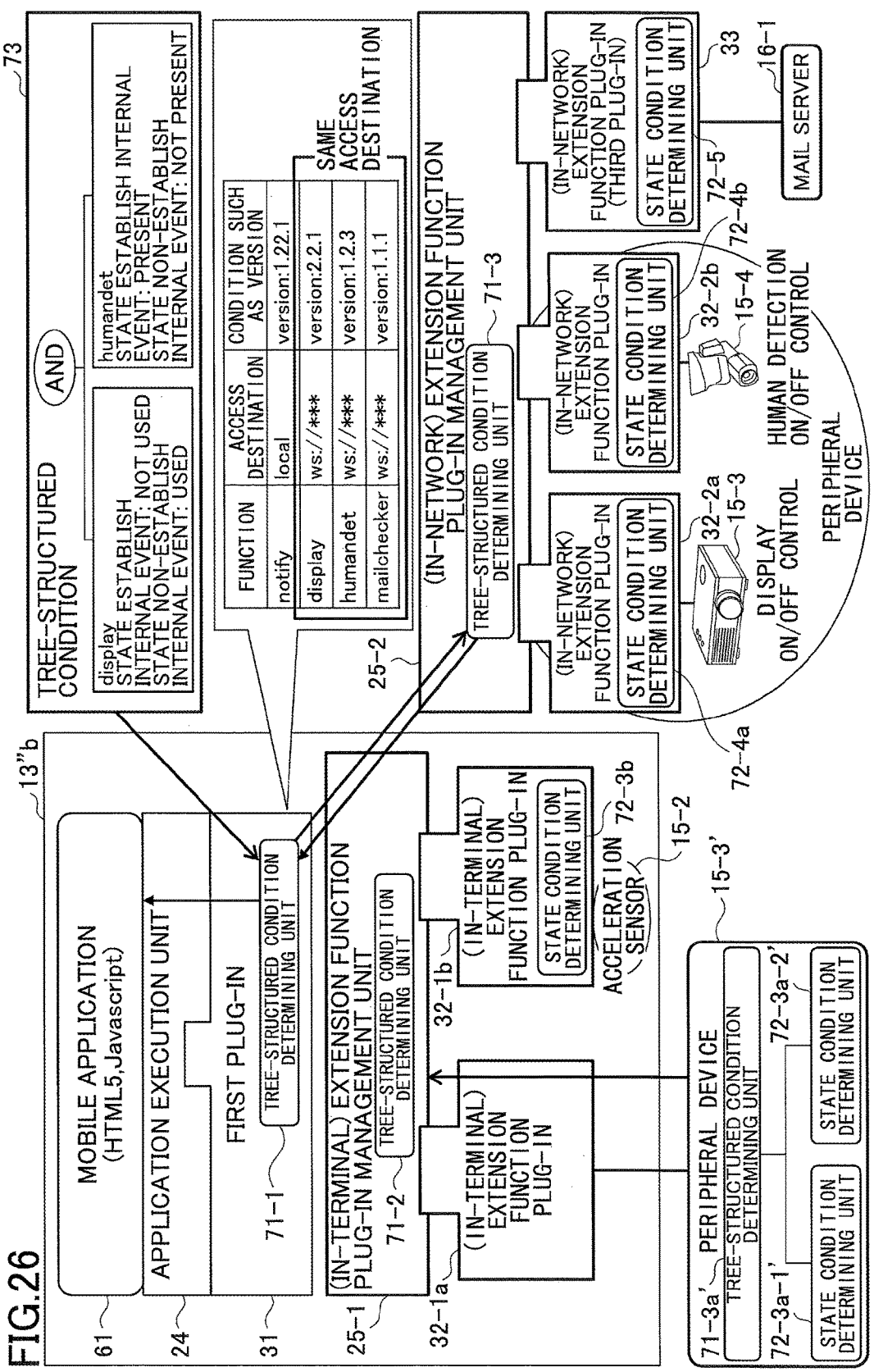
FIG. 26 illustrates an overview of a function extension process according to the fourth embodiment (part 4)

Furthermore, in the example of FIG. 26, similar to the example of FIG. 24, the peripheral device 15-3' connected to the (in-terminal) extension function plug-in 32-1a includes the tree-structured condition determining unit 71-3a' and the state condition determining units 72-3a-1', 72-3a-2'.

As described above, in the fourth embodiment, by providing the tree-structured condition determining unit 71 and the state condition determining unit 72 inside and outside the terminal, conditions may be appropriately determined.

Note that in the fourth embodiment, for example, the extension function plug-in 32 connects with a peripheral device for detecting the gestures of a moving hand and a Near Field Communication (NFC) tag, by Bluetooth (registered trademark), and issues an event of the detection of a gesture or NFC. The type of extension function plug-in 32 is not limited to the above; for example, the extension function plug-in 32 may be an extension function plug-in having a report function or a voice uttering function, as described in the first embodiment.

Furthermore, in the fourth embodiment, in the determination conditions combined by AND and OR, as for the partial conditions having the same access destination (for example, in-terminal and in-network) or having the same plug-in name (unique name) of the extension function plug-in, these partial conditions are not divided and are used together for condition determining at the destination address. In the example of FIG. 23, the function "wristjesture" and the function "NFC" have the same unique name (com.AAA.xx.wristset), and therefore these partial conditions are executed at the extension function plug-in (second plug-in) 32a.

A composite condition constituted by a plurality of conditions that are combined by AND and OR, and the partial conditions that are assigned by the above-described assignment conditions, are managed by a condition tree as illustrated in FIG. 23. Here, the AND and OR combined by the tree, and "wristjesture", "NFC" and "Posture" correspond to nodes. Each of the tree-structured condition determining unit 71 generates a corresponding event in a higher-level node, when a condition is satisfied, or when a condition is not satisfied. The tree-structured condition determining unit 71 of a higher-level node receives the event, and performs the condition determination for itself.

Furthermore, in the fourth embodiment, as illustrated in FIG. 26, the terminal device 13"b also sets the tree-structured condition determining unit 71-3 for the (in-network) extension function plug-in management unit 25-2, and sets, as lower-level nodes, the state condition determining unit 72-4a, 74-4b, 73 for the extension function plug-ins 32-2a, 32-2b, 33, respectively.

Figure 25:
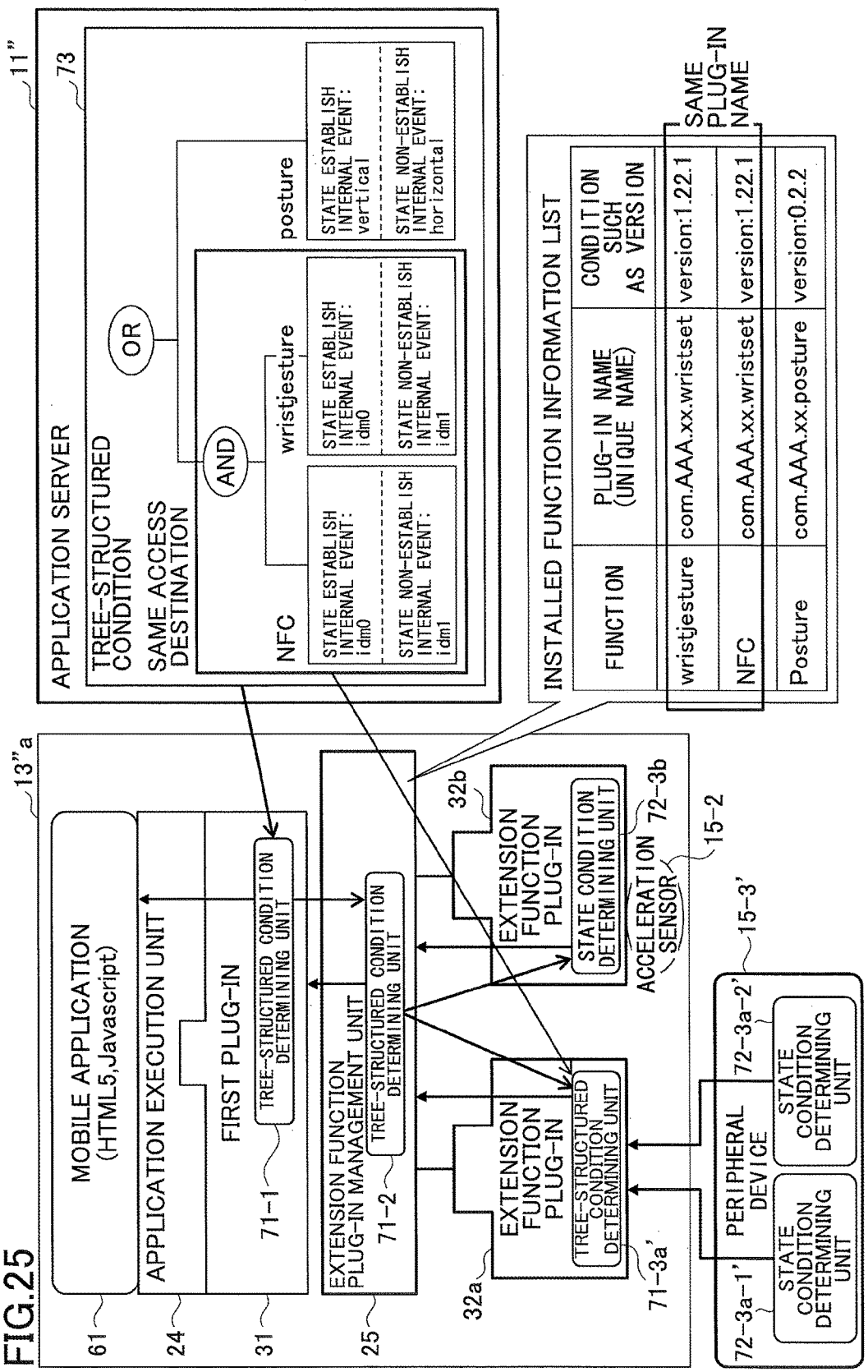
FIG. 25 illustrates an overview of a function extension process according to the fourth embodiment (part 3)

For example, in the examples illustrated in FIGS. 23 through 25, the tree-structured condition determining unit 71-1 of the first plug-in 31 that is a higher-level node, confirms the access destination included in the installed function information list, in this example, the plug-in name (unique name), and requests partial condition determination with respect to all of the functions having the same plug-in name.

For example, in the examples illustrated in FIGS. 23 through 25, the "NFC" function and the "wristjesture" function have the same plug-in name (com.AAA.xx.wristset), and therefore, a partial state condition determination process is requested for the part below AND determined by the "NFC" function and the "wristjesture" function in the condition tree.

Note that in the fourth embodiment, it is possible to register a condition definition with respect to partial condition determination. For example, in the examples illustrated in FIGS. 23 through 25, a state establish internal event and a state non-establish internal event are set as condition definitions in the "NFC" function and the "wristjesture" function. When a state establish internal event (for example, an event issued when idm0 is detected) is issued from the NFC function, the state of the NFC node of the condition tree 73 is set as true. When a state non-establish internal event (for example, an event issued when idm1 is detected) is issued from the NFC function, the state of the NFC node of the condition tree 73 is set as false. However, the contents of the definition are not so limited.

Furthermore, in the fourth embodiment, the above may be applied in dividing the conditions in in-network function management. For example, in the example of FIG. 26, the "display" function, the "humandet" function, and the "mailchecker" function have the same access destination (ws:// ***). Therefore, for example, a state condition determination process request is sent to the (in-network) extension function plug-in management unit 25-2, for the part below AND determined by the "display" function and the "humandet" function, in the condition tree 73 illustrated in FIG. 26.

<Functional Configuration in State Condition Determining Unit>

Figure 27:
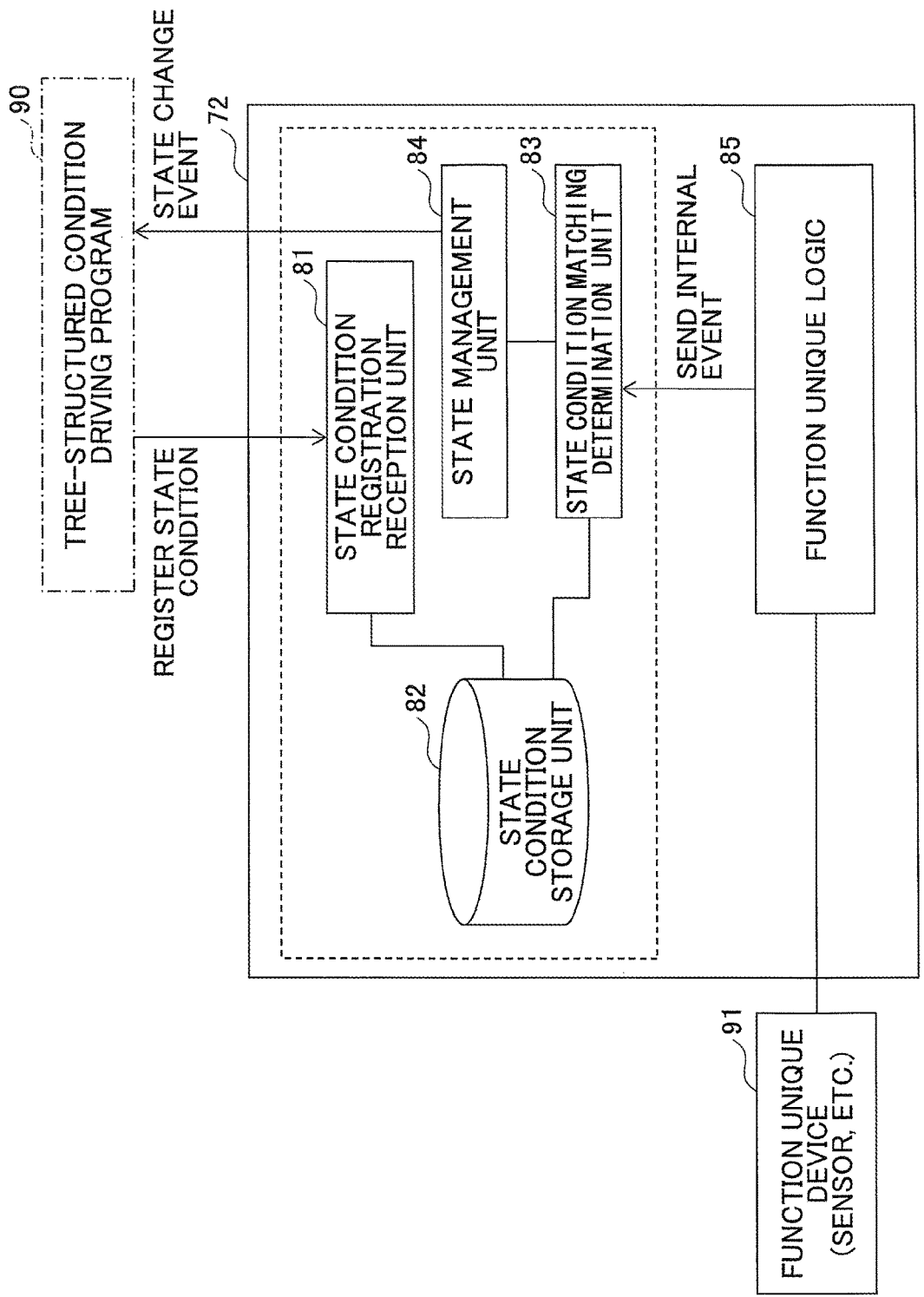
FIG. 27 illustrates an example of a functional configuration in a state condition determining unit.
Figure 28:
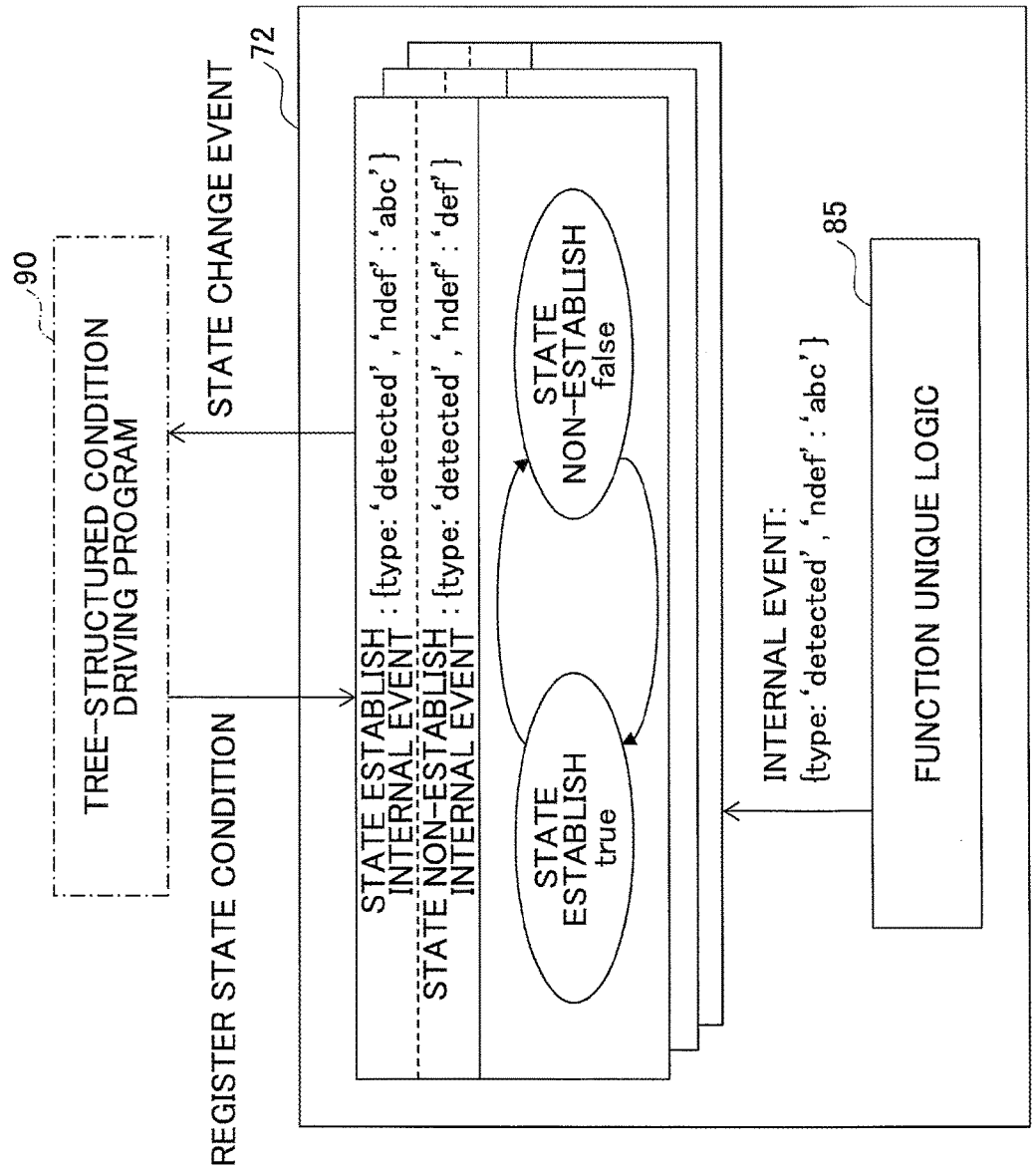
FIG. 28 illustrates the process contents of the state condition determining unit.

FIG. 27 illustrates an example of a functional configuration in the state condition determining unit 72. FIG. 28 illustrates the process contents of the state condition determining unit 72. In FIG. 27, the state condition determining unit 72 includes a state condition registration reception unit 81, a state condition storage unit 82, a state condition matching determination unit 83, a state management unit 84, and a function unique logic 85.

For example, the state condition registration reception unit 81 receives registration of a state condition for realizing the fourth embodiment, from the tree-structured condition driving program 90 executed by the application execution unit 24. Note that the one or more state conditions may be received. The state condition storage unit 82 stores the received state condition.

The tree-structured condition driving program 90 may be, for example, a tree-structured condition determining unit 71 of a higher-level node. For example, the tree-structured condition driving program 90 is a tree-structured condition determining unit in the extension function plug-in management unit 25 or a tree-structured condition determining unit in the extension function plug-in, as described above. Note that the state condition determining unit does not always need to be used from the tree-structured condition determining units. Furthermore, the state condition may be registered and a state change event may be received, by an application which is relayed by the extension function plug-in management unit 25 and the first plug-in 31, and executed by the application execution unit 24.

The state condition matching determination unit 83 acquires information obtained by the function unique device 91 (sensor, etc.) from the function unique logic 85, and determines whether the acquired information matches the state condition stored in the state condition storage unit 82. Note that, as one example, the state condition determining unit 72 illustrated in FIG. 27 is the state condition determining unit 72 of the extension function plug-in 32. Therefore, the state condition determining unit 72 receives information (for example, the temperature at every predetermined time, in the case of a temperature sensor) from the function unique device (sensor, etc.) corresponding to the peripheral device 15.

When the determination result by the state condition matching determination unit 83 is "matches state condition", the state management unit 84 outputs a corresponding state change event to a higher-level node (for example, the tree-structured condition driving program 90).

The function unique logic 85 acquires information obtained from the function unique device 91, and sends a corresponding internal event to the state condition matching determination unit 83. Note that the type and the number of the function unique device 91 are not limited to the above.

Furthermore, in the fourth embodiment, for example, as illustrated in FIG. 28, it is possible to specify a set of an internal event (state establish internal event) when a certain state is established, and an internal event (state non-establish internal event) when the certain state is not established; however, the present embodiment is not so limited. In the fourth embodiment, it is possible to perform the transition of the state value (true, false) by evaluating whether the internal event is matched, by specifying a state establishment condition and a state non-establishment condition. Note that in the example of FIG. 28, the state establish internal event is defined as {type:'detected','ndef':'abc'}, and the state non-establish internal event is defined as {type:'detected', 'ndef':'def'}; however, the present embodiment is not so limited.

<Example of State Condition Determination Process>

Figure 29:
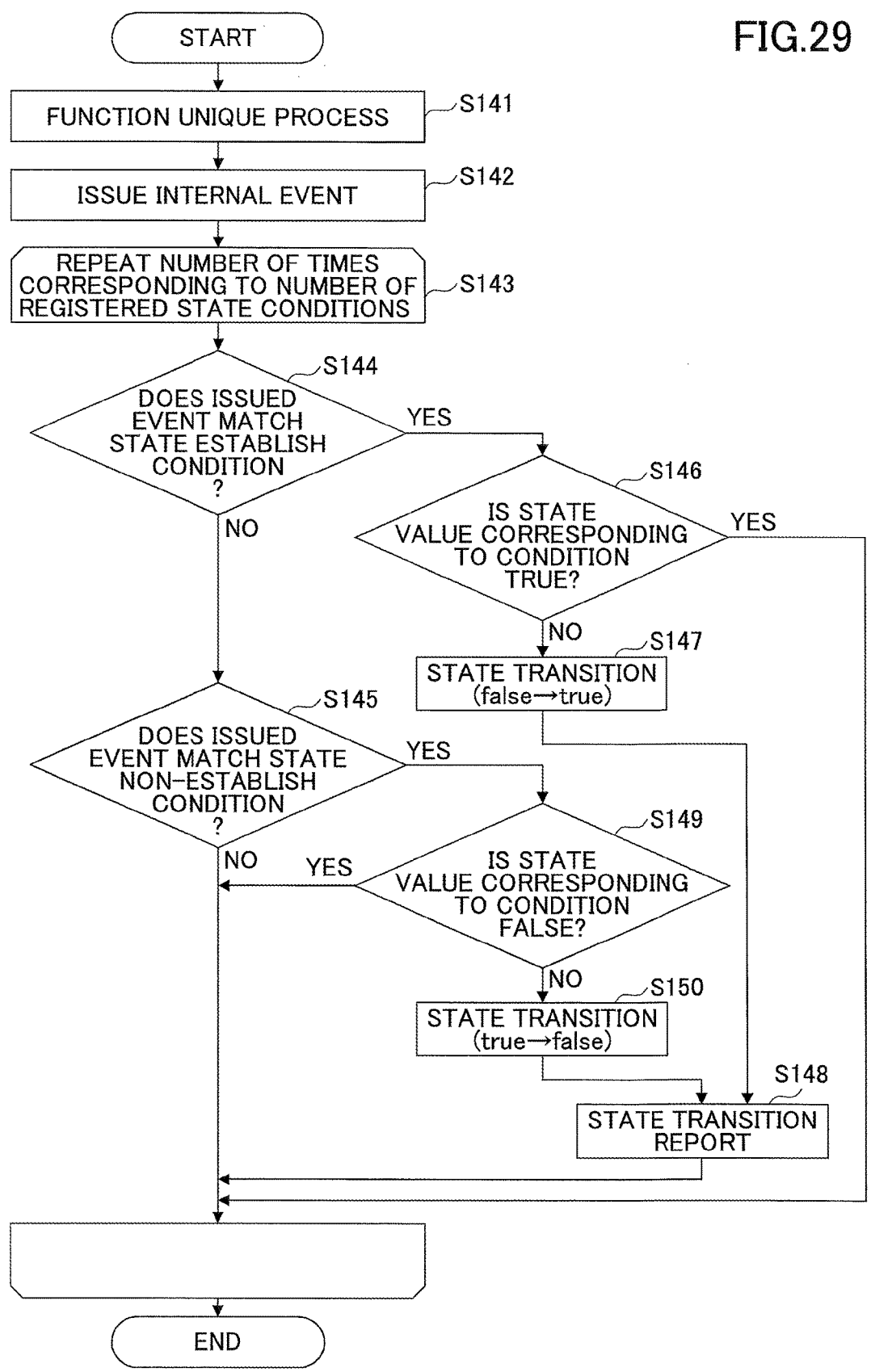
FIG. 29 is as flowchart of an example of a state condition determination process.

FIG. 29 is as flowchart of an example of a state condition determination process. In the example of FIG. 29, the state condition determining unit 72 receives information from the function unique device 91 as described above as a function unique process (step S141), and issues an internal event that is generated based on the received information (for example, the temperature at every predetermined time) (step S142).

Next, the state condition determining unit 72 repeats the following process for a number of times corresponding to the number of registered state conditions stored in the state condition storage unit (step S143).

The state condition determining unit 72 determines whether the issued event matches a state establishment condition (step S144), and when they do not match (NO in step S144), the state condition determining unit 72 determines whether the issued event matches the state non-establishment condition (step S145). Next, when the issued event does not match the state non-establishment condition (NO in step S145), the state condition determining unit 72 performs a process on the next state condition that is unprocessed.

Furthermore, in the process of step S144, when the issued event matches the state establishment condition (YES in step S144), the state condition determining unit 72 determines whether the state value corresponding to the state condition is true (step S146). When the state value corresponding to the state condition is true (YES in step S146), a process is performed on the next state condition that is unprocessed. Furthermore, when the state value corresponding to the state condition is not true (is false) (NO in step S146), state transition is performed (false→true) (step S147), and a state transition report (state change event) is reported to the higher-level node (step S148).

Furthermore, in the process of step S145, when the issued event matches the state non-establishment condition (YES in step S145), the state condition determining unit 72 determines whether the state value corresponding to the condition is false (step S149). When the state value corresponding to the condition is false (YES in step S149), the state condition determining unit 72 performs a process on the next state condition that is unprocessed.

Furthermore, in the process of step S149, when the state value corresponding to the state condition is not false (is true) (NO in step S149), state transition is performed (true-→false) (step S150), and a state transition report (state change event) is reported to the higher-level node (step S148). Furthermore, after the reporting of step S148, a process is performed on the next state condition that is unprocessed.

<Sequence of Example of Function Extension Process According to Fourth Embodiment>

FIG. 30 illustrates a sequence of an example of a function extension process (registering condition definition) according to the fourth embodiment. The example of FIG. 30 indicates a process using the mobile application 61, the application execution unit 24, the first plug-in 31, the extension function plug-in management unit 25 ((in-terminal) extension function plug-in management unit 25-1 and (in-network) extension function plug-in management unit 25-2), the (in-terminal) extension function plug-in 32-1, and the (in-network) extension function plug-in (second plug-in) 32-2.

In the example of FIG. 30, the mobile application 61 outputs, to the first plug-in 31, a tree-structured condition definition described by a logical product (AND) and a logical sum (OR) of the state condition as described above, which is a condition definition of an event that the application wants to receive (step S161). When the tree determination condition is satisfied or not satisfied, the first plug-in 31 registers a callback function for the mobile application 61 to receive an event (step S162). The callback function registered in the process of step S162 is, for example, stored in the storage unit 23 together with a condition definition ID assigned by the first plug-in 31.

The first plug-in 31 performs the analysis and the dispatching of the tree-structured condition (for example, assigning a plurality of processes according to the contents and the purposes). The first plug-in 31 generates a condition definition tree, in which the operators such as AND and OR and the individual state conditions are the nodes (step S163). Furthermore, the first plug-in 31 refers to the detecting function information list for the access destinations corresponding to the function names of the individual condition nodes, and analyzes the nodes in an order starting from the lower level. When the access destinations of the nodes following the AND and OR nodes are all the same, the first plug-in 31 inputs the same access destination as the access destinations of the AND and OR nodes (step S164).

Next, the first plug-in 31 starts analyzing the nodes in an order starting from the higher level, and when there is a node including an access destination, and the access destination of this node is in the terminal device 13 (local), the first plug-in 31 sends the condition definition corresponding to this node and following nodes to the in-terminal function management unit, and registers the partial conditions corresponding to this node and following nodes (step S165). Furthermore, when the access destination is outside the terminal device 13 (node having an address in the network), the condition definitions corresponding to this node and following nodes are sent to the (in-network) extension function plug-in management unit 25-2, and partial conditions corresponding to this node and following nodes are registered.

The (in-terminal) extension function plug-in management unit 25-1 generates identification information (partial condition definition ID) for identifying a partial condition definition, and performs a process of filling in unique names in an order starting from a lower-level node (step S166). For example, in the process of step S166, when all nodes following a certain node have the same plug-in name (unique name), the plug-in names (unique names) of the nodes are set to be the same value; however, the present embodiment is not so limited.

The first plug-in 31 receives the result of the process of filling in the unique names (step S167), and stores the partial condition definition ID in the node registered in the (in-terminal) extension function plug-in management unit 25-1 (step S168). Furthermore, the (in-terminal) extension function plug-in management unit 25-1 registers the tree-structured condition of the node and following nodes, and the state condition, in the (in-terminal) extension function plug-in 32-1 of the unique name, in an order starting from a higher-level node (step S169). The (in-terminal) extension function plug-in 32-1 generates a partial condition definition ID (step S170), and outputs the result to the (in-terminal) extension function plug-in management unit 25-1 (step S171). The (in-terminal) extension function plug-in management unit 25-1 stores the partial condition definition ID in the node registered in the (in-terminal) extension function plug-in 32-1 (step S172).

Note that the processes of steps S165 through S172 in the above condition definition registration, are also similarly performed for nodes having addresses in the network (step S173). Accordingly, a condition definition for performing the corresponding partial condition determination, may be registered in the (in-network) extension function plug-in management unit 25-2 and the (in-network) extension function plug-in (second plug-in) 32-2, in a similar manner as for the (in-terminal) extension function plug-in management unit 25-1 and the (in-terminal) extension function plug-in 32-1.

FIG. 31 illustrates a sequence of an example of a function extension process (generating condition event) according to the fourth embodiment. The example of FIG. 31 indicates a process using the mobile application 61, the application execution unit 24, the first plug-in 31, the (in-terminal) extension function plug-in management unit 25-1, and the extension function plug-in 32-1.

In the example of FIG. 31, the (in-terminal) extension function plug-in 32-1 sends, to the (in-terminal) extension function plug-in management unit 25-1, a state change event of a case where the state condition is satisfied or not satisfied (step S181). Note that the state change event in the process of step S181 may be, for example, the partial condition definition ID and state change information such as true or false; however, the present embodiment is not so limited.

The (in-terminal) extension function plug-in management unit 25-1 performs a node search for the partial condition definition ID (step S182), updates the latest state of the node (step S183), and performs condition determination in an order starting from the node to the higher level (higher-level node) (step S184).

Next, when the determination with respect to the highest-level node (top node) of the partial tree being determined by the (in-terminal) extension function plug-in management unit 25-1, changes from true to false or from false to true, the (in-terminal) extension function plug-in management unit 25-1 sends a state change event to the first plug-in (step S185). Note that the state change event in the process of step S185 is, for example, state change information such as the partial condition definition ID and state change information such as true or false of the highest-level node at the (in-terminal) extension function plug-in management unit 25-1; however, the present embodiment is not so limited.

The first plug-in 31 performs a search for the partial condition definition ID (step S186), updates the latest state of the node (step S187), and performs condition determination in an order starting from the node to the higher level (higher-level node) (step S188). Furthermore, when the latest state of the highest-level node at the first plug-in 31 changes, the first plug-in 31 acquires a callback function from the condition definition ID (step S189), and makes a callback function call of an event reporting that the state has changed from true to false or from false to true (step S190).

Note that in the example of FIG. 31, the processes at the (in-terminal) extension function plug-in management unit 25-1 and the (in-terminal) extension function plug-in 32-1 may be similarly applied to the processes at the (in-network) extension function plug-in management unit 25-2 and the (in-network) extension function plug-ins (second plug-ins) 32-2, 33, and therefore descriptions of specific processes are omitted.

<Example of Condition Tree (Node Tree)>

Figures 32A, 32B:
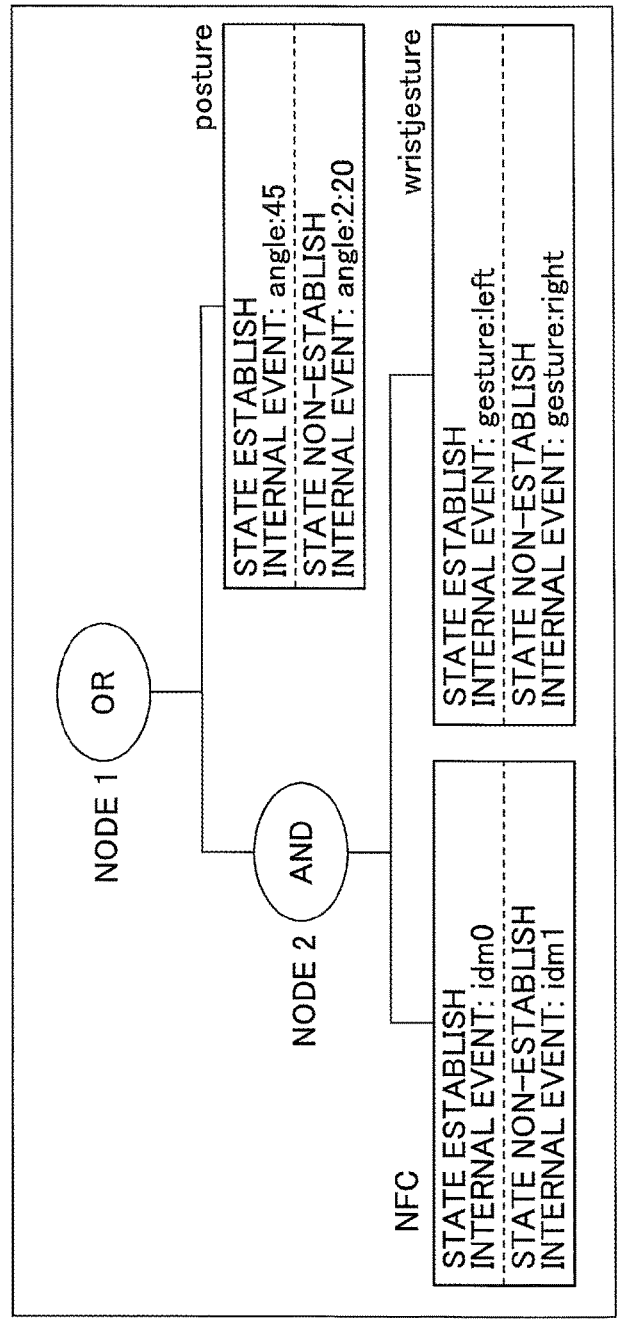
FIGS. 32A through 32C illustrate examples of node trees according to the fourth embodiment (part 1)
Figure 32C:
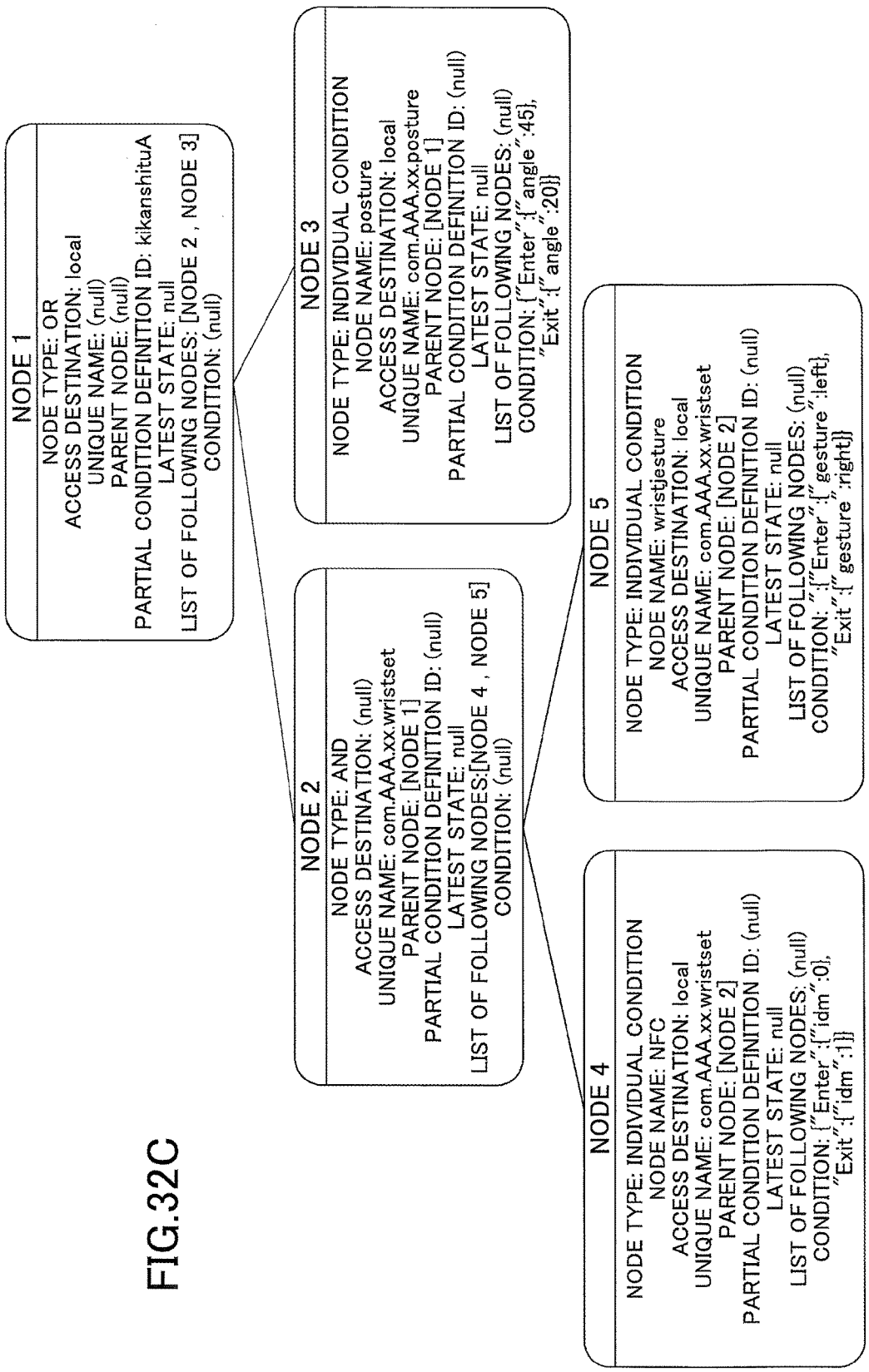
Figure 33:
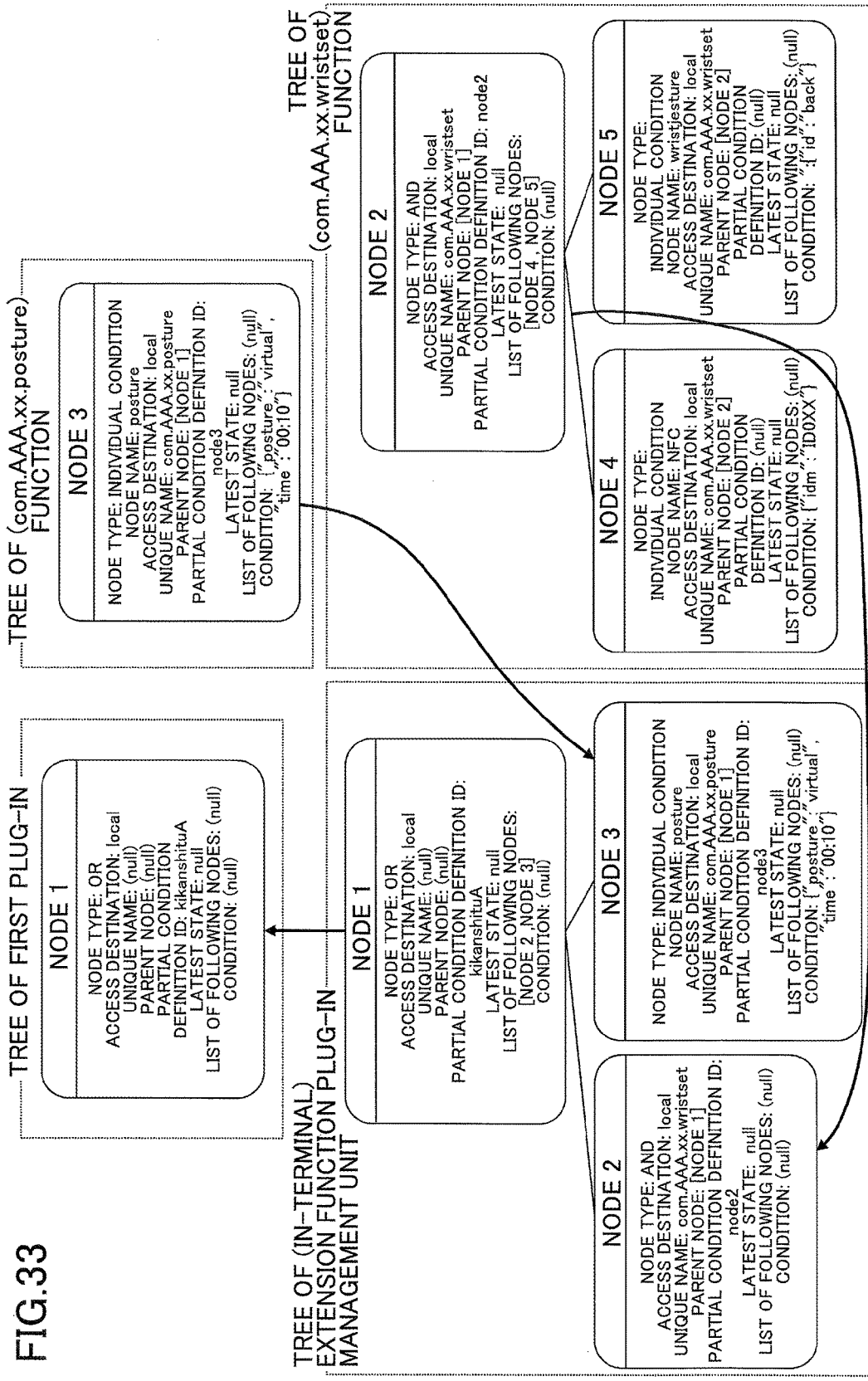
FIG. 33 illustrates an examples of a node tree according to the fourth embodiment (part 2)

Here, a description is given of an example of a condition tree (node tree) according to the fourth embodiment. FIGS. 32A through 33 illustrate examples of node trees according to the fourth embodiment (part 1, part 2). FIGS. 32A through 32C illustrate an example of generating a node tree. FIG. 33 illustrates an example of issuing an event of a node tree. Note that FIGS. 32A through 33 illustrate examples; and the present embodiment is not so limited. The descriptions of the conditions are not limited these examples.

In the fourth embodiment, for example, all conditions corresponding to the node tree are described by descriptions as illustrated in FIG. 32A. The configuration of the nodes may be defined as illustrated in FIG. 32B, and it is possible to generate a node tree as illustrated in FIG. 32C to correspond to the definition of FIG. 32B.

Information of each node includes, for example, "node type", "node name", "access destination", "unique name (plug-in name)", "parent node", "partial condition definition ID", "latest state", "list of following nodes", and "condition"; however, the present embodiment is not so limited.

As the node type, an operator such as AND, OR, and other individual state conditions may be set. An individual state condition is, for example, a condition set with respect to a software module of a peripheral device and a sensor. For example, when the software module is a NFC component (function), it is possible to set the conditions as to whether the tag has been detected in the past, a certain tag has been detected within 10 minutes, or another tag has been detected after detecting a certain tag. Furthermore, when the software module is a temperature detection component (function), it is possible to set a state condition as to whether the temperature is greater than or equal to 20 degrees or whether the temperature is between 20 through 25 degrees; however, the setting of the state condition is not so limited.

Furthermore, as a target of evaluating whether the state condition matches, for example, there is an internal event of the component. An internal event is an event inside the component that is not reported to the application, and therefore even when the internal event occurs highly frequently, the event does not become a processing load of the application. Furthermore, an internal event is closed inside the component, and thus does not activate the application every time an event occurs, which leads to power saving.

Furthermore, in the fourth embodiment, an internal event is constituted by a set of a plurality of item names and values, and it is assumed that the state condition is also similarly constituted by a set of item names and evaluation rules for the item names such as regular expressions. Here, FIGS. 34A and 34B illustrate specific examples of an internal event and state condition settings. FIG. 34A illustrates an example of an internal event. FIG. 34B illustrates examples of state conditions used for the determination by the state condition determining unit 72. The example of an internal event illustrated in FIG. 34A includes the temperature, the humidity, the hour, and the minutes; however, the types and numbers of values are not so limited.

With respect to the values of internal events illustrated in FIG. 34A, the regular expressions as illustrated in FIG. 34B are used to set the state conditions (for example, match when temperature is 20 degrees, match at every hour 30 minutes after the hour, match at every hour 30 minutes after the hour and when temperature is 20 degrees, etc.). As described above, in the fourth embodiment, evaluation is made for the logical product or the logical sum that is obtained as a result of individually performing a matching evaluation by regular expressions for the respective items of the internal event, and therefore the condition may be specified in a flexible manner. Note that the setting example of the state conditions is not limited to the example of FIG. 34B.

The node name is information for identifying the node. The unique name is identification information for identifying the plug-in name. The parent node is node information for a node that is one level higher. As the parent node of the top node, null is set. The partial condition definition ID is identification information that is set when partial condition determination is set. The latest state is information indicating the state of the latest change of the node. When there are no changes, null is set. The list of following nodes is information of nodes arranged in one layer below the self-node. The condition is information of a condition in each node.

For example, in the example of FIG. 32C, the process of tree-structured condition determination according to nodes 1, 2, and 3 is executed by the tree-structured condition determining unit 71 of the first plug-in 31. Furthermore, with respect to the tree-structured condition determination according to nodes 2, 4, and 5 in the example of FIG. 32C, the unique name is the same (com.AAA.xx.wristset), and therefore the process is performed by the tree-structured condition determining unit 71 of a corresponding lower node (for example, the extension function plug-in 32), and the state condition determination of the nodes 4 and 5 is performed by the same extension function plug-in 32. Furthermore, the process of state condition determination of node 3 illustrated in FIG. 32C is performed by the state condition determining unit 72 of a lower-level node corresponding to the unique name (com.AAA.xx.posture).

Note that with respect to the node tree as illustrated in FIG. 32C, a unique name filling process and an access destination filing process are performed, for storing the same information as access destinations and unique names of higher-level nodes, to correspond with the access destinations and unique names of the following nodes. For example, when the access destination of the following node is "local", the access destination of a higher-level node is changed from "null" to "local".

As described above, in the fourth embodiment, by the generated node tree-structured condition determination is performed by the state condition determining units corresponding to the respective nodes. A higher-level node is able to perform condition determination of itself, by using the determination results of a lower-level node in the tree-structured condition determination. Accordingly, the processing load of the CPU may be reduced.

For example, when an event occurs from a lower-level node, the flow as illustrated in FIG. 33 is implemented. Note that the example of FIG. 33 illustrates a tree included in the first plug-in, a tree included in the (in-terminal) extension function plug-in management unit 25-1, a tree included in the com.AAA.xx.posture function that is an example of the (in-terminal) extension function plug-in 32-1, and a tree included in a com.AAA.xx.wristset function that is an example of the (in-terminal) extension function plug-in 32-1.

The tree included in the first plug-in performs condition determination in node 1. The tree included in the (in-terminal) extension function plug-in management unit 25-1 performs condition determination in nodes 1 through 3. The tree included in the com.AAA.xx.posture function performs condition determination in node 3. The tree included in a com.AAA.xx.wristset function performs condition determination in nodes 2, 4, and 5.

The node 2 included in the tree included in the (in-terminal) extension function plug-in management unit 25-1 receives a state change event of node 2, from the tree-structured condition determining unit 71 included in the com.AAA.xx.wristset function. The received event is, for example, "eventname:node2,state:true (or false)"; however, the present embodiment is not so limited. Furthermore, node 3 included in the tree included in the (in-terminal) extension function plug-in management unit 25-1 receives a state change event of node 3 from the tree-structured condition determining unit 71 included in the com.AAA.xx.posture function. The received event is, for example, "eventname:node3,state:true (or false)", however, the present embodiment is not so limited.

In the tree included in the (in-terminal) extension function plug-in management unit 25-1, when an event for node 2 and node 3 is received from a lower level, true or false, corresponding to the condition according to the latest state of each node, is stored. Furthermore, node 1 is evaluated from the latest states of nodes 2 and 3, and an event of a partial definition ID name is issued to the first plug-in. Accordingly, in node 1 included in the plug-in, it is possible to determine the state by using the tree-structured condition determination result included in the (in-terminal) extension function plug-in management unit 25-1.

As described above, in the fourth embodiment, when the application wants to use an event according to a composite condition using a plurality of extension functions, the condition that the application wants to use differs among the applications. Therefore, the application sets an arbitrary condition. When the true/false of the set condition changes, an event is issued by the state condition determining unit 72. Such a state condition determining unit 72 is included in the extension function plug-in 32.

For example, in the fourth embodiment, the state condition determining unit 72 is included in the first plug-in 31, the extension function plug-in management unit 25, and the extension function plug-in 32. The condition is divided across the first plug-in 31 of the higher level to the extension function plug-in 32 of the lower level, so that partial conditions are set. Each unit sends an event to the higher level when the partial condition registered in itself is satisfied. Accordingly, in the fourth embodiment, the state condition determining unit 72 is implemented by, for example, a plug-in of each peripheral device (second plug-in) or by a plug-in of each server (third plug-in), and therefore the processing load at the application (first plug-in) is reduced, which leads to power saving.

Furthermore, an internal event is an event closed inside each state condition determining unit 72, and is issued at a unique timing. Furthermore, the state condition determining unit 72 compares an internal event issued by itself with a state condition that has been registered, to transit the state stored in itself. This process does not depend on the type of the state condition determining unit 72, and is thus automated as a process common to all condition determinations. That is to say, in the fourth embodiment, all processes of storing and managing the states are performed automatically, and therefore there is no need to implement a process of condition determination, etc., and the load of the developer is significantly reduced. Furthermore, by devising the format of the internal event, conditions may be flexibly specified, in combination with regular expressions.

As described above, according to the present embodiment, function extension may be quickly implemented for the application to use a peripheral device or a server. For example, when a terminal device is to be connected to a peripheral device (including sensor, etc.) or a server to collaborate with the peripheral device or server, a plug-in corresponding to the peripheral device or server is incorporated to build an application execution environment, and the application execution environment is installed in the terminal device. Then, when a new plug-in is to be added, or when the plug-in incorporated in advance is deleted, the application execution environment that is being executed is temporarily stopped, and the installed application execution environment in which the plug-in is incorporated is uninstalled, and the connection relationship between the application execution environment and the plug-in needs to be newly built and then the application execution environment needs to be installed. Furthermore, conventionally, there are cases of switching the application based on a rule such as "execute which application under which status condition". In this case, in order to rebuild the connection relationship between the application execution environment and the plug-in every time the condition changes, there is a need to temporarily stop the application execution environment and reactivate the application execution environment, and therefore it has not been possible to quickly execute the distributed mobile application.

Thus, in the present embodiment, for example, a first plug-in common to the software modules of the peripheral device or the server is connected to the application execution environment, and a second plug-in unique to each peripheral device or a third plug-in unique to each server is arranged by being connected to the web application execution environment via the first plug-in. When adding another peripheral device controlled by the terminal device or a server, the second or third plug-in corresponding to the other peripheral device or server is arranged by being connected to the web application execution environment via the first plug-in. Furthermore, in the present embodiment, when deleting the peripheral device controlled by the terminal device or the server, the second or third plug-in corresponding to the peripheral device or server to be deleted, is deleted, while maintaining the connection relationship between the web application execution environment and the first plug-in. Accordingly, it is possible to quickly implement function extension for the web application to use a sensor, a device, or a server.

The present invention is not limited to the specific embodiments described herein, and variations and modifications may be made without departing from the spirit and scope of the present invention. Furthermore, all of or some of the above embodiments may be combined.

According to an aspect of the embodiments, a function extension method and a terminal device are provided, which are capable of quickly implementing function extension.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A function extension method executed by a terminal device, the function extension method comprising:
   connecting a first plug-in, which is common to one or more peripheral devices, to an execution environment of an application for controlling the one or more peripheral devices;
   arranging a second plug-in, which corresponds to each of the one or more peripheral devices, to be connected to the execution environment of the application based on a function information list, in which at least the one or more peripheral devices are associated with an identification of the application via the first plug-in; and
   installing the second plug-in and then connecting the second plug-in to a new execution environment of the application via the first plug-in while maintaining the connection relationship between the new execution environment of the application and the first plug-in, based on the function information list of the application corresponding to an event in response to the event from the peripheral device controlled by the terminal device, for a new function, which uses the one or more peripheral devices, is provided by the second plug-in, and is to be added.

2. The function extension method according to claim 1, further comprising:
   deleting the second plug-in corresponding to one of the peripheral devices that is a deletion target while maintaining the connection relationship between the execution environment of the application and the first plug-in, when the second plug-in corresponding to one of the peripheral devices controlled by the terminal device is to be deleted.

3. The function extension method according to claim 1, further comprising:
   acquiring information of one of the peripheral devices that is executable with respect to position information of the terminal device; and
   implementing connection control of the second plug-in corresponding to the executable peripheral device, based on the acquired information of the executable peripheral device.

4. The function extension method according to claim 3, further comprising:
   acquiring information of one of the peripheral devices that is executable in a present state according to a state change including at least one of a change in a position of the terminal device, a change in a time, a change in a terminal internal state, a change in surroundings, and reception of an event from outside.

5. The function extension method according to claim 1, further comprising:
   issuing, by the second plug-in, report information including at least one of a change in a position of the terminal device, a change in a time, a change in a terminal internal state, a change in surroundings, and reception of an event from outside, based on an issue condition specified by the first plug-in; and
   causing, by the second plug-in, one of the peripheral devices to execute a determination process when the determination process is executable by the one of the peripheral devices corresponding to the second plug-in, the determination process including determining whether to generate the report information based on the specified issue condition.

6. The function extension method according to claim 5, further comprising:
   executing, by the peripheral devices corresponding to the same second plug-in, part of or all of a plurality of the determination processes and a composite determination process which is a combination of results of the plurality of the determination processes, when the plurality of the determination processes are executable by the peripheral devices corresponding to the same second plug-in.

7. The function extension method according to claim 1, further comprising:
   acquiring, by the first plug-in, a function information list describing one or more functions used by the application to be executed; and
   selecting and acquiring the second plug-in corresponding to one of the peripheral devices for the function using the one of the peripheral devices, the function that is determined based on the acquired function information list as is not provided inside the terminal device.

8. The function extension method according to claim 7, further comprising:
   deleting, by the first plug-in, the function information list corresponding to the application when the application is stopped; and
   deleting, by the first plug-in, a second plug-in that is not included in a remaining function information list that is stored.

9. A function extension method executed by a terminal device, the function extension method comprising:
   connecting a first plug-in, which is common to one or more peripheral devices and one or more servers, to an execution environment of an application for controlling the one or more servers;
   arranging a second plug-in, which corresponds to each of the one or more servers, to be connected to the execution environment of the application based on a function information list, in which at least the one or more servers are associated with an identification of the application via the first plug-in; and
   installing the second plug-in and then connecting the second plug-in to a new execution environment of the application via the first plug-in while maintaining the connection relationship between the new execution environment of the application and the first plug-in, based on the function information list of the application corresponding to an event in response to the event from the peripheral device controlled by the terminal device, for a new function, which uses the one or more servers, is provided by the second plug-in, and is to be added.

10. The function extension method according to claim 9, further comprising:
    deleting the second plug-in corresponding to one of the servers that is a deletion target while maintaining the connection relationship between the execution environment of the application and the first plug-in, when the second plug-in corresponding to one of the servers controlled by the terminal device is to be deleted.

11. A function extension method executed by a terminal device, the function extension method comprising:
    connecting a first plug-in, which is common to one or more internal peripheral devices and one or more external peripheral devices, to an execution environment of an application for controlling the one or more external peripheral devices performing communication by broadcasting;

arranging a second plug-in, which corresponds to each of the one or more external peripheral devices, to be connected to the execution environment of the application via the first plug-in;

broadcasting, by the second plug-in, function information of the second plug-in to the terminal device, the function information being broadcast at periodic timings or in response to a request that has been broadcast; and generating, by the terminal device, information of one of the peripheral devices that is executable, upon receiving the function information that has been broadcast; and installing the second plug-in and then connecting the second plug-in to a new execution environment of the application via the first plug-in while maintaining the connection relationship between the new execution environment of the application and the first plug-in, based on the generated information and a list of sets of the function information of the application corresponding to an event in response to the event from the internal peripheral device controlled by the terminal device, for a new function, which uses the one or more external peripheral devices, is provided by the second plug-in, and is to be added.

12. A non-transitory computer-readable recording medium storing a function extension program that causes a computer to execute a process, the process comprising:

connecting a first plug-in, which is common to one or more peripheral devices, to an execution environment of an application for controlling the one or more peripheral devices;

arranging a second plug-in, which corresponds to each of the one or more peripheral devices, to be connected to the execution environment of the application based on a function information list, in which at least the one or more peripheral devices are associated with an identification of the application via the first plug-in; and installing the second plug-in and then connecting the second plug-in to a new execution environment of the application via the first plug-in while maintaining the connection relationship between the new execution environment of the application and the first plug-in, based on the function information list of the application corresponding to an event in response to the event from the peripheral device controlled by the terminal device, for a new function, which uses the one or more peripheral devices, is provided by the second plug-in, and is to be added.

13. A non-transitory computer-readable recording medium storing a function extension program that causes a computer to execute a process, the process comprising:

connecting a first plug-in, which is common to one or more peripheral devices and one or more servers, to an execution environment of an application for controlling the one or more servers;

arranging a second plug-in, which corresponds to each of the one or more servers, to be connected to the execution environment of the application based on a function information list, in which at least the one or more servers are associated with an identification of the application via the first plug-in; and installing the second plug-in and then connecting the second plug-in to a new execution environment of the application via the first plug-in while maintaining the connection relationship between the new execution environment of the application and the first plug-in, based on the function information list of the application corresponding to an event in response to the event from the peripheral device controlled by a terminal device, for a new function, which uses the one or more servers, is provided by the second plug-in, and is to be added.

14. A non-transitory computer-readable recording medium storing a function extension program that causes a computer to execute a process, the process comprising:

connecting a first plug-in, which is common to one or more peripheral devices and one or more external peripheral devices, to an execution environment of an application for controlling the one or more external peripheral devices performing communication by broadcasting;

arranging a second plug-in, which corresponds to each of the one or more peripheral devices, to be connected to the execution environment of the application via the first plug-in;

broadcasting, by the second plug-in, function information of the second plug-in to a terminal device, the function information being broadcast at periodic timings or in response to a request that has been broadcast; and generating, by the terminal device, information of one of the peripheral devices that is executable, upon receiving the function information that has been broadcast; and installing the second plug-in and then connecting the second plug-in to a new execution environment of the application via the first plug-in while maintaining the connection relationship between the new execution environment of the application and the first plug-in, based on the generated information and a list of sets of the function information of the application corresponding to an event in response to the event from the internal peripheral device controlled by the terminal device, for a new function, which uses the one or more external peripheral devices, is provided by the second plug-in, and is to be added.

15. A terminal device comprising:

a memory; and a processor coupled to the memory and the processor configured to connect a first plug-in, which is common to one or more peripheral devices, to an execution environment of an application for controlling the one or more peripheral devices, arrange a second plug-in, which corresponds to each of the one or more peripheral devices, to be connected to the execution environment of the application based on a function information list, in which at least the one or more peripheral devices are associated with an identification of the application via the first plug-in, and install the second plug-in and then connect the second plug-in to a new execution environment of the application via the first plug-in while maintaining the connection relationship between the new execution environment of the application and the first plug-in, based on the function information list of the application corresponding to an event in response to the event from the peripheral device, for a new function, which uses the one or more peripheral devices, is provided by the second plug-in, and is to be added.

16. A terminal device comprising:

a memory; and a processor coupled to the memory and the processor configured to connect a first plug-in, which is common to one or more peripheral devices and one or more servers, to an execution environment of an application for controlling the one or more servers,
arrange a second plug-in, which corresponds to each of the one or more servers, to be connected to the execution environment of the application based on a function information list, in which at least the one or more servers are associated with an identification of the application via the first plug-in, and
install the second plug-in and then connect the second plug-in to a new execution environment of the application via the first plug-in while maintaining the connection relationship between the new execution environment of the application and the first plug-in, based on the function information list of the application corresponding to an event in response to the event from the peripheral device controlled by the terminal device, for a new function, which uses the one or more servers, is provided by the second plug-in, and is to be added.

17. A terminal device comprising:
a memory; and
a processor coupled to the memory and the processor configured to
connect a first plug-in, which is common to one or more internal peripheral devices and one or more external peripheral devices, to an execution environment of an application for controlling the one or more external peripheral devices performing communication by broadcasting,
arrange a second plug-in, which corresponds to each of the one or more external peripheral devices, to be connected to the execution environment of the application via the first plug-in, and
generate information of one of the peripheral devices that is executable, upon receiving function information that has been broadcast, the function information being broadcast by the second plug-in at periodic timings or in response to a request; and
install the second plug-in and then connect the second plug-in to a new execution environment of the application via the first plug-in while maintaining the connection relationship between the new execution environment of the application and the first plug-in, based on the generated information and a list of sets of the function information of the application corresponding to an event in response to the event from the internal peripheral device controlled by the terminal device, for a new function, which uses the one or more external peripheral devices, is provided by the second plug-in, and is to be added.

* * * * *